US011907772B2

(12) United States Patent
Wilkinson

(10) Patent No.: US 11,907,772 B2
(45) Date of Patent: Feb. 20, 2024

(54) TRACING SYNCHRONIZATION ACTIVITY OF A PROCESSING UNIT

(71) Applicant: Graphcore Limited, Bristol (GB)

(72) Inventor: Daniel John Pelham Wilkinson, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 248 days.

(21) Appl. No.: 17/410,811

(22) Filed: Aug. 24, 2021

(65) Prior Publication Data
US 2023/0024224 A1 Jan. 26, 2023

(30) Foreign Application Priority Data

Jul. 14, 2021 (GB) ...................... 2110155

(51) Int. Cl.
G06F 9/52 (2006.01)
(52) U.S. Cl.
CPC .................... G06F 9/522 (2013.01)
(58) Field of Classification Search
CPC ... G06F 9/522; G06F 11/3466; G06F 11/3476
See application file for complete search history.

(56) References Cited

U.S. PATENT DOCUMENTS 9,898,385 B1 * 2/2018 O'Dowd ............. G06F 11/3476
2008/0080651 A1 4/2008 Edgar
2011/0131442 A1 6/2011 Watanabe et al.
2011/0219376 A1 * 9/2011 Williams ............ G06F 11/3466
718/100
2012/0179653 A1 7/2012 Araki et al.
2012/0216080 A1 * 8/2012 Bansal ................ G06F 11/3636
714/45
2014/0146931 A1 5/2014 Sagi
2014/0258765 A1 9/2014 Persson
2014/0297852 A1 10/2014 Shimizu et al.
2015/0365225 A1 12/2015 Hagspiel et al.
2017/0244477 A1 8/2017 Seo et al.
2019/0121784 A1 4/2019 Wilkinson et al.
2020/0012482 A1 1/2020 Tørudbakken et al.
2020/0012533 A1 1/2020 Tørudbakken et al.
2020/0012536 A1 1/2020 Lacey et al.
2020/0106860 A1 4/2020 Sullivan et al.
2020/0174828 A1 6/2020 Manula
(Continued)

FOREIGN PATENT DOCUMENTS

WO 20100109761 9/2012

Primary Examiner — Shawn Doman
(74) Attorney, Agent, or Firm — HAYNES AND BOONE, LLP

(57) ABSTRACT

A device comprising: a processing unit comprising at least one processor configured to: participate in barrier synchronisations, each of which separates a compute phase of the at least one processor from an exchange phase for the at least one processor; and exchange sync messages with a sync controller hardware unit so as to co-ordinate each of the barrier synchronisations; and sync trace circuitry configured to: receive one or more of the sync messages; and in response to each of the one or more of the sync messages, provide sync trace information for output from the device, the sync trace information comprising timing information associated with the respective sync message.

24 Claims, 35 Drawing Sheets

(56) References Cited

U.S. PATENT DOCUMENTS

| | | |
|---|---|---|
| 2020/0201652 A1 | 6/2020 | Alexander et al. |
| 2020/0210364 A1 | 7/2020 | Wilkinson et al. |
| 2021/0081271 A1* | 3/2021 | Doshi ................. G06F 11/0772 |
| 2022/0352998 A1* | 11/2022 | Levi ..................... H04L 43/106 |

* cited by examiner

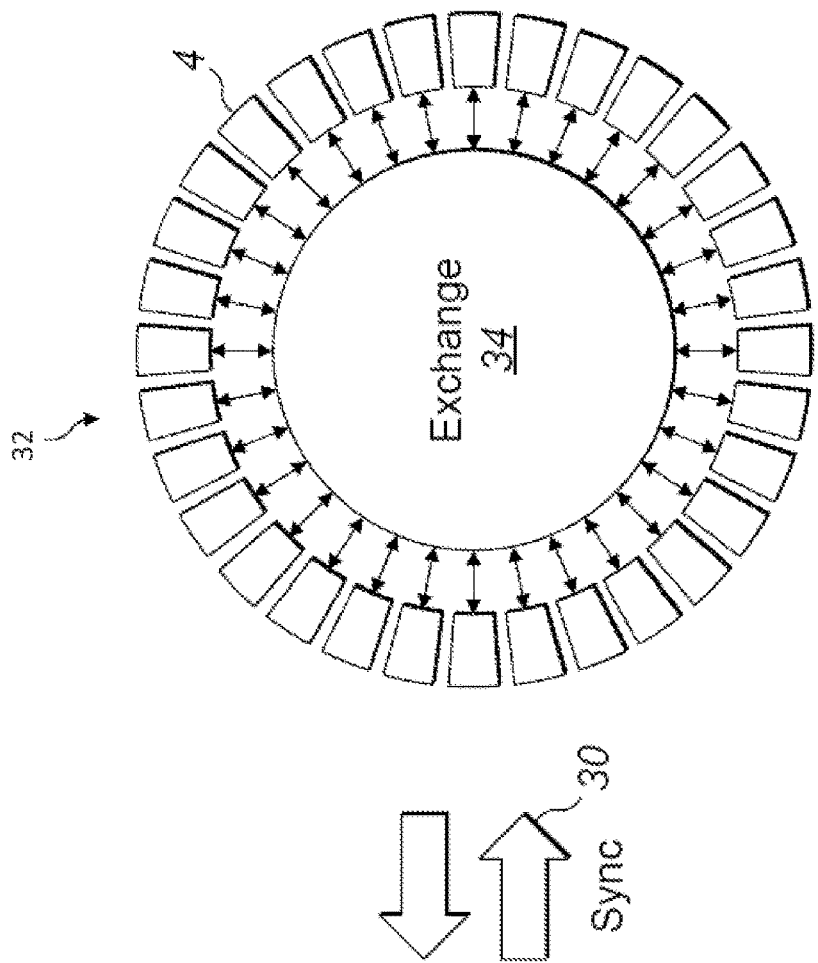
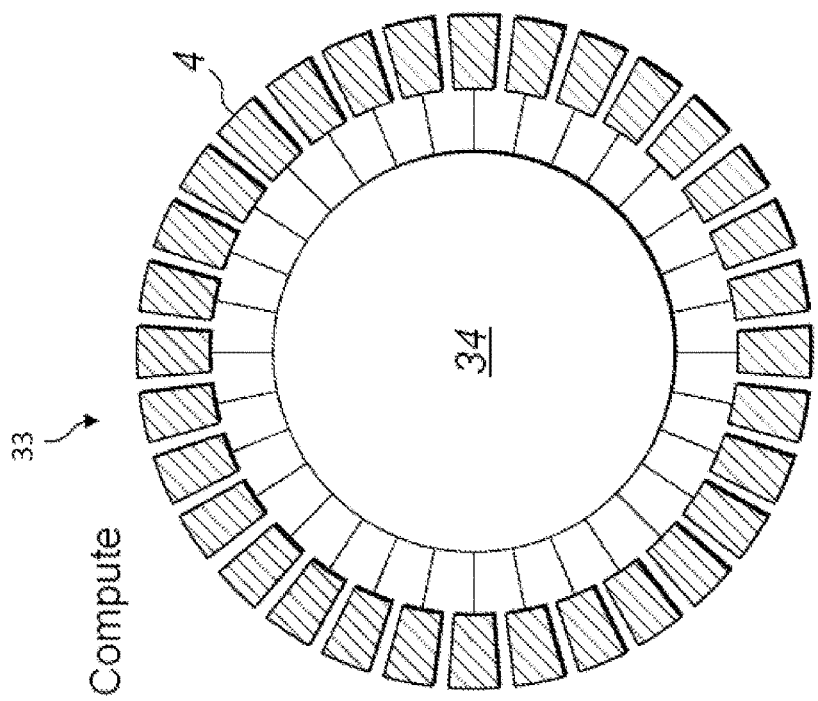
FIG. 2

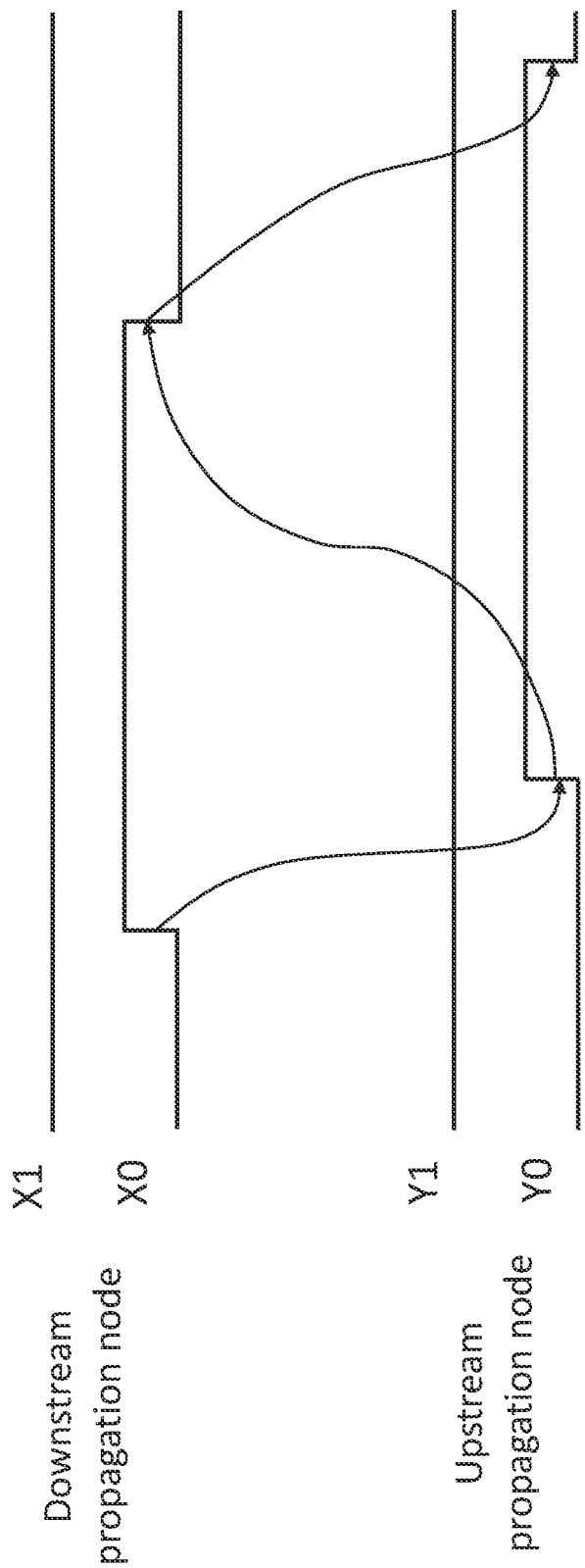

| Global Time | | | | | | | |
|---|---|---|---|---|---|---|---|
| IPU Clock Trace | | | | | | | |
| Channel 0 | | | | | | | |
| Channel 1 | SG1 - Req | SG2 - Req | SG3 - Req | SG4 - Req | SG1 - Ack | SG2 - Ack | SG3 - Ack | SG4 - Ack |
| Channel 2 | SG5 - Req | SG6 - Req | SG7 - Req | SG8 - Req | SG5 - Ack | SG6 - Ack | SG7 - Ack | SG8 - Ack |
| Channel 3 | VC1, label a – pkt count | VC1, label b – pkt count | VC1, label c – pkt count | VC1, label d – pkt count | | | |
| ... | | | | | | | |
| Channel 18 | VC18, label w – pkt count | VC18, label x – pkt count | VC18, label y – pkt count | VC18, label z – pkt count | | | |

FIG. 21

TRACING SYNCHRONIZATION ACTIVITY OF A PROCESSING UNIT

CROSS-REFERENCE TO RELATED APPLICATIONS

The present application claims priority to United Kingdom Patent Application No. GB2110155.5, filed Jul. 14, 2021, the disclosure of which is hereby incorporated herein by reference in its entirety.

TECHNICAL FIELD

The present disclosure relates to a device comprising a processing unit and, in particular, to a device comprising at least one processor that participates in barrier synchronisations.

BACKGROUND

A processing unit may be provided as part of a device, e.g. an integrated circuit, and used for performing operations on data. In context of processing data for complex or high volume applications, such a processing device may be a subsystem to which processing of certain data is offloaded from a host system. Such a work accelerator may have a specialised hardware for performing specific types of processing.

As an example, one area of computing in which such a specialised accelerator subsystem may be of use is found in machine intelligence. As will be familiar to those skilled in the art of machine intelligence, a machine intelligence algorithm is based around performing iterative updates to a "knowledge model", which can be represented by a graph of multiple interconnected nodes. The implementation of each node involves the processing of data, and the interconnections of the graph correspond to data to be exchanged between the nodes. Typically, at least some of the processing of each node can be carried out independently of some or all others of the nodes in the graph, and therefore large graphs expose great opportunities for multi-threading. Therefore, a work accelerator specialised for machine intelligence applications may comprise a large degree of multi-threading. One form of parallelism can be achieved by means of a processor comprising an arrangement of multiple tiles on the same chip (i.e. same die), each tile comprising its own separate respective processing unit and memory (including program memory and data memory). Thus separate portions of program code can be run in parallel on different ones of the tiles. The tiles are connected together via an on-chip interconnect which enables data to be exchanged between them. Such an accelerator may function as a subsystem for a host system to perform parallel processing of data sets provided to it.

In order to increase processing capacity, a processing unit may be provided with a plurality of processors (e.g. tiles). Additionally or alternatively, a plurality of processing units may be connected together to provide a scaled system. When such a system comprising multiple processors execute an application together, there may exist dependencies between the portions of the program running on different processors. A technique is, therefore required to prevent a piece of code on one processor running ahead of data upon which it is dependent being made available by another piece of code on another processor. There are a number of possible schemes for achieving this, one of which is described here by way of example, 'BSP', bulk synchronous parallel. According to BSP, each processor performs a compute phase and an exchange phase in an alternating cycle. During the compute phase, each processor performs one or more computation tasks locally on the processor, but does not communicate any results of its computations with any others of the processors. In the exchange phase each processor is allowed to exchange one or more results of the computations from the preceding compute phase to and/or from one or more others of the processors. Furthermore, according to the BSP principle, a barrier synchronization is placed at the juncture transitioning from the compute phase into the exchange phase, transitioning from the exchange phase into the compute phase, or both.

SUMMARY

According to a first aspect, there is provided a device comprising: a processing unit comprising at least one processor configured to: participate in barrier synchronisations, each of which separates a compute phase of the at least one processor from an exchange phase for the at least one processor; and exchange sync messages with a sync controller hardware unit so as to co-ordinate each of the barrier synchronisations; and sync trace circuitry configured to: receive one or more of the sync messages; and in response to each of the one or more of the sync messages, provide sync trace information for output from the device, the sync trace information comprising timing information associated with the respective sync message.

According to a second aspect, there is provided a method for tracing synchronisation activity for at least one processor of a processing unit, the method comprising: exchanging sync messages between a sync controller hardware unit and the at least one processor so as to co-ordinate a plurality of barrier synchronisations, each of which separates a compute phase of the at least one processor from an exchange phase for the at least one processor; receiving at sync trace circuitry, one or more of the sync messages; and in response to each of the one or more of the sync messages, providing sync trace information for output from the device, the sync trace information comprising timing information associated with the respective sync message.

According to a third aspect, there is provided a non-transitory computer readable medium storing computer readable instructions, which when executed by at least one processor, causes a method to be carried out, the method comprising: receiving one or more of a plurality of sync messages, wherein each of the sync messages is a message to co-ordinate a barrier synchronisation separating a compute phase of at least part of a processing unit from an exchange phase of the at least part of the processing unit; and in response to each of the one or more of the sync messages, providing sync trace information for output from the device, the sync trace information comprising timing information associated with the respective sync message.

BRIEF DESCRIPTION OF DRAWINGS

For a better understanding of the present invention and to show how the same may be carried into effect, reference will now be made by way of example to the accompanying Figures in which:

FIG. 2 is a schematic diagram illustrating the compute and exchange phases within a multi-tile processing unit;

FIG. 8B illustrates another example embodiment of the sync handshake mechanism, in which exit state is propagated along with the sync request/acknowledgment;

FIG. 21 shows an example of the contents of a trace report packet;

DETAILED DESCRIPTION

Figure 1:
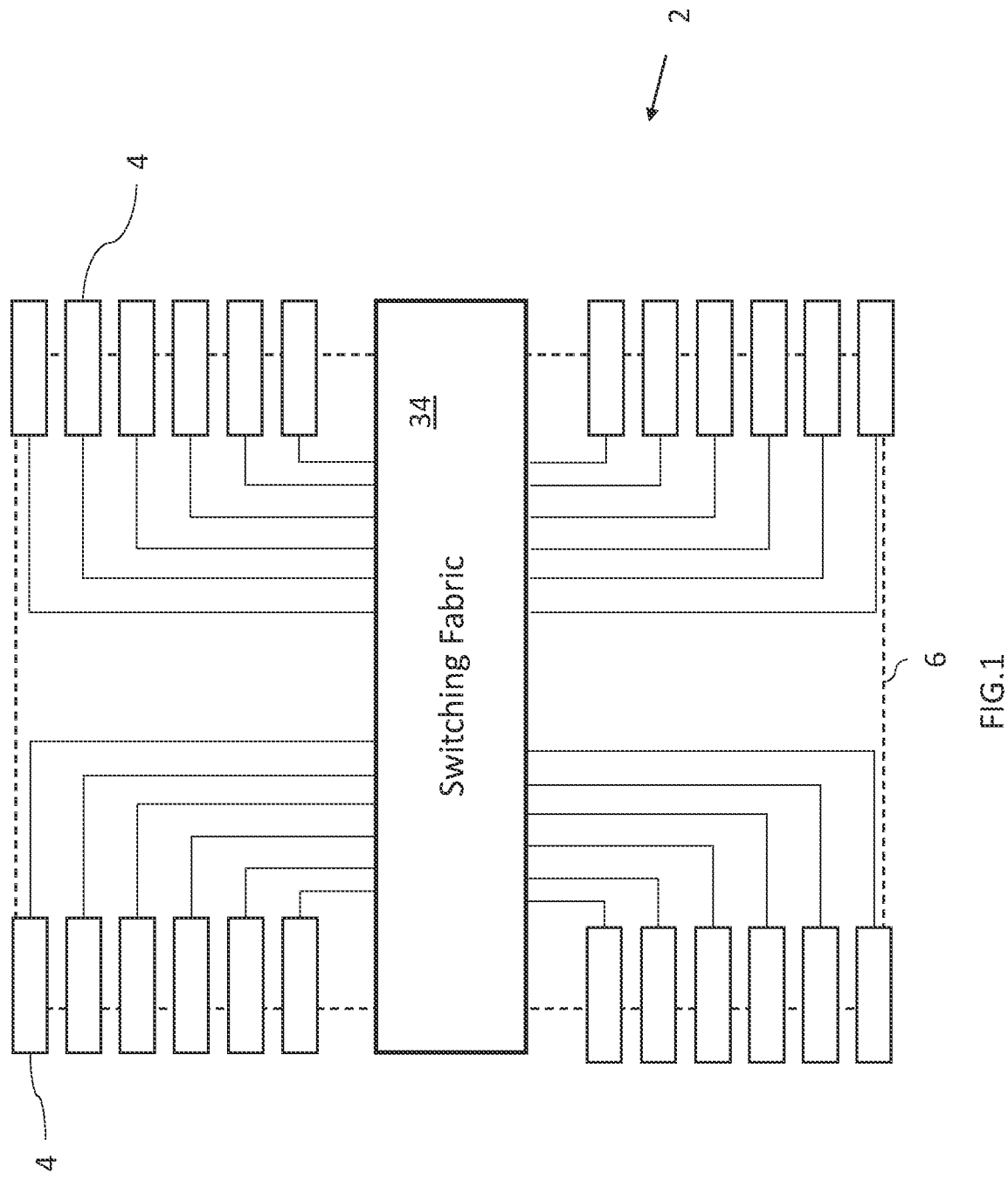
FIG. 1 illustrates an example of a multi-tile processing unit.

Reference is made to FIG. 1, which illustrates an example processing unit 2. This example processing unit 2 is a multi-tile processing unit 2. Each such processing units 2 is formed on an integrated circuit. The processing unit 2 shown may be an intelligence processing unit (IPU), which is described in U.S. patent application Ser. No. 15/886,065, which is incorporated by reference.

The processing unit 2 comprises an array 6 of multiple processor tiles 4 and an interconnect 34 connecting between the tiles 4. The processing unit 2 may be implemented alone as one of multiple dies packaged in the same IC package. The interconnect 34 may also be referred to herein as the "exchange fabric" 34 as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4.

In embodiments, each processing unit 2 also comprises one or more external links, enabling the processing unit 2 to be connected to one or more other processing units (e.g. one or more other instances of the same processing unit 2). These external links may enable the processing unit 2 to be connected to: a host system; and one or more other instances of the processing unit 2 on the same IC package or card, or on different cards. The processing unit 2 receives work from the host, in the form of application data which it processes.

The interconnect 34 is configured to enable the different tiles 4 in the array 6 to communicate with one another. However, as well as there potentially being dependencies between threads on the same tile 4, there may also exist dependencies between the portions of the program running on different tiles 4 in the array 6. A technique is therefore required to prevent a piece of code on one tile 4 running ahead of data upon which it is dependent being made available by another piece of code on another tile 4. This is achieved using a data consistency model.

Parallel programming models for AI and Data Science usually follows a 3-phase iterative execution model: Compute, Barrier, and Exchange. The implications are that data transfer to and from a processor is usually barrier dependent to provide data-consistency between the processors, and between each processor and an external storage. Typically used data consistency models are Bulk Synchronous Parallel (BSP), Stale Synchronous Parallel (SSP) and Asynchronous. The processing unit 2 described herein uses a BSP model, but it will be apparent that the other sync models could be utilised as an alternative.

Figure 3:
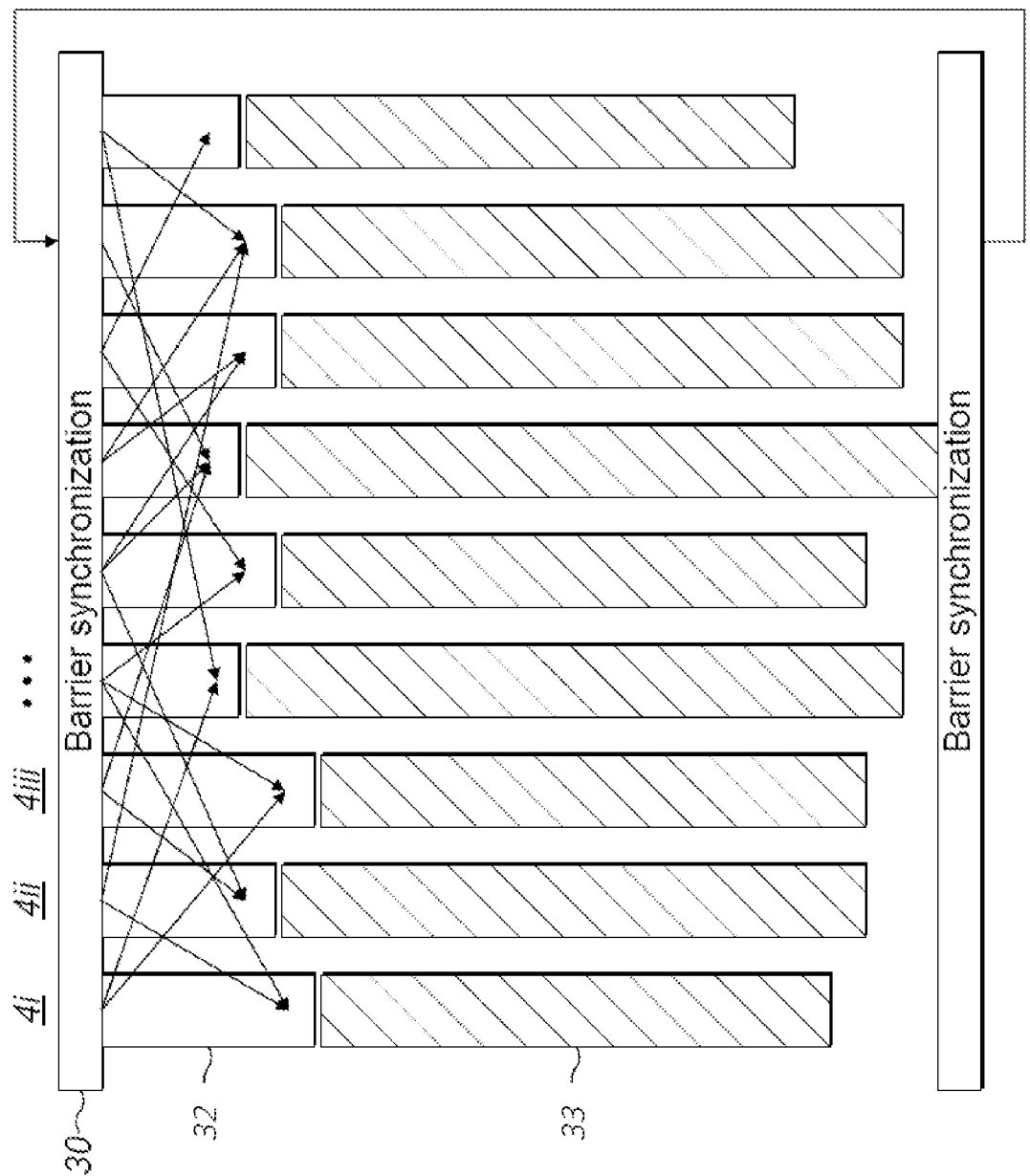
FIG. 3 illustrates exchange of data in a bulk synchronous parallel system.

Reference is made to FIGS. 2 and 3, which illustrate an implementation of a BSP exchange scheme, in which each tile 4 performs a compute phase 33 and an exchange phase 32 in an alternating cycle, separated from one to the other by a barrier synchronization 30 between tiles 4. In the case illustrated by FIGS. 2 and 3, a barrier synchronization is placed between each compute phase 33 and the following exchange phase 32. During the compute phase 33, each tile 4 performs one or more computation tasks locally on-tile, but does not communicate any results of these computations with any others of the tiles 4. In the exchange phase 32, each tile 4 is allowed to exchange one or more results of the computations from the preceding compute phase to and/or from one or more others of the tiles 4, but does not perform any new computations until it has received from other tiles 4 any data on which its task(s) has/have dependency. It is not excluded that other operations such as internal control-related operations may be performed in the exchange phase 32. The communication external to the tile group may optionally utilise the BSP mechanism, but alternatively may not utilize BSP and may instead use some other synchronization mechanism of its own.

According to the BSP principle, a barrier synchronization 30 is placed at the juncture transitioning from the compute phase 33 into the exchange phase 32, or the juncture transitioning from the exchange phase 32 into the compute phase 33, or both. That is to say, either: (a) all tiles 4 are required to complete their respective compute phases 33 before any in the group is allowed to proceed to the next exchange phase 32, or (b) all tiles 4 in the group are required to complete their respective exchange phases 32 before any tile in the group is allowed to proceed to the next compute phase 33, or (c) both of these conditions are enforced. In all three variants, it is the individual tiles which alternate between phases, and the assembly which synchronizes. The sequence of exchange and compute phases may then repeat over multiple repetitions. In BSP terminology, each repetition of exchange phase and compute phase is sometimes referred to as a "superstep" (though note that in the literature the terminology is not always used consistently: sometimes each individual exchange phase and compute phase individually is called a superstep, whereas elsewhere, as in the terminology adopted herein, the exchange and compute phases together are referred to as a superstep).

FIG. 3 illustrates the BSP principle as implemented amongst a group 4i, 4ii, 4iii of some or all of the tiles in the array 6, in the case which imposes: (a) a barrier synchronization from compute phase 33 to exchange phase 32 (see above). Note that, in this arrangement, some tiles 4 are allowed to begin computing 33 whilst some others are still exchanging.

The BSP model may be used for the exchange of data between tiles 4 on the processing unit 2. The communication between tiles 4 of a processing unit 2 occurs in time deterministic fashion, in which data packets are transmitted without headers as in our earlier application U.S. patent application Ser. No. 15/886,065. Additionally, the BSP model may also be used for the exchange of data between processing units 2.

Figure 4:
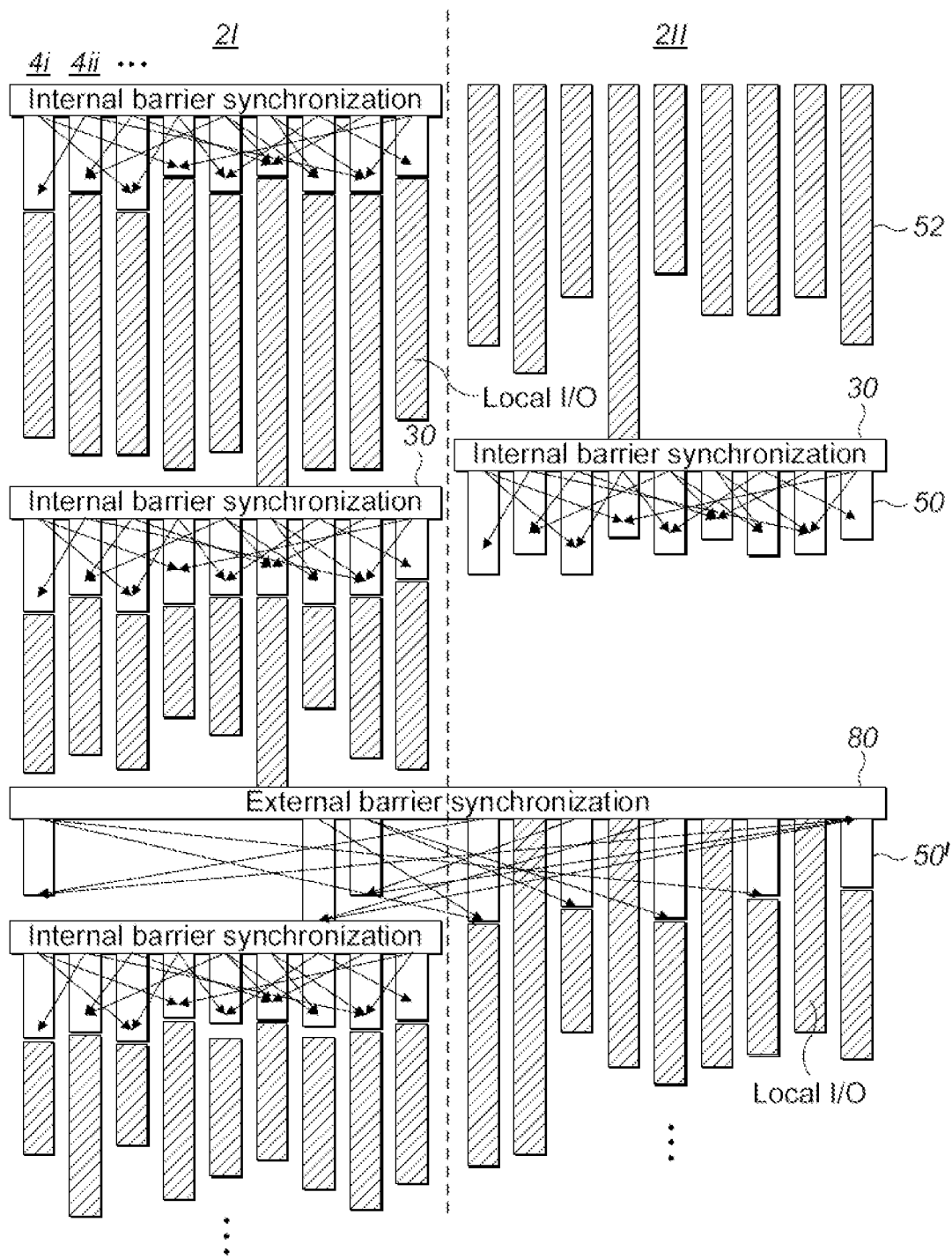
FIG. 4 is a schematic illustration of internal and external synchronisation barriers.

Reference is made to FIG. 4, which illustrates an example BSP program flow involving both internal (i.e. between tiles 4 of a single processing unit 2) and external (i.e. between processing units 2) synchronizations. As shown, the flow comprises internal exchanges 50 (of data between tiles 4 of the same processing unit 2) and an external exchange 50' (of data between tiles 4 of different processing units 2). The program flow in FIG. 4 illustrates a program flow for a first processing unit 2i and a second processing unit 2ii.

As illustrated in FIG. 4, the internal BSP supersteps (comprising the internal exchanges 50 of data between tiles 4 of the same processing unit 2) are kept separate from the external sync and exchange (comprising the external exchanges 50' of data between tiles 4 of different processing units 2).

The program may be arranged to perform a sequence of synchronizations, exchange phases and compute phases comprising, in the following order: (i) a first compute phase, then (ii) an internal barrier synchronization 30, then (iii) an internal exchange phase 50, then (iv) an external barrier synchronization 80, then (v) an external exchange phase 50'. The external barrier 80 is imposed after the internal exchange phase 50, such that the program only proceeds to the external exchange 50' after the internal exchange 50. Note also that, as shown with respect to processing unit 2l in FIG. 4, optionally a compute phase may be included between (iii) internal exchange and (iv) external barrier.

This overall sequence is enforced by the program (e.g. being generated as such by the compiler). In embodiments, the program is programmed to act in this way by means of a SYNC instruction executed by the tiles 4. The internal synchronization and exchange does not extend to any tiles or other entities on another processing unit 2. The sequence (i)-(v) (with the aforementioned optional compute phase between (iii) and (iv)) may be repeated in a series of overall iterations. Per iteration there may be multiple instances of the internal compute, sync and exchange (i)-(iii) prior to the external sync & exchange. I.e. multiple instances of (i)-(iii) (retaining that order), i.e. multiple internal BSP supersteps, may be implemented before (iv)-(v), i.e. the external sync and exchange. Note also, any of the tiles 4 may each be performing their own instance of the internal synchronization and exchange (ii)-(iii) in parallel with the other tiles 4.

Thus per overall BSP cycle (i)-(v) there is at least one part of the cycle (ii)-(iii) wherein synchronization is constrained to being performed only internally.

Note that during an external exchange 50 the communications are not limited to being only external: some tiles 4 may just perform internal exchanges, some may only perform external exchanges, and some may perform a mix.

Also, as shown in FIG. 4, some tiles 4 may perform local input/output during a compute phase. For example, they may exchange data with a host or other type of external storage.

Note also that, as shown in FIG. 4, it is in general possible for any or all tiles to have a null compute phase 52 or a null exchange phase 50 in any given BSP superstep.

For both internal barrier synchronisations and external barrier synchronisations, the tiles 4 taking part in the barrier synchronisation are referred to as a synchronisation group. A synchronisation group exists is provided by a synchronisation zone. A synchronisation zone is a set of hardware resources that, taken together permits a synchronisation group of tiles to sync together. Each of the synchronisation zones is individually configurable to comprise different synchronisation groups of tiles 4 in dependence upon settings for the respective synchronisation zone. By modifying these settings individual tiles 4 may be associated or disassociated with synchronisation zones. A plurality of synchronisation zones are provided across a system of connected processing units 2.

For each of the tiles 4 of a processing unit 2 that belong to a synchronisation group, once that tile 4 reaches a barrier synchronisation, it issues a sync request. Sync logic associated with the processing unit 2 is configured to determine when all of the tiles 4 of the processing unit 2 that belong to the synchronisation group have issued a sync request. Once all of those tiles 4 have issued a sync request, the sync logic then either acknowledges those sync requests or propagates a sync request to a further entity of the sync zone. The further entity could be a proxy for exchanging data with a host system or sync logic associated with another processing unit 2.

Where a sync request is propagated to sync logic associated with another processing unit 2, the action taken by the sync logic associated with that other processing unit 2 in response to the sync request depends upon whether that logic is defined as the master for the sync zone or as a propagation node for the sync zone. The propagation nodes for a sync zone propagate their received sync requests towards the master defined for the sync zone. The sync master, once it has received sync requests for each of the processing units 2 containing tiles 4 belonging to the sync group defined for that sync zone, returns sync acknowledgments to the sync logic associated with each of those other processing units 2 (apart from its own processing unit 2) containing tiles 4 belonging to the sync group. The sync master also returns sync acknowledgments to each of the tiles 4 in its own processing unit 2 that belong to the sync group. Each sync logic (i.e. the propagation nodes) of the other processing units 2 that comprise tiles 4 belong to the sync group, upon receiving a sync acknowledgment originating from the sync master, returns sync acknowledgments to those tiles 4 of its processing unit 2 that belong to the synchronisation group. In response to receiving the sync acknowledgements, the tiles 4 of the synchronisation group pass the barrier synchronisation and exchange data with the tiles 4 of the other processing units 2 that belong to the sync group during the exchange phase. This exchange of data between different processing units 2 is done in a non-time deterministic manner as described in our earlier application U.S. application Ser. No. 15/886,065.

According to embodiments of the application, the tiles 4 in a processing unit 2 may be divided between two or more different external sync groups, such that different sets of tiles 4 of the same processing unit 2 each sync with different sets of tiles 4 external to that processing unit. This concept is described herein in more detail with reference to FIGS. 5A, 5E, 6A and 6B.

In this description, the term sync network is used to refer to the connected sync propagation nodes/circuits for a sync zone that are used to exchange sync requests/acknowledgments so as to co-ordinate a barrier synchronisation between tiles 4 belonging to a sync group defined for the sync zone. Sync requests transmitted towards the master node defined in the sync network are said to be transmitted "upstream" in the sync network. Sync acknowledgements transmitted towards the slave nodes defined in the sync network are said to be transmitted "downstream" in the sync network. The concept of a sync network is described in further detail with respect to FIG. 7B.

Figure 5A:
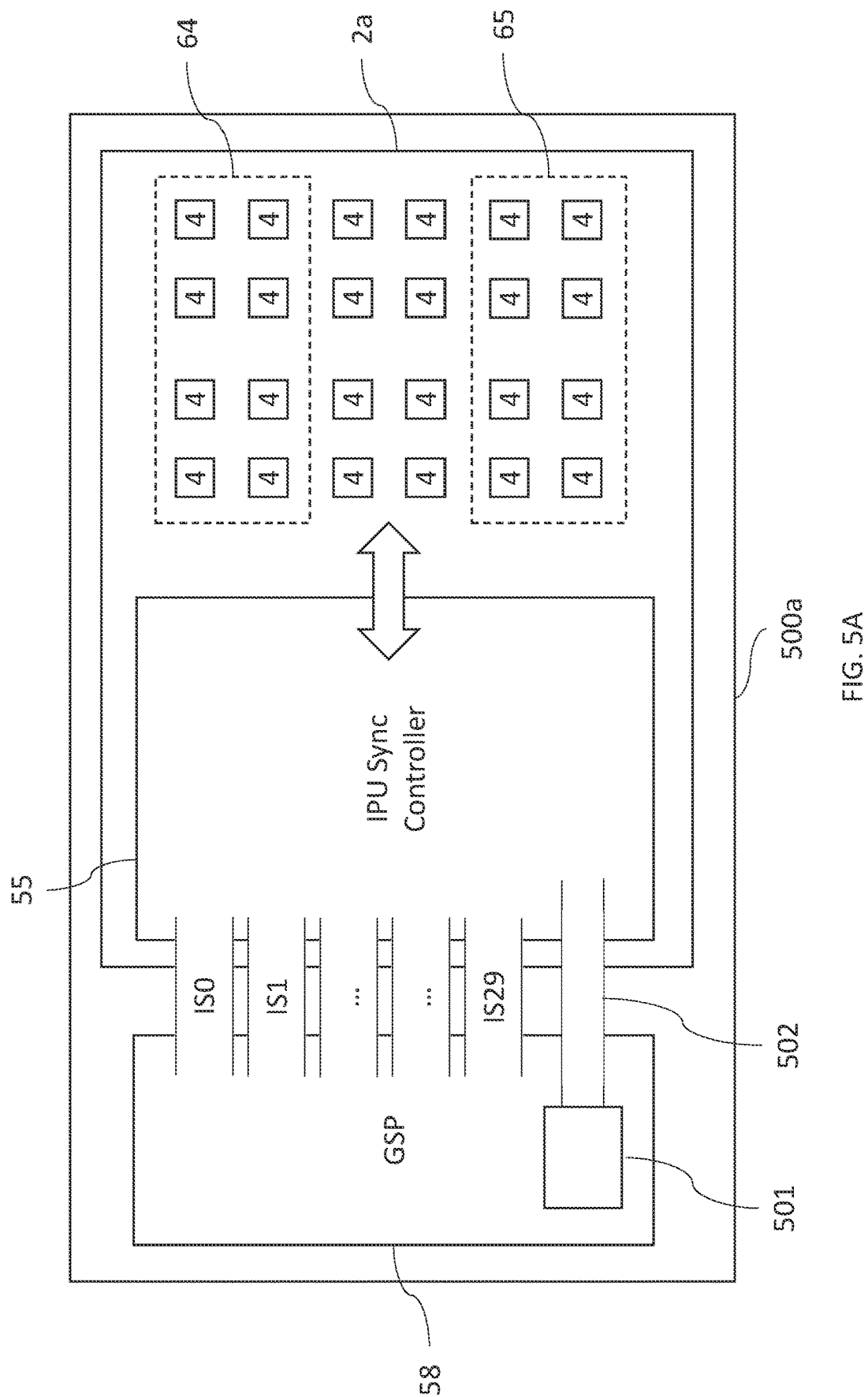
FIG. 5A is a schematic illustration of an integrated circuit comprising a multi-tile processing unit and sync controller circuitry.

Reference is made to FIG. 5A, which illustrates an example of an integrated circuit 500a (i.e. a chip 500a). A plurality of similar such chips may be connected to together. In the remainder of this description, the connected chips, of which the example chip 500a is one, are referred to as chips 500. Each chip 500 comprises a processing unit 2 comprising tiles 4. Each chip 500 may also be referred to as a processing device 500 or as an accelerator subsystem 500, since the processing unit 2 of each chip 500 functions as an accelerator for processing workloads provided by a host system. Although the processing devices 500 are described as being chips 500 throughout this description, it is not excluded that in some embodiments, such processing devices 500 could be implemented on the same integrated circuit.

To identify it from amongst the plurality of chips 500, the specific chip shown in FIG. 5A is referred to as chip 500a. Similarly, to identify it from amongst the plurality of processing unit 2, the specific processing unit shown in FIG. 5A is referred to as processing unit 2a. The features of the chip 500a and processing unit 2a described below, are also features of each of the chips 500 and processing units 2.

Each of the tiles 4 in the processing unit 2a may participate in different types of barrier sync. A first type of barrier sync is an internal sync, in which only tiles 4 of the same processing unit 2a participate.

A second type of sync is an external wired sync in which the sync group for the sync, in addition to including tiles 4 of processing unit 2a, also includes tiles 4 on one or more chips 500 that are accessible over local wired connections. For the external wired sync, the sync messages are exchanged between the chips 500 over dedicated wires used for the transmission of different types of sync message. The application data that is exchanged between the chips 500 during the exchange phase for an external wired sync is sent over PCIe connections between the chips 500 participating in the sync.

A third type of sync is an external sync with host involvement. In this case, a host sync proxy (HSP) participates in the barrier sync by exchanging sync messages with the processing unit 2a, prior to an exchange phase in which data is exchanged between the host and the processing unit 2a.

A fourth type of sync is an external packet-based sync in which the sync group for the sync, in addition to including tiles 4 of processing unit 2a, also includes tiles 4 on one or more chips 500 that are accessible over a packet-switch network (e.g. an Ethernet network). For the external packet-based sync, in addition to sending the application data between the chips 500 over a packet-switched network, the sync messages are also sent over the same packet-switched network.

To enable each of the tiles 4 in the processing unit 2a to participate in the different types of sync, a plurality of sync zones are provided for the processing unit 2a. In embodiments, there are 30 different sync zones provided for the processing unit 2a, with each of these sync zones being configurable to include a sync group including one or more of the tiles 4 of the processing unit 2a. Each sync zone is individually configurable to comprise different sync groupings of tiles 4.

Each of the sync zones may be configured as an external sync zone (in which case the corresponding sync group includes tiles 4 of other processing units 2) for an external barrier synchronisation or as an internal sync zone (in which case the sync group for that sync zone is limited to tiles 4 of the processing unit 2a) for an internal barrier synchronisation.

The sync zones may be categorised into different sets depending upon the hardware provided for that sync zone and, consequently, the type of syncs that be implemented using that sync zone. A first set of the sync zones are sync zones that may be configured for use for the first type of sync discussed above (i.e. internal sync) or the second type of sync discussed above (i.e. external wired sync). In the embodiments in which there are 30 sync zones defined for the processing unit 2a, the first 22 of these zones (labelled sync zones 1-22) belong to the first set of sync zones.

Of the first set of sync zones, a subset of these sync zones may also be used for communication with host involvement, i.e. they may be used for the third type of sync discussed above. In embodiments in which the first set of sync zones comprises 22 sync zones, two of these sync zones (labelled sync zones 1 and 2) may be used for barrier synchronisations following which data exchange is carried out between the host and the tiles 4 of the processing unit 2a.

A second set of the sync zones are sync zones that may be used for the first type of sync discussed above (i.e. internal sync) or the fourth type of sync discussed above (i.e. external packet-based sync). In the embodiments in which there are 30 sync zones defined for the processing unit 2a, the last 8 of these zones (labelled sync zones 23-30) belong to the second set of sync zones.

As described above, in order to co-ordinate synchronisations between different tiles 4 that are part of a sync group, an exchange of synchronisation requests and synchronisations acknowledgments is performed between the tiles 4. The paths through the sync network by which the sync requests are propagated and acknowledged will depend upon the configuration applied to the sync zone in use in order to co-ordinate the sync between the tiles 4 belonging to the sync group.

FIG. 5A shows that the processing unit 2a includes sync controller circuitry 55 (shown as the IPU sync controller 55) between the tiles 4 and the GSP 58. The IPU sync controller 55 may also be referred to as the internal sync controller 55 since it acknowledges sync request for internal barrier synchronisations. The IPU sync controller 55 receives aggregated sync requests from the tiles 4 and determines an action to be performed in dependence upon settings in a register 501 of the GSP 58. The settings in the register 501 define for each sync zone whether that sync zone is defined as internal or as external. Indications of the settings in register 501 are provided to the IPU sync controller 55 over interface 502 between the GSP 58 and the IPU sync controller 55. Any of the 30 sync zones may be defined as either external or internal.

When a sync request associated with a particular sync zone is received at the IPU sync controller 55, if that sync zone is defined in register 501 as being as internal sync zone, the IPU sync controller 55 causes sync acknowledgments to be sent to the tiles 4 of the processing unit 2a. The IPU sync controller 55 also passes the sync request signal to the GSP 58 such that it is asserted on an interface of the GSP 58. This enables the GSP 58 to log trace data for the internal sync. The sync request signal is asserted temporarily on the relevant interface of the GSP 58 and is deasserted when the tiles 4 of the synchronisation group receive sync acknowledgements from the IPU sync controller 55 and, in response, deassert their sync request signal.

When a sync request is received at the IPU sync controller 55 and the sync zone for that sync request is defined in register 501 as being an external sync zone, the IPU sync controller 55 forwards the sync request to the GSP 58 on an interface of the GSP 58 associated with the particular sync zone for the sync request. As shown in FIG. 5A, the GSP 58 has a number of interfaces (labelled as IS0 to IS29), each of which is associated with one of the sync zones provided for the processing unit 2a. The sync controller 55 provides a sync request received from the tiles 4 over the one of the interfaces (IS0 to IS29) associated with the same sync zone as the sync request. In response, the GSP 58 will return a sync acknowledgment, which is sent over the same one of the interfaces IS0 to IS29 over which the sync request was provided. The sync acknowledgment returned from the GSP 58 is provided to each of the tiles 4 in the processing unit 2a.

To distribute the sync requests and sync acknowledgments, the IPU sync controller 55 includes a plurality of sets of wires, with each set of wires being associated with a different sync zone. Each set of wires includes at least a sync request wire, on which a sync request for the respective sync zone is received from the tiles 4, and a sync acknowledgment wire on which a sync acknowledgment for the respective sync zone is received from the GSP 58. Each set of wires is associated with a different one of the GSP 58 interfaces IS0 to IS29 over which it is configured to pass sync requests and acknowledgments. As will be discussed in more detail later, some of the sets of wires may pass further information, in addition to an indication of a sync request or acknowledgment. The protocol for sending sync messages over wires is described below with reference to FIGS. 8A and 8B.

In order to ensure that each tile 4 indicates in which sync zone it is to participate, each individual tile 4 also has a plurality of dedicated sync request wires, each of which is associated with one of the sync zones defined for the processing unit 2a. Each tile 4, when it is to participate in a barrier synchronisation associated with particular sync zone, issues a sync request on a sync request wire associated with that sync zone by asserting a signal on that wire. Each tile 4 also has a plurality of dedicated sync acknowledgment wires, each of which is associated with one of the sync zones defined for the processing unit 2a. Each tile 4, after issuing a sync request on a sync request wire for a sync zone, receives from an upstream node in the sync network, a sync acknowledgment on its sync acknowledgment wire associated that sync zone. In response, the tile 4 then progress to the exchange phase following the barrier synchronisation.

Figure 5B:
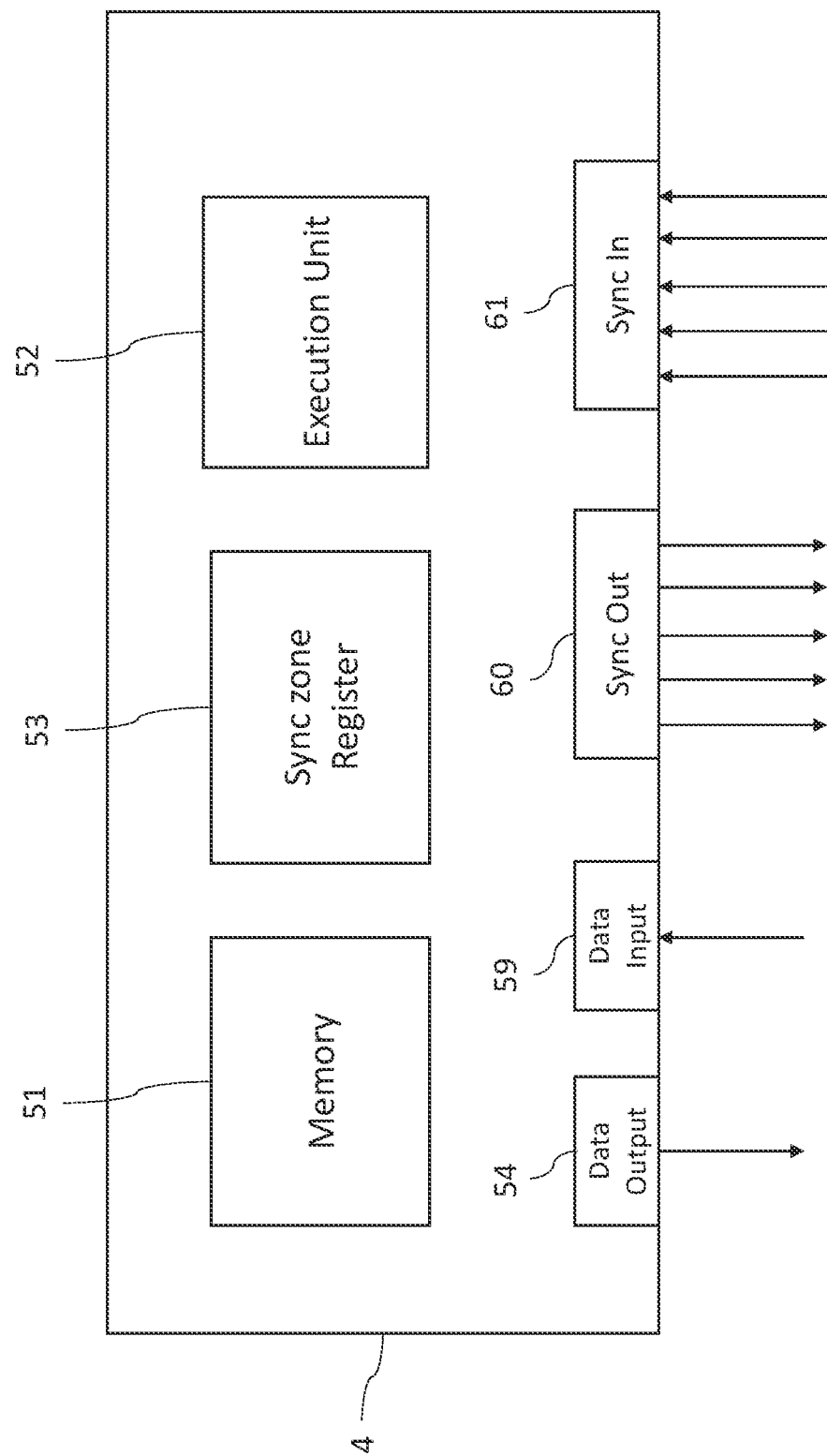
FIG. 5B is a schematic illustration of a processor tile.

Reference is made to FIG. 5B, which illustrates an example tile 4 according to embodiments of the application. The tile 4 includes a memory 51 for storing instructions and data. The execution unit 52 is configured to execute instructions loaded from memory 51 to perform operations on data also loaded from memory 51. The results of the operations are then stored in memory 51. The tile 4 additionally includes a data input interface 59 for receiving data for storage in memory 51. The tile 4 is configured to send data over data output interface 54 during at least some of the exchange phases in which it participates and to receive data from the from data input interface 59 during at least some of the exchange phases in which it participates.

The tile 4 includes one or more sync out interfaces 60 for sending sync requests over the sync request wires. A plurality of sync request wires connected to interfaces 60 are shown, with each of these wires being associated with a particular sync zone. When a tile 4 reaches a barrier synchronisation in its compiled code held in memory 51, the execution unit 52 executes a sync instruction, where the sync zone for the barrier synchronisation is provided as an operand of the sync instruction. In response to execution of the sync instruction, the execution unit 52 causes a sync request signal to be asserted over the sync out interfaces 60 on the relevant sync request wire that is associated with the sync zone for the barrier synchronisation.

The tile 4 also includes one or more sync in interfaces 61 for receiving sync acknowledgments over the sync acknowledgment wires. A plurality of sync acknowledgment wires connected to interface/s 61 are shown, with each of these wires being associated with a particular sync zone. After executing the sync instruction and transmitting a sync request associated with a sync zone, the tile 4 awaits a sync acknowledgment on the sync acknowledgment wire associated with that sync zone. After receiving such an acknowledgment, the tile 4 progresses to the exchange phase in which the tile 4 exchanges data with one or more other tiles 4 belonging to the sync group defined for the sync zone or with the host.

In order for the GSP 58 to determine when all of the tiles 4 of the processing unit 2a belonging to a particular sync group have asserted a request, the tiles 4 are configured to continuously assert a sync request for all of the sync zone with which they are not associated (i.e. for which they are not part of the sync group defined for the sync zone). In this way, once all of the tiles 4 associated with a particular sync zone have asserted a sync request for that sync zone (and not before), all of the tiles 4 in the processing unit 2 will then be asserting a sync request for that sync zone. Sync aggregation circuitry is provided in the chip 500a for aggregating the sync requests received from the tiles 4 of the processing unit 2a and providing an aggregated sync request for the processing unit 2a to the IPU sync controller 55 for the chip 500a. The aggregation is performed such that the IPU sync controller 55 will detect an aggregated sync request for a sync zone, once a sync request is asserted by all of the tiles 4 on the processing unit 2a. Therefore, the IPU sync controller 55 will detect the sync request once it is asserted by all tiles 4 of the sync group defined for the sync zone that belong to processing unit 2a.

The external sync controller 58 comprises the sync logic for propagating and acknowledging sync requests to/from other chips 500 and will be described in more detail later with reference to FIG. 7A. The external sync controller 58 is referred to throughout the specification as the global sync peripheral (GSP).

Figure 5C:
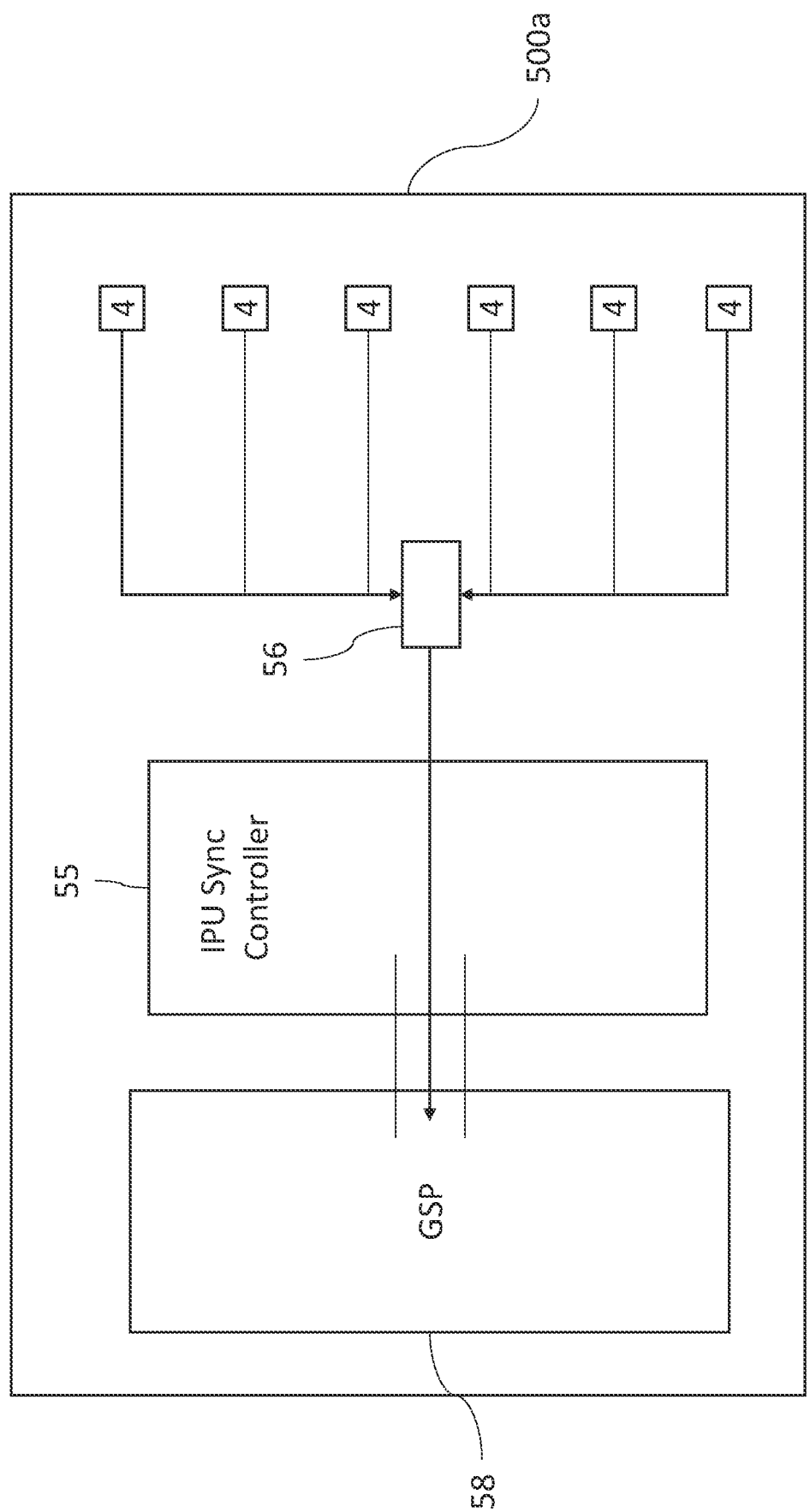
FIG. 5C is a schematic illustration of the propagation of a sync request to the external sync controller from the multi-tile processing unit.

Reference is made to FIG. 5C, which illustrates the aggregation of sync requests issued by different tiles 4 of processing unit 2a. The example shown in FIG. 5C illustrates the sync request wiring associated with a single sync zone only. However, it would be appreciated that equivalent such sync request wiring is provided for each sync zone. As shown in FIG. 5C, the chip 500a includes sync aggregation circuitry 56 for aggregating sync request signals received from the different tiles 4. The sync aggregation circuitry 56 may include a plurality of AND gates configured to perform AND operations between the different sync requests received on the sync request wires from different tiles 4. The sync aggregation circuitry 56 outputs an aggregated sync request (which is provided to the IPU sync controller 55) if a sync request is asserted by all of the tiles 4 of the processing unit 2a on the sync request lines associated with the sync zone. Since all of the tiles 4 not belonging to the sync group defined for that sync zone assert a sync request for that sync zone at all times, the sync aggregation circuitry 56 awaits sync requests from the tiles 4 belonging to the sync group for the sync zone, which they issue when they reach the barrier synchronisation. Once it receives these sync requests, the aggregation circuitry 56 provides the aggregated sync request to the IPU sync controller 55. The IPU sync controller 55 responds either by acknowledging the aggregated sync request without awaiting a sync acknowledgment from the GSP 58 (if the sync zone is configured as internal) or propagates the aggregated sync request to the GSP 58 and awaits a sync acknowledgment in response from the GSP 58 (if the sync zone is configured as external).

Figure 5D:
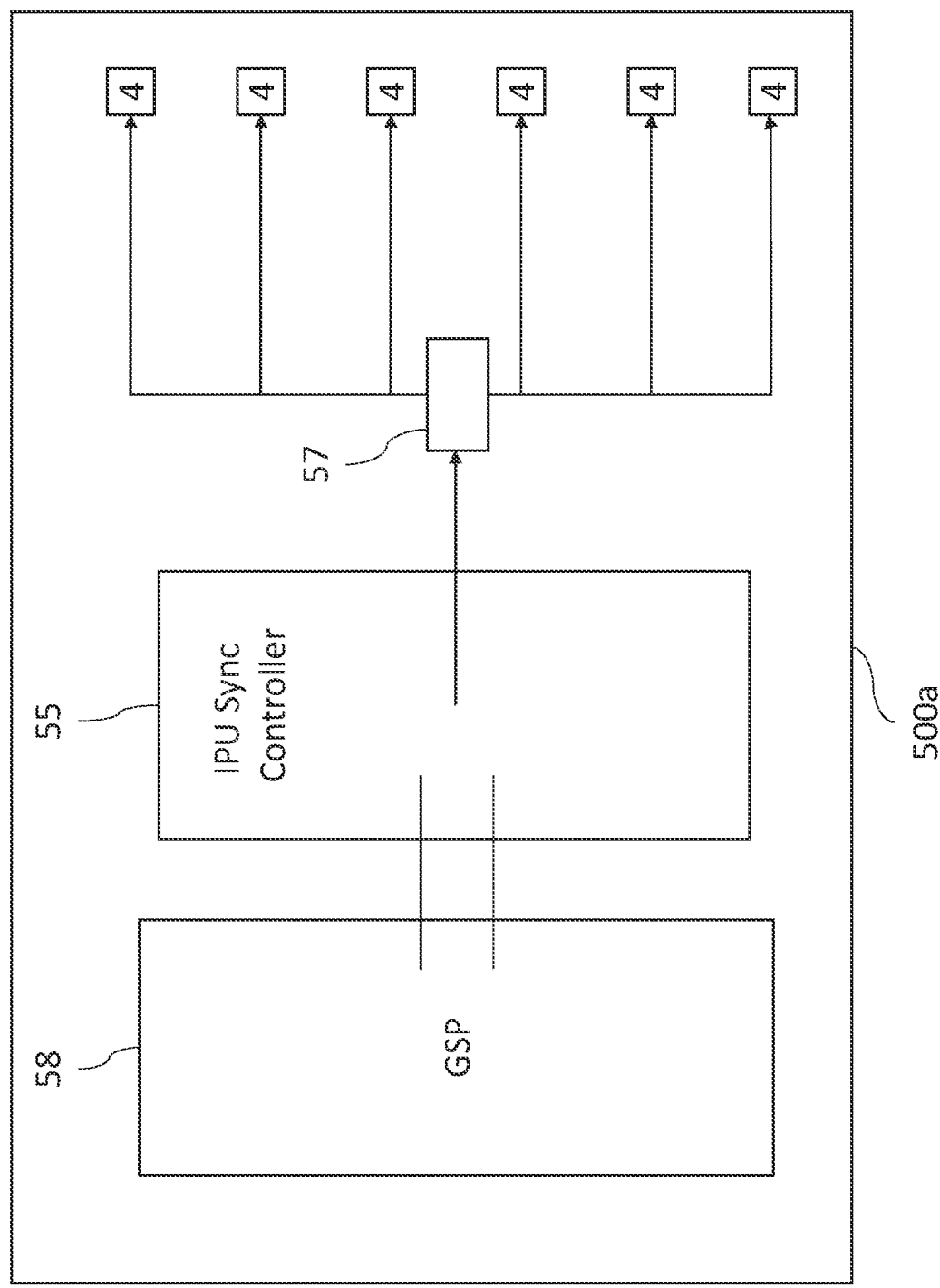
FIG. 5D is a schematic illustration of the propagation of sync acknowledgments to the processor tiles.

Reference is made to FIG. 5D, which illustrates the distribution of a sync acknowledgment to each of the tiles 4. The example shown in FIG. 5D illustrates the sync acknowledgment wiring associated with a single sync zone, which may be the same sync zone for which the sync request aggregation wiring is shown in FIG. 5C. It would be appreciated that a separate set of such sync acknowledgment distribution wiring is provided for each sync zone. A sync acknowledgment may be originate from and be provided by the IPU sync controller 55 to the sync distribution circuitry 57.

Such a sync acknowledgement is produced by the IPU sync controller 55 in response to a sync request received at the IPU sync controller 55 (if the sync zone is configured for internal syncs). Such a sync acknowledgment may alternatively may be provided from the GSP 58 to the sync distribution circuitry 57. In either case, the sync acknowledgment signal is received at the sync distribution circuitry 57, which is configured to assert a sync acknowledgment signal to each of the tiles 4 of the processing unit 2a. Those tiles 4 not belonging to the sync group defined for the sync zone may ignore the sync acknowledgment. However, the tiles 4 belonging to the sync group, will proceed to the exchange phase in which they exchange data with one or more other tiles 4 of the sync group or with the host.

Referring back to FIG. 5B, each tile 4 includes a register 53 indicating with which of the sync zones the respective tile 4 belongs. The register 53 stores a bitmap indicating, for each of the sync zones, whether the tile 4 does or does not belong to a sync group defined for that sync zone. For each sync zone with which the tile 4 is not associated, the tile 4 continually asserts a sync request on the relevant sync request wire. For each sync zone with which the tile 4 is associated, the tile 4 asserts a sync request on the relevant sync request wire when it reaches a barrier synchronisation associated with that sync zone. The tile 4 deasserts a sync request for a sync zone with which it is associated after receiving a sync acknowledgment associated with that sync zone.

For some of the sync zones, the tile 4 has multiple wires for sending sync requests associated with a single sync zone and multiple wires for receiving sync acknowledgments associated with a single sync zone. This allows for the sending of additional information associated with a sync request and for the receipt of additional information associated with a sync acknowledgment. The additional information may comprise an indication of an exit state associated with a barrier synchronisation. In example embodiments, exit state information is propagated with a sync request and a sync acknowledgment for 8 of 30 of the sync zones.

When a tile 4 reaches a barrier synchronisation for which exit state is to be output, the tile 4 selects one of two separate wires (each associated with the same sync zone) on which to assert the sync request. This allows for the transmission of i) an indication of a sync request and ii) an indication of the exit state associated with the sync request. Therefore, as well as providing an indication of a sync request, the presence of an extra signal also provides an indication of an exit state for the barrier synchronisation. There are two possible exit states: 0 and 1. For the pair of sync request signals that provided over the two separate wires, 00b means no sync request, 01b means a sync request with exit state 0, 10b means a sync request with exit state 1, and 11b is an illegal state.

The exit state is output by and aggregated across all tiles 4 belonging to the sync group. If all participants in a barrier sync give exit state 1, then the final ack exit state will also be 1. If even one sync participant gives exit state 0, then the final ack exit state will be 0. These aggregate exits states are derived from the exit state of the threads executing on tiles 4. The exit states can be used to represent whatever the programmer wishes, but one particularly envisaged example is to use an exit state of 1 to indicate that a thread executing on a tile 4 has exited in a "successful" or "true" state, whilst an exit state of 0 indicates the thread exited in an "unsuccessful" or "false" state (or vice versa). For instance, consider an application where each worker thread running on a tile 4 performs a computation having an associated condition, such as a condition indicating whether the error(s) in the one or more parameters of a respective node in the graph of a machine intelligence algorithm has/have fallen within an acceptable level according to a predetermined metric. In this case, an individual exit state of one logical level (e.g. 1) may be used to indicate that the condition is satisfied (e.g. the error or errors in the one or more parameters of the node are within an acceptable level according to some metric); whilst an individual exit state of the opposite logical level (e.g. 0) may be used to indicate that the condition was not satisfied (e.g. the error or errors are not within an acceptable level according to the metric in question). The condition may, for example, be an error threshold placed on a single parameter or each parameter, or could be a more complex function of a plurality of parameters associated with the respective computation performed by the worker thread.

The exit state is aggregated and propagated upstream in the sync network towards the sync master. At each point in the sync network, this exit state is aggregated and forwarded upstream in the sync network. When the sync master in the sync network receives all of the expected sync requests and exit states, it sends sync acknowledgments downstream in the sync network to the tiles 4 from which the sync request originated. The sync acknowledgments are sent with the aggregate exit state determined at the sync master. This aggregate exit state is thereby communicated to all of the tiles 4 belonging to the sync group.

In order to provide the aggregate exit state associated with the sync acknowledgments, each tile has two sync acknowledgment wires for the relevant sync zone. This allows for the transmission of i) an indication of a sync acknowledgment and ii) an indication of the exit state associated with the sync acknowledgment. For the pair of signals that may provided over the two separate sync acknowledgment wires, 00b means no sync acknowledgment, 01b means a sync acknowledgment with exit state 0, 10b means a sync acknowledgment with exit state 1, and 11b is an illegal state.

The aggregated exit state enables the program to determine an overall outcome of parts of the program running on multiple different tiles 4, without having to individually examine the state of each individual worker thread on each individual tile 4. It can be used for any purpose desired by the programmer. More information about the exit state and its use is provided in U.S. patent application Ser. No. 15/885,955, which is incorporated by reference.

The system shown in FIG. 5A can be used to implement a new type of barrier synchronisation in which a single processing unit 2 participates in multiple external syncs by splitting the tiles 4 of the processing unit 2 between two or more disjoint sync groups. FIG. 5A shows a first set of tiles 64 and a second set of tiles 65. The first set of tiles 64 includes one or more tiles 4. The second set of tiles 65 includes one or more tiles 4.

The first set of tiles 64 belongs to a first sync group, which, in addition to including the tiles 4 of the first set of tiles 64, also comprises tiles 4 of one or more other processing units 2. Specifically, the first sync group includes a third set of tiles belonging to a further processing unit 2. The second set of tiles 65 belongs to a second sync group, which, in addition to including the tiles 4 of the second set of tiles 65, also comprises tiles 4 of one or more other processing units 2. Specifically, the second sync group includes a fourth set of tiles belonging to a further processing unit 2, which may be the same as or different to the further processing unit 2 having the third set of tiles belonging to the first sync group.

Each of the tiles 4 belonging to the first set of tiles 64, upon reaching a barrier synchronisation for the first sync group, asserts a sync request on its sync request wire associated with the sync zone that is configured to support barrier synchronisations for the first sync group. In response to receiving sync requests from all of the tiles 4 of the first set of tiles 64, sync aggregation circuitry, e.g. circuitry 56, aggregates the sync requests and provides an aggregated sync request to the GSP 58. The aggregated sync request is sent over one of the interfaces (IS0 to IS29) of the GSP 58 that is associated with the sync zone that is configured to support barrier synchronisations for the first sync group. Subsequently, the sync distribution circuitry, e.g. circuitry 57, will receive a corresponding sync acknowledgment from the GSP 58. This sync acknowledgment is received from over the same one of the interfaces (IS0 to IS29) that is associated with the sync zone for the first sync group and over which the sync request was delivered. In response to receipt of this sync acknowledgment, the sync distribution circuitry causes sync acknowledgments to be sent to each of the tiles 4 in the first set of tiles 64. Following receipt of the sync acknowledgements, the tiles 4 of the first set of tiles 64 enter an exchange phase in which they exchange data with the tiles 4 on the other processing units 2 that are also belong to the first sync group.

A similar sync request/acknowledgment process is carried out for the second sync group. Barrier syncs for the second sync group are provided by a different sync zone to barrier syncs for the first sync group. This process may take place at the same time as, but asynchronously with respect to, the sync request/acknowledgment process performed for the first sync group. As part of the process, each of the tiles 4 belonging to the second set of tiles 65, upon reaching a barrier synchronisation for the second sync group, asserts a sync request on its sync request wire associated with the sync zone that is configured to support barrier synchronisations for the second sync group. In response to receiving sync requests from all of the tiles 4 of the second set of tiles 65, sync aggregation circuitry, e.g. circuitry 56, aggregates the sync requests and provides an aggregated sync request to the GSP 58. The aggregated sync request is sent over the one of the interfaces (IS0 to IS29) of the GSP 58 associated with the sync zone that is configured to support barrier synchronisations for the second sync group. Subsequently, the sync distribution circuitry, e.g. circuitry 57, will receive a corresponding sync acknowledgment from the GSP 58. This sync acknowledgment is output by the GSP 58 over the same one of the interfaces (IS0 to IS29) that is associated with the sync zone for the second sync group and over which the sync request was delivered. In response to receipt of this sync acknowledgment, the sync distribution circuitry causes sync acknowledgments to be sent to each of the tiles 4 in the second set of tiles 65. Following receipt of the sync acknowledgements, the tiles 4 of the second set of tiles 65 enter an exchange phase in which they exchange data with the tiles 4 of the other processing units 2 that are also part of the second sync group.

Since the synchronisation and exchange processes performed for the first sync group and the second sync group are independent, the exchange phases for the first sync group and the second group may overlap in time, whilst being distinct from one another.

In addition to the tiles 4 belonging to the first set of tiles 64 and the tiles 4 belonging to the second set of tiles 65, other tiles 4 are shown as part of the processing unit 2 in FIG. 5A. Whilst the first set of tiles 64 and the second of tiles 65 are performing the sync and exchange operations described above, these other tiles 4 may be perform any other activity, such as participating in one or more external sync and exchanges, participating in one or more internal syncs, or participating in one or more compute phases. The sync behaviour of these other tiles 4 is asynchronous with respect to the sync behaviour of the first set of tiles 64 and the second set of tiles 65.

Figure 5E:
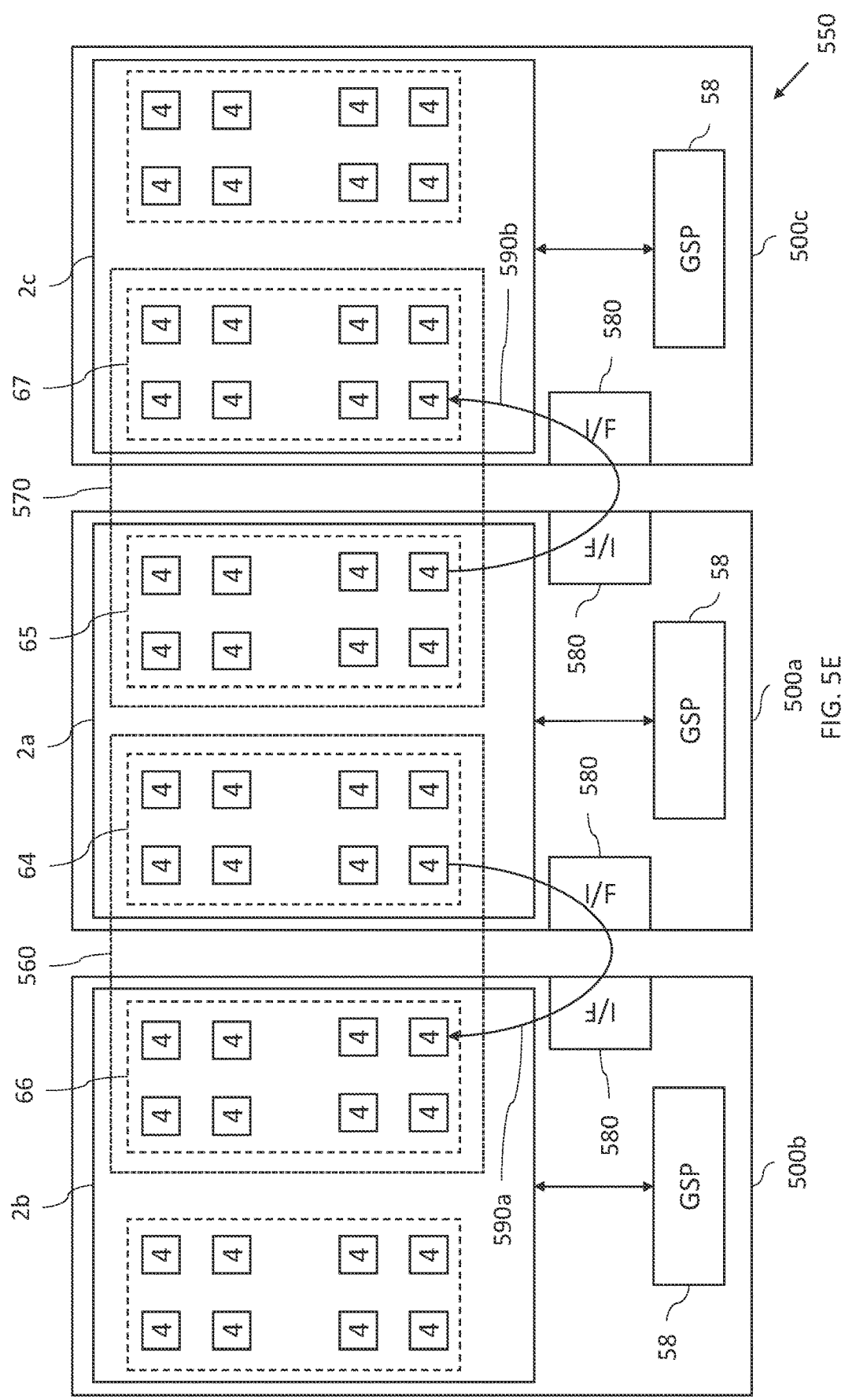
FIG. 5E is a schematic illustration of a system comprising a plurality of integrated circuits, in which tiles on a same integrated circuit are configured to participate in barrier synchronisations with tiles of another integrated circuit.

Reference is made to FIG. 5E, which illustrates an example as to how the tiles 4 of processing unit 2a are split between the first sync group 560 and the second sync group 570. For simplicity, the Figure shows only the tiles 4 (i.e. the first set of tiles 64 and the second set of tiles 65) of the processing unit 2a that belong to these sync groups. FIG. 5E shows a system 550 of chips 500a, 500b, 500c. Each of the chips 500 are connected to one another by interfaces 580, via which they exchange data plane traffic. The interfaces 580 may be interfaces for sending data between the chips 500a, 500b, 500c via PCIe or may be interfaces for sending data over Ethernet.

The GSPs 58 shown in FIG. 5E are connected to one another for the exchange of sync messages (including sync requests and acknowledgments) so as to co-ordinate the external syncs. One or more of the GSPs 58 may be connected to one another via a set of wires (not shown in FIG. 5E), each of which is associated with a type of sync message. For certain sync zones, the GSPs 58 exchange sync messages by asserting signals on the appropriate dedicated wire. Examples of these signals and their transmission over dedicated wires is described in more detail below with reference to FIGS. 8A and 8B. The dedicated wires that are used to exchange signals between the GSPs 58 are distinct from the connections over interfaces 580 used for the exchange of data plane traffic (which takes place, e.g., via PCIe or Ethernet). For other sync zones, the GSPs 58 are configured to exchange sync messages over a packet switched network (e.g. Ethernet). The exchange of sync messages over a packet switched network (e.g. Ethernet) is described in more detail with reference to FIGS. 9A, 9B, 10A, and 10B. In the case that sync messages are sent in packets over a network, these sync message are sent and received over the same interfaces 580 used for the exchange of application data during the exchange phases.

As shown in FIG. 5E, the first sync group 560 comprises the first set of tiles 64 of the processing unit 2a of chip 500a, as well as the third set of tiles 66, which belong to processing unit 2b. To co-ordinate the barrier synchronisation for the first sync group 560, a process is performed to exchange sync requests and acknowledgments between the two chips 500a, 500b. After completing the compute phase for the first sync group 560 and reaching the barrier synchronisation for the first sync group 560, each of the tiles 4 of the first sync group 560 issues a sync request, which is aggregated and provided to that tile's 4 associated GSP 58. In response to receipt of the sync requests, the GSPs 58 exchange between them a sync request and an acknowledgment. The exchange of these sync messages between the GSPs 58 occurs with a given directionality. In other words, the exchange of sync messages participated in by each of the GSPs 58 occurs with a given direction in which a sync message travels with respect to that GSP 58, i.e. whether the sync message is output from that GSP 58 or input to that GSP 58. The directionality of the exchange of the sync request and acknowledgment depends upon which of the two GSPs 58 on chips 500a, 500b is defined as master for the sync zone comprising the first sync group 560, with the sync request being propagated from one GSP 58 to the master GSP 58, which issues the sync acknowledgment back to the other GSP 58.

Following the exchange of the sync messages between the GSPs 58 of the two chips 500a, 500b, each GSP 58 causes sync acknowledgements to be returned to the tiles 4 on its associated chip 500. Each tile 4 of the first sync group 560 receives such a sync acknowledgment and, in response to receipt of that sync acknowledgment proceeds to the exchange phase for the first sync group 560. During the exchange phase for the first sync group 560, data is exchanged between the tiles 4 of processing unit 2a (i.e. the first set of tiles 64) that belong to the first sync group 560 and the tiles 4 of processing unit 2b (i.e. the third set of tiles 66) that belong to the first sync group 560. This data is sent in packets via interfaces 580 between the chips 500a, 500b. An example of such data exchange 590a is shown in FIG. 5E as taking place between a tile 4 of processing unit 2a and a tile 4 of processing unit 2b. However, in practice, data exchange is likely to occur between more than two tiles 4 during the exchange phase for the first synchronisation group 560, and may occur in either direction (i.e. processing unit 2a to processing unit 2b or processing unit 2b to processing unit 2a).

FIG. 5E additionally shows the second sync group 570, which comprises the fourth set of tiles 67 of the processing unit 2c of chip 500c, as well as the second set of tiles 65 belonging to processing unit 2a. A process is performed to exchange, for the barrier synchronisation of the second sync group 570, sync requests and acknowledgments between the two chips 500a, 500b, using the GSPs 58 of the two chips 500a, 500b. After completing the compute phase of the second sync group 570 and reaching the barrier synchronisation of the second sync group 570, each of the tiles 4 of the second sync group 570 issues a sync request, which is aggregated and provided to that tile's 4 associated GSP 58. In response to receipt of the sync requests, the GSPs 58 of the two chips 500a, 500c exchange a sync request and an acknowledgment. The directionality of the exchange of the sync request and acknowledgment depends upon which of the two GSPs 58 on chips 500a, 500c is defined as master for the sync zone comprising the second sync group 570, with the sync request being propagated from one GSP 58 to the master GSP 58, which issues the acknowledgment back to the other GSP 58.

In response to the exchange of the sync messages between the GSPs 58 of the two chips 500a, 500c, each GSP 58 causes sync acknowledgements to be returned to the tiles 4 on its associated chip 500. Each tile 4 of the second sync group 570 receives a sync acknowledgment and, in response to receipt of such a sync acknowledgment proceeds to the exchange phase for the second sync group 570. During the exchange phase for the second sync group 570, data is exchanged between the tiles 4 of processing unit 2a that belong to sync group 570 (i.e. the second set of tiles 65) and tiles 4 of processing unit 2c belonging to sync group 570 (i.e. the fourth set of tiles 67). This data is sent in packets via interfaces 580 between the chips 500a, 500c. An example of such data exchange 590b is shown in FIG. 5E as taking place between a tile 4 of processing unit 2a and a tile 4 of processing unit 2c. However, in practice, data exchange is likely to occur between more than two tiles 4 during the exchange phase for the second synchronisation group 570, and may occur in either direction (i.e. processing unit 2a to processing unit 2c or processing unit 2c to processing unit 2a).

The different sync groups 560, 570, which include tiles 4 of the same processing unit 2a as discussed above, may be referred to as disjoint sync groups. The disjoint sync groups each operate using different sync zones provided across the system 550.

Once the disjoint sync groups have been established, these disjoint sync groups may continue to operate independently with respect to one another for a plurality of compute and exchange cycles.

Figure 6A:
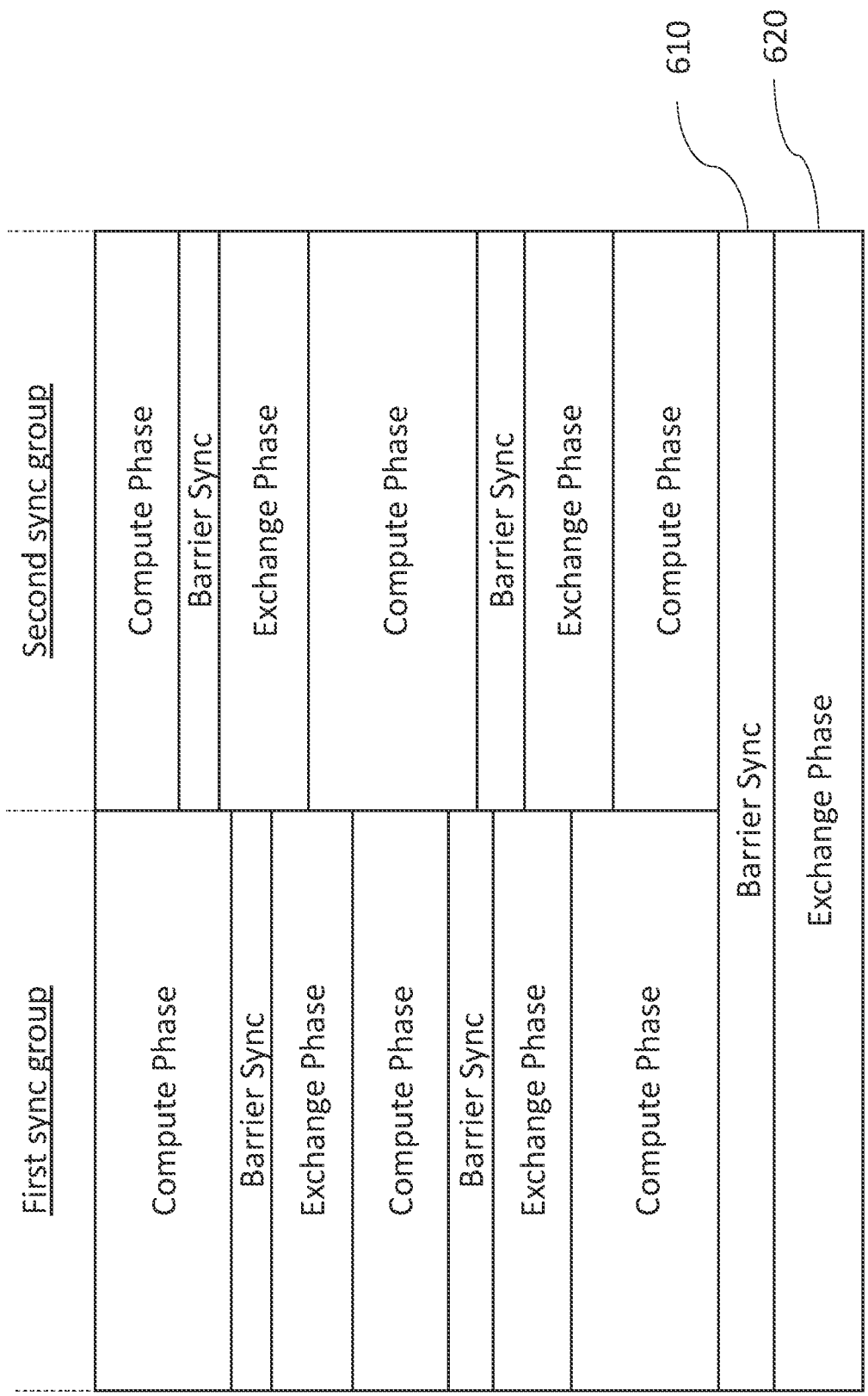
FIG. 6A shows an example of the sync schedule for two different subsets of the tiles of a multi-tile processing unit.

Reference is made to FIG. 6A, which illustrates an example embodiment of compute-exchange cycles for the first set of tiles 64 and for the second set of tiles 65. The left hand column of compute phases, barrier syncs, and exchange phases shows the activity performed for the tiles 4 of processing unit 2a (i.e. the first set of tiles 64) belonging to the first sync group. The right hand column of compute phases, barrier syncs, and exchange phases shows the activity performed for the tiles 4 of processing unit 2a (i.e. the second set of tiles 65) belonging to the second sync group.

As shown, once different sets of tiles 4 in the processing unit 2a have diverged from one another via a synchronisation involving only a subset of the tiles 4 in the processing unit 2a, the tiles 4 continue to operate in their sync grouping. The first set of tiles 64 will continue to operate according to a sync schedule for the first sync group that is asynchronous and independent with respect to the sync schedule for the second sync group. Likewise, the second set of tiles 65 will continue to operate according to a sync schedule for the second sync group that is asynchronous and independent with respect to the sync schedule for the second sync group.

In FIG. 6A, the sync schedule is shown only for the first sync group and the second sync group. However, it would be appreciated that, as discussed above with respect to FIG. 5A, in some embodiments, some of the tiles 4 of the processing unit 2a may not belong to either of the two groupings illustrated in FIG. 6A.

In some cases, it is desirable to change the sync grouping, such that tiles 4 previously belonging to one sync group form a new sync group including tiles 4 that previously belonged to a different sync group. In order for the tiles 4 to change the sync group in which they participate, a barrier sync involving all of the tiles 4 of the processing unit 2a belonging to the previous sync groups that are being dissolved to form the new sync group/s is performed. For instance, in the example of FIG. 6A, it may be required to form one or more new sync groups in which one or more tiles 4 belonging to the first set of tiles 64 (and previously belonging to the first sync group) sync with one or more tiles 4 belonging to the second set of tiles 65 (and previously belonging to the second sync group). In order to do so, a barrier sync is performed between the first set of tiles 64 and the second set of tiles 65. This is shown as barrier sync 610 in FIG. 6A. The barrier sync 610 is an internal barrier sync taking place between all of the tiles 4 belonging to the first set of tiles 64 and all of the tiles 4 belonging to the second set of tiles 65, but not involving tiles 4 on other processing units 2.

Following this barrier sync 610, the tiles 4 of the first set of tiles 64 and the second set of tiles 65 may enter an exchange phase 620 in which data is exchanged between at least some of the tiles 4. However, in some embodiments, the barrier sync 610 may act as a null barrier sync for at least some of these tiles 4, following which, those tiles 4 directly enter a compute phase, rather than first taking part in the exchange phase 620.

The barrier sync 610 acts to reconfigure the sync groupings used for the tiles 4 of the first set of tiles 64 and the second set of tiles 65. Reference is made to FIG. 66, which illustrates an example of how the sync activity for the tiles 4 may progress following the reconfiguration of the sync groupings. In this example, the tiles 4 move into a new phase in which these tiles 4 are divided into new disjoint sync groups immediately following the barrier sync 610 (and optionally exchange phase 620). However, in other examples, several cycles of compute and exchange using a sync group comprising all of the tiles 4 that participated in barrier sync 610 may be carried out before disjoint sync groups are again applied to these tiles 4.

Figure 6B:
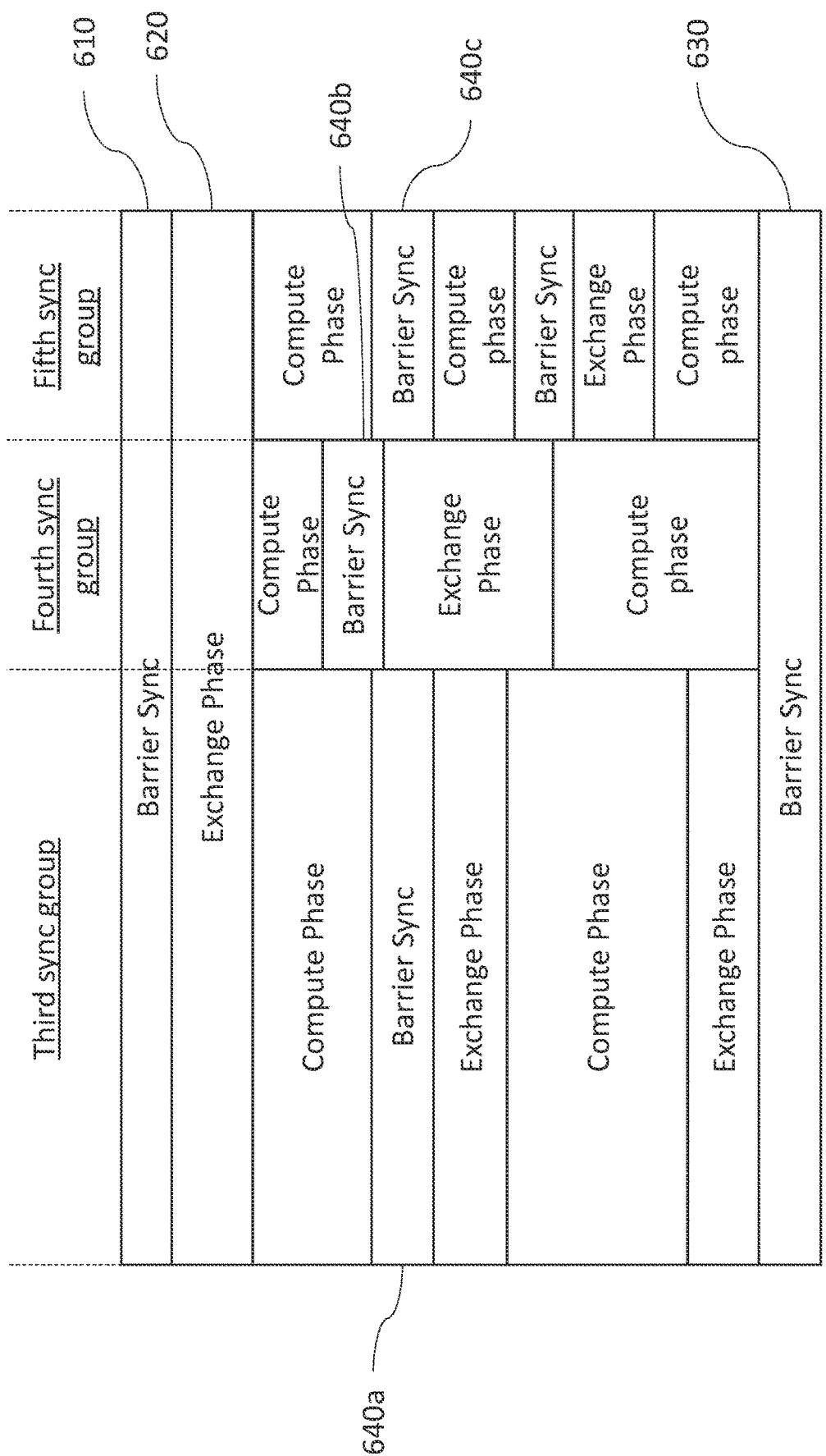
FIG. 6B shows an example of a sync schedule for three different subsets of tiles of a multi-tile processing unit.

As shown in FIG. 6B, following the barrier sync 610, and optionally the exchange phase 620, all of the tiles 4 that participated in the barrier sync 610 enter a compute phase. When each tile 4 finishes its assigned computations for its compute phase, it arrives at a barrier synchronisation. Different barrier syncs are enforced between different groupings of tiles 4. A barrier sync 640a is shown enforced for tiles 4 of processing unit 2a belonging to a third sync group. A barrier sync 640b is shown enforced for tiles 4 of processing unit 2a belonging to a fourth sync group. A barrier sync 640c is shown enforced for tiles 4 of processing unit 2a belonging to a fifth sync group. Each of the third, fourth, and fifth sync groups may also comprise tiles 4 belonging to other processing units 2 or may be limited to tiles 4 of processing unit 2a. These sync groups are the new sync groups into which the tiles 4 of the first set of tiles 64 and the second set of tiles 65 are reorganised following the barrier sync 610.

Each of the tiles 4 of the processing unit 2a operate according to a sync schedule defined for their sync group. The tiles 4 of the first set of tiles 64 and the second set of tiles 65 continue to sync as part of at least three disjoint sync groups until a barrier sync 630 enforced between the tiles 4 of two or more of the disjoint sync groups (in the example of FIG. 6B, the barrier sync 630 is between all of the three disjoint sync groups for which sync schedules are illustrated in FIG. 6B) is reached. At this point, the sync groupings applied for the tiles 4 of the processing unit 2a may be reconfigured again.

Figure 7A:
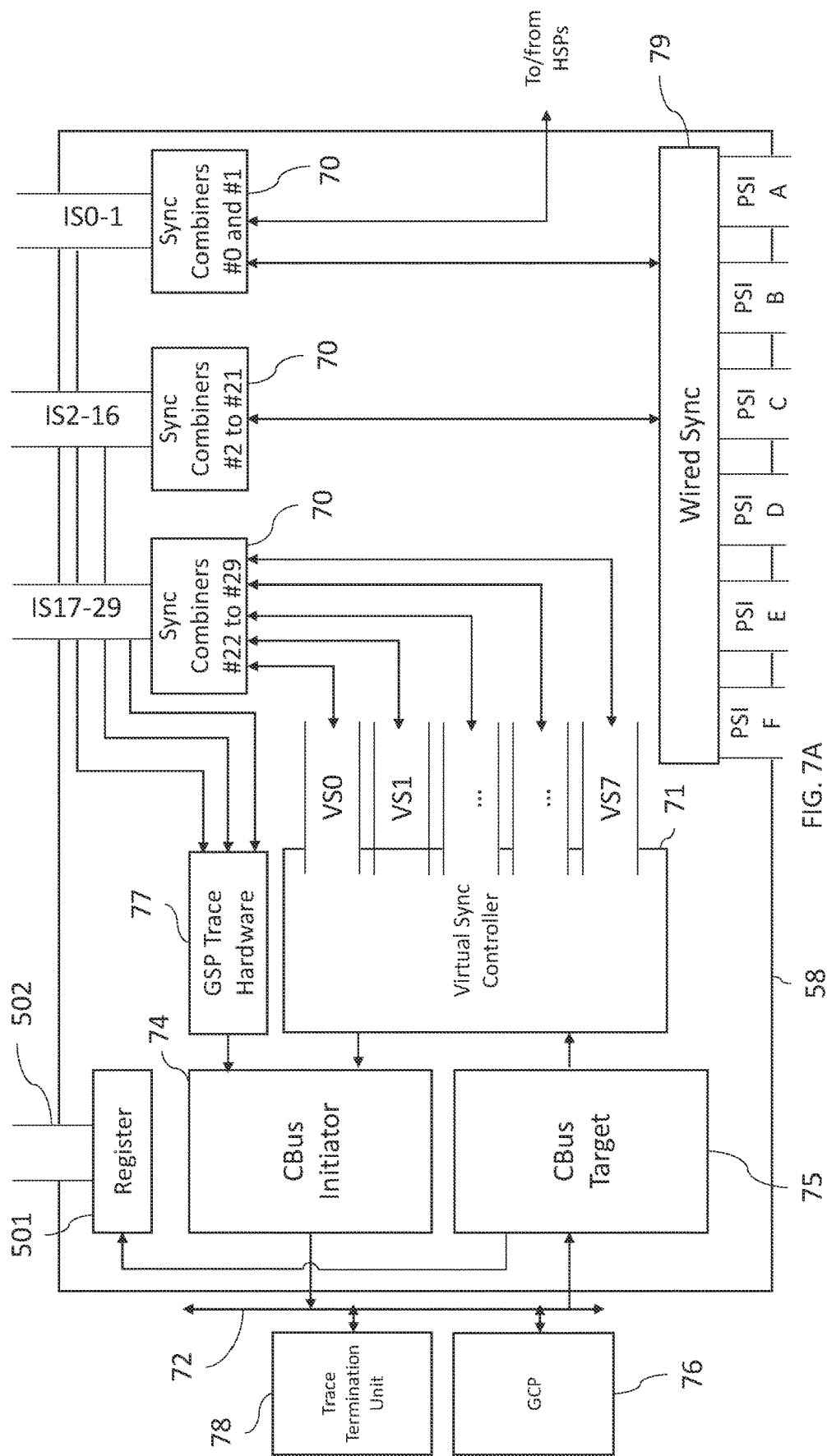
FIG. 7A is a schematic illustration of the circuitry of the external sync controller that is part of an integrated circuit.

Reference is made to FIG. 7A, which illustrates the GSP 58 in more detail. The GSP 58 includes sync combiner circuits 70 that are configured to receive sync requests and either i) acknowledge those sync requests without propagating them (if acting as a sync master for their sync zone) or ii) aggregate those sync requests and transmit them upstream in the sync network (if acting as a sync propagation node). A sync combiner circuit 70 is provided for each of the sync zones supported for the processing unit 2a. In this example, there are 30 sync combiner circuits 70 for the 30 sync zones.

Figure 7B:
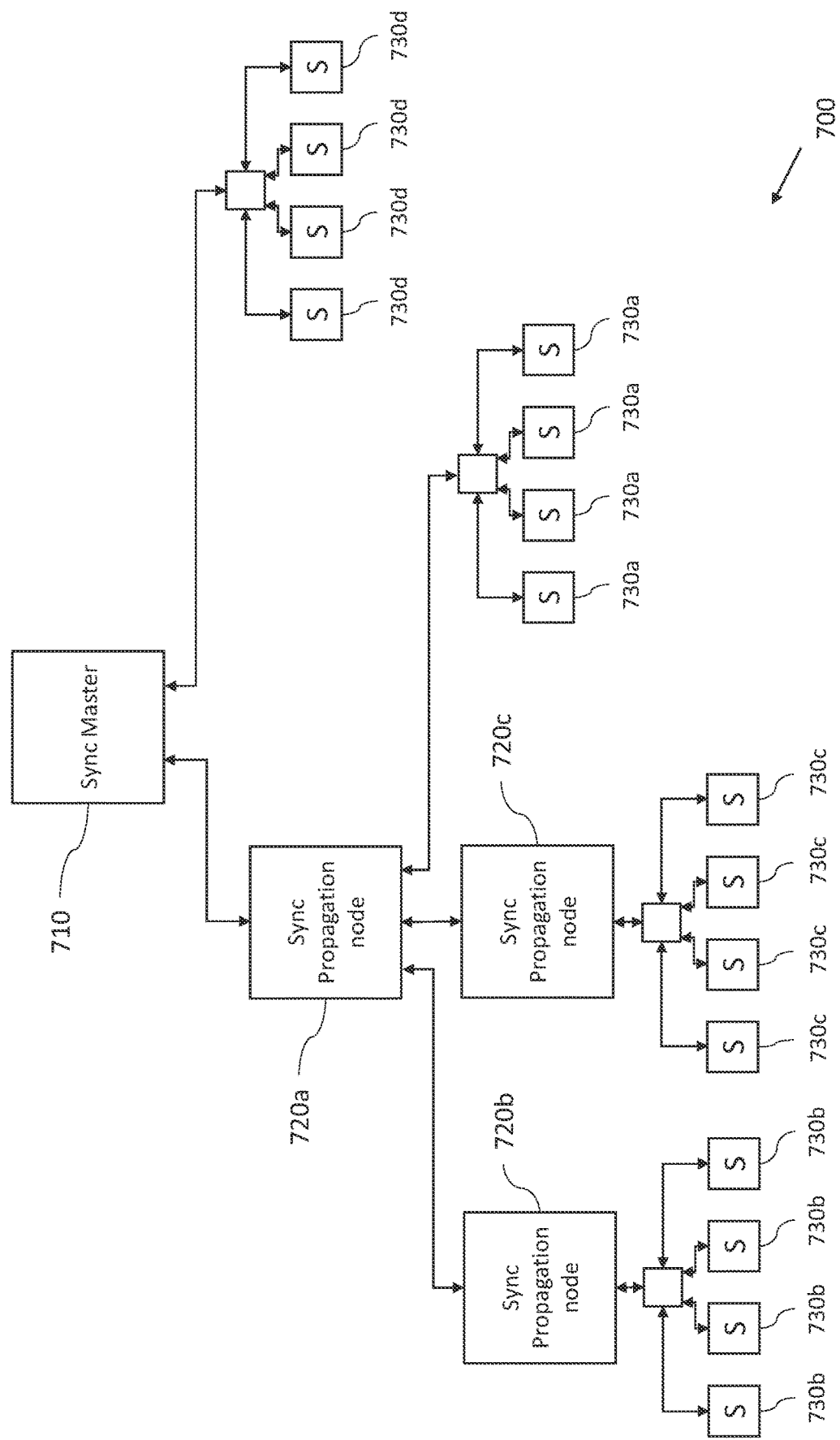
FIG. 7B is an illustration of an example sync network.

To illustrate the concept of a sync network comprising sync master nodes, sync propagation nodes, and slave nodes, reference is made to FIG. 7B, which illustrates an example sync network 700. The sync network 700 includes a sync master 710 and multiple sync propagation nodes 720a, 720b, 720c. In example embodiments, each of the sync master 710 and the sync propagation nodes 720a, 720b, 720c is a sync combiner circuit 70, with each such sync combiner circuit 70 that participates in the sync network 700 belonging to a different GSP 58, but being associated with the same sync zone. The sync network 700 further comprises a plurality of sets of slave nodes 730a, 730b, 730c, 730d from which sync requests originate. The slave nodes 730a, 730b, 730c, 730d together form a sync group defined for the sync network 700. In the embodiments described herein, the tiles 4 function as the slave nodes for a barrier sync. The slave nodes are divided into different sets. For example, there is a first set of slave nodes 730a, a second set of slave nodes 730b, a third set of slave nodes 730c, and a fourth set of slave nodes 730d. In these embodiments, each of the sets of slave nodes 730a, 730b, 730c, 730d are tiles 4 of a different processing unit 2. Each slave node issues a request upstream in the sync network 700. The sync requests from a group of slave nodes are aggregated and provided to a node higher in the sync network.

As shown in FIG. 7B, each of the sync master 710 and the sync propagation nodes 720a, 720b, 720c has an associated downstream set of slave nodes from which it receives an aggregated sync request for each barrier sync. For example, sync propagation node 720a is associated with the first set of slave nodes 730a. In embodiments in which the sync master 710 and sync propagation nodes 720a, 720b, 720c are sync combiners 70, each of the sets of slave nodes are tiles 4 on the same chip 500 as their associated sync combiner 70.

Sync propagation nodes 720b, 720c both receive aggregated sync requests from their associated slave nodes 730b, 730c, but not from other sync propagation nodes. In response to receipt of a sync request from its associated slave nodes 730b, 730c, each sync propagation node 720b, 720c propagates a sync request upstream in the sync network 700 to sync propagation node 720a.

Sync propagation node 720a waits until it receives a sync request from each of its downstream nodes. These downstream nodes comprise the sync propagation nodes 720b, 720c and the set of slave nodes 730a associated with sync propagation node 720a. When sync propagation node 720a has received all of the sync requests from each of its downstream nodes, it issues a sync request to the sync master 710.

The sync master 710 waits until it receives a sync request from each of its downstream nodes. These downstream nodes comprise the sync propagation node 720a and the set of slave nodes 730d associated with the sync master 710. When the sync master 710 has received all of the sync requests from each of its downstream nodes, it issues sync acknowledgments back to the sync propagation node 720a and to the slave nodes 730d.

The sync propagation node 720a, upon receiving a sync acknowledgment from the sync master 710, issues sync acknowledgments to each of the downstream sync propagation nodes 720b, 720c and to its associated slave nodes 730a. Likewise, the sync propagation nodes 720b, 720c, in response to receipt of these sync acknowledgments, each issue sync acknowledgments to their associated slave nodes 730b, 730c. All of the slaves of the sync network 700, in response to receipt of the sync acknowledgments, pass the barrier synchronisation and exchange data during the exchange phase.

The example in FIG. 7B shows a specific arrangement of a sync network 700 in which the sync master 710 receives a sync request from only one downstream sync propagation node 720a. However, in other examples, the sync master 710 may receive sync requests from more than one downstream sync propagation node. Likewise sync propagation node 720a receives sync requests from two downstream sync propagation nodes 720b, 720c, but may receive sync requests from a different number of downstream sync propagation nodes.

Referring back to FIG. 7A, each sync combiner 70 participating in a sync network performs the role of sync master or sync propagation node in the sync network. When a sync combiner 70 acts as a sync propagation node, it transmits sync requests upstream in the sync network towards the sync combiner 70 acting as sync master for the sync zone. The transmission of the sync requests upstream in the sync network comprises transmitting the sync requests to a GSP 58 on another chip 500. When an external barrier synchronisation is reached by tiles 4 on the chip 500a, a sync combiner circuit 70 receives a sync request corresponding to that barrier synchronisation over one of the interfaces IS0-IS29 of the GSP 58. Each one of the interfaces IS0-IS29 is associated with a different sync zone and, therefore, with a different sync combiner 70. The sync request is sent from the processing unit 2a over the one of the interfaces IS0-IS29 associated with the sync zone being used for the barrier synchronisation and is received at the sync combiner circuit 70 associated with that sync zone.

Each of the sync zones associated with a sync combiner circuit 70 may be configured to support syncs for a local sync group—which comprises only tiles 4 of the processing unit 2a—for an internal barrier synchronisation, or may be configured to support syncs for a global sync group—which also comprises tiles 4 of other processing units. The sync zones supported for the processing unit 2a are individually configurable to include different groupings of tiles 4 of the processing unit 2a and different groupings of tiles 4 on one or more other processing units 2. As will be described in more detail, the sync combiners 70 are configurable to propagate sync requests and acknowledgments in a manner appropriate to the sync group defined for their sync zone. This propagation of sync requests and acknowledgments depends upon settings for different ones of the interfaces of the GSP 58.

Each of the sync combiner circuits 70 is able, when its sync zone is configured to define global sync group, to act as a master node or as sync propagation node in the sync network for its associated sync zone.

A sync combiner circuit 70 that is acting as a master node, after receiving all of the sync requests expected, sends sync acknowledgments over all of the interfaces of the GSP 58 from which it received the sync requests. For example, when acting as a master node, a sync combiner circuit 70 receives a sync request from its associated one of the interfaces IS0 to IS29 and provides an acknowledgment over its associated one of the interfaces IS0 to IS29. A sync request from another GSP may be received via the virtual sync controller 71 (in the case that the chip 500 comprising that GSP is accessible remotely over an Ethernet network) or may be received from over one or more of the physical sync interfaces A-F (in the case that the chips 500 comprising those GSPs are accessible locally over a wired sync interface).

When acting as a sync propagation node, a sync combiner circuit 70 is configured to receive a sync request from its associated one of the interfaces IS0 to IS29. The sync combiner circuit 70 may also, depending on its position in the sync network defined for the sync zone associated with the sync combiner circuit 70, receive one or more sync requests from one or more GSPs on one or more other chips 500. A sync request from another GSP may be received via the virtual sync controller 71 (in the case that chip 500 comprising that GSP is accessible remotely over a network) or may be received from over one or more of the physical sync interfaces A-F (in the case that the chips 500 comprising those GSPs are accessible locally over a wired interface).

In at least some example embodiments, virtual syncs (which may also be referred to as external packet-based syncs) are not combined with physical sync (which may also be referred to as external wire based syncs) and, therefore, when sync request/s for a barrier synchronisation are received from another GSP, either i) a single sync request is received at a sync combiner 70 from the virtual sync controller 71 (if the sync is a virtual sync) or ii) one or more sync requests are received at a sync combiner 70 from over one or more of the physical sync interface A-F (if the sync is a physical sync).

A sync combiner 70 acting as a sync propagation node, after receiving all of the sync requests expected, propagates a sync request upstream in the sync network to a GSP on another chip 500. This sync request may be propagated upstream via the virtual sync controller 71 (in the case that chip 500 comprising the GSP that is upstream in the sync network is accessible remotely over a network) or may be sent over one of the physical sync interfaces A-F (in the case that the chip 500 comprising the GSP that is upstream in the sync network is accessible locally over a wired interface).

The sync combiner circuits 70 are shown in FIG. 7A as being divided into different sets. A first set of sync combiner circuits 70 (labelled as sync combiners #0 to #21) are configured to communicate over the physical sync interfaces (PSI A-F) with chips 500 that are accessible locally via a wired connection. Each of the sync combiners #0 to #21 may send and receive sync requests over any of the physical sync interfaces. Each of the sync combiners #0 to #21 may send and receive sync acknowledgments over any of the physical sync interfaces. As will described in more detail, which (if any) of the physical sync interfaces one of the first set of sync combiners is configured to send and receive sync messages over depends upon configuration settings held in the GSP 58.

When acting as a sync propagation node, one of the first set of sync combiners 70, receives a sync request from the processing unit 2a and, optionally, a sync request from zero to five of the sync physical sync interfaces. The physical sync interfaces over which a sync request is received will depend upon the sync network defined for the sync zone with which the sync combiner 70 is associated. In response to receipt of the one or more sync requests, the sync combiner 70 forwards a sync request upstream in the sync network over one of the physical sync interfaces. At a later time, the sync combiner 70 will receive from over the same physical sync interface over which it sent the sync request, a sync acknowledgment. The sync combiner 70 propagates the sync acknowledgment over each of the interfaces (including an interface with the processing unit 2a and any physical sync interfaces) from which it received a sync request.

When acting as a sync master node, one of the first set of sync combiner circuits 70 receives a sync request from the processing unit 2a and a sync request from one to six of the sync physical sync interfaces. The physical sync interfaces from over which a sync request is received will depend upon the sync network defined for the sync zone with which the sync combiner 70 is associated. In response to receipt of the two or more sync requests, the sync combiner 70 acknowledges the sync requests by transmitting sync acknowledgments over each of the interfaces (including an interface with the processing unit 2a and the physical sync interfaces) from over which it received sync requests.

A second set of sync combiner circuits 70 (labelled as sync combiners #22 to #29) are configured to communicate over the virtual interfaces (VS0 to VS7) with chips 500 that are accessible over an Ethernet network. Of the second set of sync combiners 70, each of these sync combiners 70 is associated with a different one of the interfaces (VS0 to VS7) of the virtual sync controller 71. For example, the interface VS0 may be associated with sync combiner circuit #22, the interface VS1 may be associated with sync combiner circuit #23, etc. Each of the sync combiners 70 of the second set of sync combiners 70 is operable to send and receive sync requests over its associated interface with the virtual sync controller 71 and send and receive sync acknowledgments over its associated interface with the virtual sync controller 71. As will be described in further detail, the virtual sync controller 71 enables the exchange of sync requests and acknowledgments between the second set of sync combiners 70 and additional GSPs on other chips 500.

When acting as a master node, one of the second set of sync combiner circuits 70 is configured to receive a sync request from over its associated one of the virtual sync interfaces and a sync request from the processing unit 2a. In response to receipt of these sync requests, the sync combiner circuit 70 transmits sync acknowledgments to the processing unit 2a and over its associated virtual sync interface to the virtual sync controller 71.

When acting as a sync propagation node, one of the second set of sync combiner circuits 70 is configured to receive a sync request from the processing unit 2a. In response to receipt of this sync request, the sync combiner circuit 70 sends a sync request upstream in the sync network over its associated virtual sync interface. Following this, the sync combiner circuit 70 will receive a sync acknowledgment from over its associated virtual sync interface. In response, the sync combiner circuit 70 will propagate a sync acknowledgment downstream to the processing unit 2a.

For controlling the virtual sync interfaces and the physical sync interfaces, one or more control registers (not shown in FIG. 7A) are defined in the GSP 58. The control registers are writable by the GCP 76. Write requests to the control registers are received via the Cbus target 75. The one or more control registers comprise configuration settings associated with each of the virtual sync interfaces and the physical sync interfaces.

The configuration settings comprise an indication for each of the virtual sync interfaces (VS0 to VS7) whether or not that interface is enabled or disabled. The configuration settings comprise an indication of the directionality for each of the virtual sync interfaces (VS0 to VS7). The term 'directionality' as used here refers to the direction in which a sync requests travels with respect to the GSP 58. In other words, the indication of the directionality determines whether the interface passes a sync request to a sync combiner 70 of the GSP 58 from a GSP on another chip 500 or from a sync combiner 70 of the GSP 58 towards a GSP on another chip.

By defining the directionality of the virtual sync interfaces, the configurations settings held in the one or more control registers define whether a particular sync combiner circuit 70 acts as sync propagation node or as a sync master for the sync zone with which it is associated.

The configuration settings also comprise an indication for each of the physical sync interfaces (PSI A-F) whether or not that interface is enabled or disabled. The configuration settings comprise an indication of the directionality for each of the physical sync interfaces (PSI A-F). As with the virtual sync interfaces, the term 'directionality' refers to the direction in which a sync requests travels with respect to the GSP 58. For the physical sync interfaces, the configuration settings registers comprise an indication of the sync zone (if any) with which each of the physical syncs interfaces is associated.

By defining the directionality of the physical sync interfaces and the sync zone with which the physical sync interfaces are associated, the configurations settings held in the one or more control registers control the propagation of sync requests and acknowledgments through the GSP 58. By defining the directionality of the interfaces and (for the physical sync interfaces) the sync zone with which they are associated, the configurations settings held in the one or more control registers define whether a particular sync combiner circuit 70 acts as sync propagation node or as a sync master for the sync network with which it is associated. Each of the first set of sync combiners 70 is operable to propagate a sync request upstream (if acting as propagation node) or issue sync acknowledgments (if acting as a master), after receiving sync requests on all of the physical sync interfaces that are associated with the same sync zone as that sync combiner 70 and for which the directionality indicates that a sync request is to be received at the sync combiner 70 from over that physical sync interface. Each of the first set of sync combiners 70 is operable to propagate a sync request on the physical interface that is associated with the same sync zone as that sync combiner 70 and for which the directionality indicates that a sync request is to be sent from the GSP 58 over that physical sync interface. Each of the first set of sync combiners 70 is operable to propagate a sync acknowledgment on the physical interface that is associated with the same sync zone as that sync combiner 70 and for which the directionality indicates that a sync acknowledgment is to be sent from the GSP 58 over that physical sync interface.

Collectively, the configuration settings in the GSPs across all of the chips 500 supporting the sync zone define the sync network for the sync zone.

As an example, the configurations settings may indicate that a given sync zone (e.g. sync zone 3 that is associated with sync combiner #2) is associated with physical sync interfaces C and E. The configuration settings may additionally indicate that the directionality of physical sync interface C is such that a sync request is received at the GSP 58 on physical sync interface C and passed to a sync combiner 70 (which in this case will be sync combiner #2, since it is associated with the sync zone 3). The configuration settings may further indicate that the directionality of physical sync interface E is such that a sync combiner 70 (which in this case will be sync combiner #2, since that is associated with the sync zone 3) issues a sync request over this interface to be sent to a different chip 500. As a result of the configuration settings, at the barrier synchronisation, the sync combiner #2 receives a sync request from physical sync interface C and a sync request from the processing unit 2a. In response, the sync combiner #2 propagates the sync request upstream in the sync network over the physical sync interface E. At a later time, the sync combiner #2 receives from over physical sync interface E, a sync acknowledgment, which it forwards downstream in the sync network over the physical sync interface C, and also to the processing unit 2a to provide sync acks to all of the tiles 4 on chip 500a belonging to the sync group defined for sync zone 3.

Any of the physical sync interfaces that are enabled may only be associated with a single sync zone at any one time. This means that any of the physical sync interfaces may only carry sync messages for a single sync zone. Configuration settings for each physical sync interface may specify a value of 0 to 22, with values between 1 and 22 identifying one of 22 sync zones with which the respective physical sync interface is associated, and 0 specifying that the physical sync interface is not currently associated with any of the sync zones.

As shown in FIG. 7A, the first set of sync combiner circuits 70 comprises two subsets. A first of the subsets (sync combiners #2 to #21) receives sync requests and, in response, propagates sync requests upstream in the sync network and/or acknowledges them as described above. The second subset (sync combiners #0 to #1) also performs the same actions to propagate sync requests and/or acknowledge them as described above. Additionally, each of the second subset of sync combiners 70 may check and decrement the credits of a host sync proxy module (HSP) prior to propagating (if acting as a propagation node) a sync request upstream in the sync network or (if acting as a sync master) issuing sync acknowledgments downstream in the sync network. The second subset of sync combiners 70 checks the HSP to determine if host involvement is required for the sync. Whether or not host involvement is required by the sync combiner circuit 70 is determined in dependence upon state information received from the processing unit 2a with the sync request. The use of the HSP is described in more detail in our earlier U.S. patent application Ser. No. 15/886,065, which is incorporated by reference.

Since, as has been described, the processing unit 2a is operable to participate in multiple different global sync groups simultaneously, the sync propagation operations described above as being performed by different sync combiner circuits 70 may overlap in time. For example, as described, the physical sync interfaces C and E may be associated with sync zone 3 and be configured to propagate sync requests/acks from sync combiner #2. At the same time, one or more other physical sync interfaces may be associated with a different sync zone and be configured to propagate sync requests/acknowledgments to/from the sync combiner circuit 70 associated with that other sync zone.

Also shown in FIG. 7A, is the register 501 of the GSP 58. This register 501 stores configuration information defining whether each sync zone is configured as internal or as external. These indications are provided over the interface 502 to the IPU sync controller 55 and are used by the IPU sync controller 55 to determine whether or not to acknowledgment a sync request originating from the tiles 4 of the processing unit 2a to which it belongs. The register 501 is writable by writes received from over the control bus 72. These writes may originate from software running, for example, on the host system.

The transmission of sync messages will now be described in more detail. The sync requests are transmitted and acknowledged according to a protocol referred to as a sync handshake. The sync handshake takes place between each of the nodes in the sync network that exchange sync messages.

The sync handshake makes use of two distinct signals, one of which is used to indicate whether or not a sync request is asserted and the other of which is used to indicate whether or not a sync acknowledgment is asserted. The signals may be transmitted along separate wires or by storing information in dedicated bits of a register. For example, a sync request signal may be transmitted on a wire between a tile 4 and a sync aggregation circuit 56 as shown in FIG. 5C. The aggregated sync request generated at circuit 56 may be sent on a wire between the circuit 56 and the GSP 58. The sync request signal, when received at a sync combiner circuit 70 of the GSP 58, is either propagated upstream in the sync network (e.g. to the virtual sync controller 71 or over one of the physical sync interfaces) or is acknowledged. Likewise, a sync acknowledgment signal may be transmitted on a wire between the GSP 58 and the sync distribution circuit 57, before being distributed over wires between the sync distribution circuit 57 and each of the tiles 4.

Figure 8A:
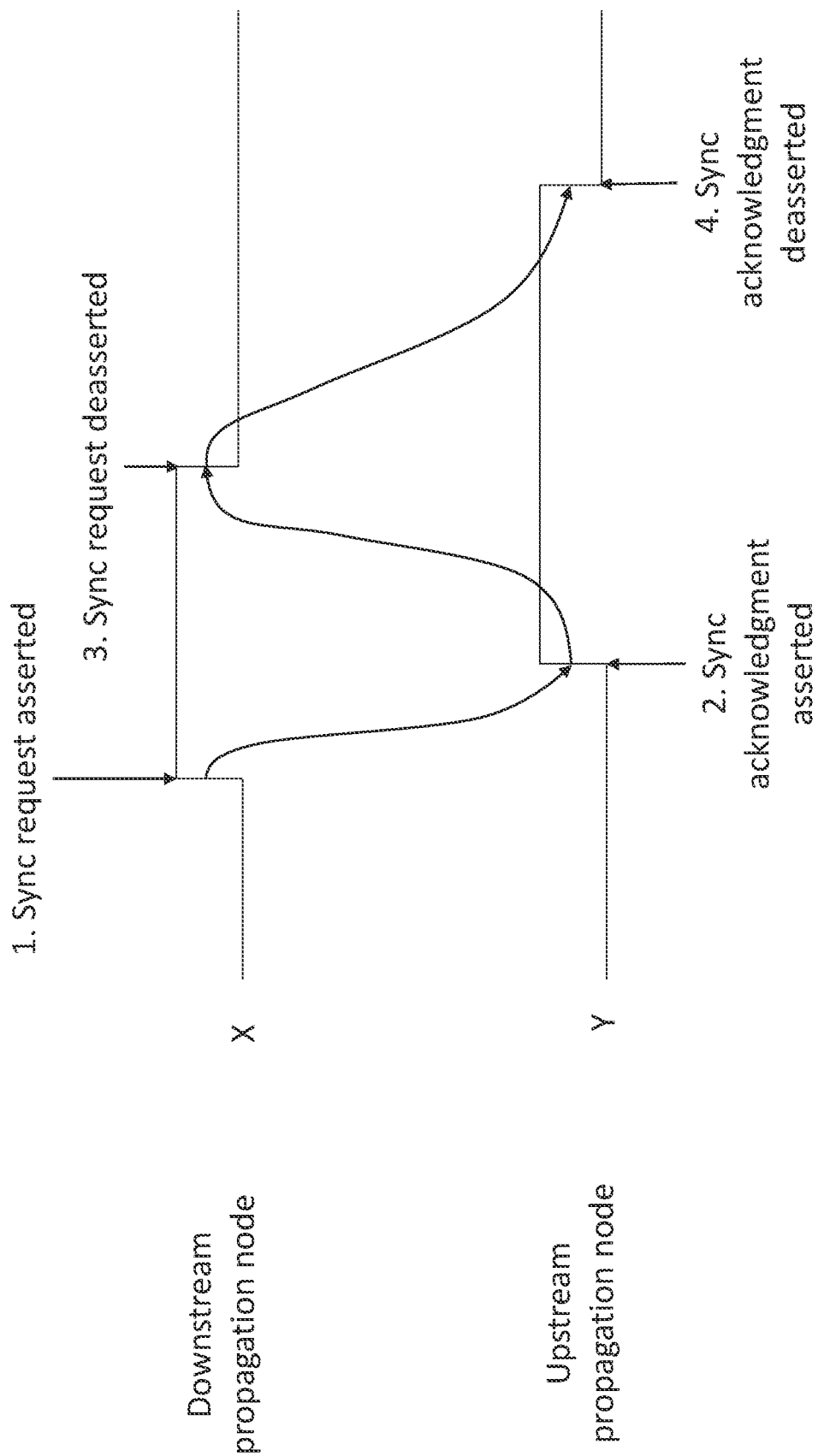
FIG. 8A illustrates an example embodiment of the sync handshake mechanism.

Reference is made to FIG. 8A, which illustrates an example of a sync handshake between a downstream propagation node and an upstream propagation node in the sync network. The upstream propagation node may, for example, be the virtual sync controller 71, with the downstream propagation node being one of the sync combiners 70 (e.g. sync combiners #22 to #29) for interfacing with the virtual sync controller 71. Alternatively, the upstream propagation node could be the sync combiner 70, with the virtual sync controller 71 being the downstream propagation node.

The sync request signal is labelled in FIG. 8A as 'X', whereas the sync acknowledgement signal is labelled as Y. At the start of the sync handshake, the downstream propagation node asserts the signal request signal (shown as 1. sync request asserted). This causes a sync request to be detected at the upstream propagation node. The upstream propagation node will keep the signal asserted until it receives an acknowledgment. In effect, the upstream propagation node stalls until it receives a sync acknowledgment. The upstream propagation node, in response to the sync request, asserts the sync acknowledgment signal (shown as 2. sync acknowledgment asserted). This causes a sync acknowledgment to be detected at the downstream propagation node. The downstream propagation node, in response to the sync acknowledgment, deasserts the sync request signal (shown as 3. sync request deasserted). The upstream propagation node detects that the sync request signal has been deasserted and, in response to the deassertion of the sync request signal, deasserts the sync acknowledgment signal (shown as 4. sync acknowledgment deasserted). With the sync acknowledgment signal deasserted, the sync handshake between the two nodes of the sync network is then complete.

In some embodiments of this mechanism, the sync interface is configured to transmit four distinct signals. The four signals are labelled here as X0, X1, Y0, and Y1. One of the devices is configured to control the assertion of two of the signals (i.e. the Y signals) in one direction over the interface, whilst the other of the devices is configured to control the assertion of two of the signals (i.e. the X signals) in the other direction over the interface. Either of the X signals may be asserted to convey a sync request upstream in the sync network towards the sync master defined for the sync network. Either of the Y signals may be asserted to convey a sync ack downstream in the sync network towards the sync slaves for the sync network.

The use of two distinct signals for both directions allows additional information to be conveyed across the sync interface. This additional information comprises the exit state, which has been discussed above. Table 1 illustrates the meaning of the assertion of different ones of the signals.

TABLE 1

| X1/Y1 | X0/Y0 | Meaning |
|---|---|---|
| 0 | 0 | No sync/ack active |
| 0 | 1 | Sync/ack with exit state 0 |
| 1 | 0 | Sync/ack with exit state 1 |
| 1 | 1 | Illegal |

As shown in table 1, the assertion of anyone of the signals may be used to propagate either a sync request or a sync acknowledgment. If X0 is asserted, a sync request with an exit state of 0 is propagated from one sync propagation node to another. If X1 is asserted, a sync request with an exit state of 1 is propagated from one sync propagation node to another. If Y0 is asserted, a sync acknowledgment with an exit state of 0 is propagated from one sync propagation node to another. If Y1 is asserted, a sync acknowledgment with an exit state of 1 is propagated from one sync propagation node to another.

Reference is made to FIG. 8B, which illustrates an example of the propagation of sync requests and acknowledgements using the sync handshake mechanism in which additional information is conveyed with the sync request and acknowledgment. The Figure illustrates the propagation of a sync request from a downstream propagation node to an upstream propagation node, and the return of a corresponding sync acknowledgment. In this case, since the sync request signal X0 is asserted and the sync acknowledgment signal Y0 is asserted, the exit state associated with both sync request and sync acknowledgment is zero.

The sync request and sync acknowledgment signals (exemplified in FIGS. 8A and 8B) are transmitted between some of the sync propagation nodes over a set of wires, with at least one of the wires being dedicated for transmitting a sync request and at least one of the wires being dedicated for transmitting a sync acknowledgment. In the GSP 58 shown in FIG. 7A, each of the interfaces IS0-IS29 comprises one of the sets of wires for transporting the sync request/acknowledgment signals between a sync combiner circuit 70 and the processing unit 2a. Likewise, each of the physical sync interfaces PSI A-F comprises one of the sets of wires for transporting the sync request/acknowledgment signals between a sync combiner circuit 70 and a sync combiner circuit of another chip 500. As discussed, in embodiments, exit state is provided for a subset (e.g. 8) of the sync zones. Therefore, in such embodiments, the syncs are transmitted for that subset of sync zones using the handshake mechanism illustrated in FIG. 86, whereas the syncs are transmitted for the other sync zones using the handshake mechanism illustrated in FIG. 8A. The exit state information may be included with the sync requests and acknowledgments for sync zones 1 to 8 (for which sync requests/acknowledgments for external barrier synchronisations are sent over the physical sync interfaces). The virtual sync interfaces VS0-VS7 may convey sync messages according to the handshake mechanism illustrated in FIG. 8A.

In order to extend the sync handshake over a packet switched network, packets representing sync requests or acknowledgments are generated in response to the assertion of the dedicated signals representing sync request or acknowledgments. This enables conversion from sync messages represented by signals asserted on dedicated items of hardware (e.g. wires) to sync messages represented by data packets. A second sync propagation circuit is configured to detect a change in one or more of the signals received from a first sync propagation circuit and, in response to the detected change, cause a packet to be dispatched over a network, where the packet indicates either a sync request or an acknowledgment to a sync request as represented by the change in the one or more of the signals. The packet that is dispatched over the network contains a status indication for each of the signals. This allows a sync propagation circuit receiving the packet to extract from the packet, the status indication for each of the signals and to propagate a sync request/acknowledgment by asserting signals on the dedicated items of hardware as appropriate.

Figure 9A:
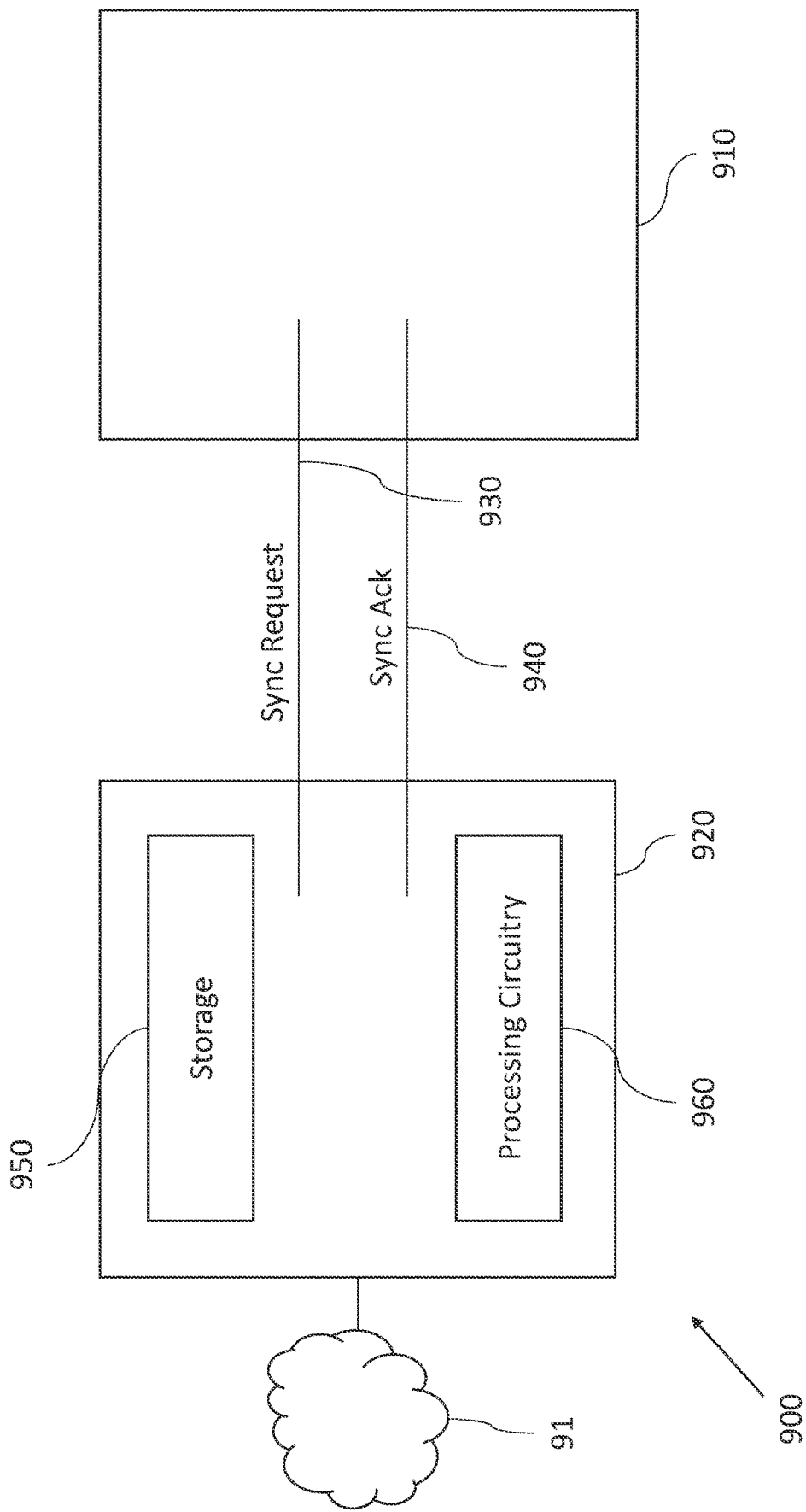
FIG. 9A illustrates a generic example of circuitry for converting dedicated sync signals to sync packets.

Reference is made to FIG. 9A, which illustrates an example of an apparatus for converting between dedicated signals and packets. The apparatus 900 includes a first sync propagation circuit 910 and a second sync propagation circuit 920. The second sync propagation circuit 920 includes processing circuitry 960 for performing the operations described herein as being performed by the second sync propagation circuit 920. The processing circuitry 960 may comprise a processor configured to execute computer readable instructions to perform at least some of these operations. The processing circuitry 960 implements a finite state machine. The processing circuitry 960 may comprise a field programmable gate array (FPGA) or application specific integrated circuit (ASIC) to perform at least some of these operations.

An interface between the first sync propagation circuit 910 and the second sync propagation circuit 920 comprises a first wire 930 and a second wire 940. The first wire 930 connecting the first sync propagation circuit 910 to the second sync propagation circuit 920 is shown in FIG. 9A. The first wire 930 is configured to provide a sync request signal between the first sync propagation circuit 910 and the second sync propagation circuit 920. The first sync propagation circuit 910 may send a sync request to the second sync propagation circuit 920 by asserting a signal on the wire 930. The second sync propagation circuit 920 may send a sync request to the first sync propagation circuit 910 by asserting a signal on the wire 930. The direction in which the sync request is sent depends upon the directionality of the interface.

The second wire 940 connecting the first sync propagation circuit 910 to the second sync propagation circuit 920 is also shown in FIG. 9A. The second wire 940 is configured to provide a sync acknowledgment signal between the first sync propagation circuit 910 and the second sync propagation circuit 920. The first sync propagation circuit 910 may send a sync acknowledgment to the second sync propagation circuit 920 by asserting a signal on the wire 940. The second sync propagation circuit 920 may send a sync acknowledgment to the first sync propagation circuit 910 by asserting a signal on the wire 940. The direction in which the sync acknowledgment is sent depends upon the directionality of the interface.

The second sync propagation circuit 920 maintains a storage 950 for storing status information of the sync request and sync acknowledgments. The storage 950 is updated when the signals on wires 930, 940 are updated by the first sync propagation circuitry 910. When the first sync propagation circuitry 910 asserts the sync request signal, the second sync propagation circuitry 920 updates the storage 950 to indicate that the sync request signal is asserted. When the first sync propagation circuitry 910 deasserts the sync request signal, the second sync propagation circuitry updates the storage 950 to indicate that the sync request signal is deasserted. When the first sync propagation circuitry 910 asserts the sync acknowledgment signal, the second sync propagation circuitry 920 updates the storage 950 to indicate that the sync acknowledgment signal is asserted. When the first sync propagation circuitry 910 deasserts the sync acknowledgment signal, the second sync propagation circuitry 920 updates the storage 950 to indicate that the sync acknowledgment signal is deasserted.

When the first sync propagation circuit 910 asserts or deasserts one of the signals on either of the wires 930, 940, the second sync propagation circuitry 920 responds by dispatching a packet over network 91, where the packet comprises an indication of the updated status of the signals on the wires 930, 940. This allows the packet to indicate one of: a sync request, a sync acknowledgment, deassertion of a sync request or deassertion of a sync acknowledgment. The packet is dispatched over network 91 to another device belonging to the same sync zone.

The second sync propagation circuit 920 may receive from network 91, a packet indicating a status change in sync request/acknowledgment signals on another device. In this way a packet may represent a sync request/acknowledgment sent over the network 91. In response to receipt of the packet, the second sync propagation circuitry 920 records the status update from the packet in the storage 950. The second sync propagation circuitry 920 asserts signals over the wires 930, 940 in dependence upon the status update indicated in the packet. For example, if the packet indicates that a status of a sync request is asserted, the second sync propagation circuitry 920 asserts the sync request signal on the wire 930. If the packet indicates that a status of a sync request is deasserted, the second sync propagation circuitry 920 deasserts the sync request signal on the wire 930. If the packet indicates that a status of a sync acknowledgment is asserted, the second sync propagation circuitry 920 asserts the sync request signal on the wire 940. If the packet indicates that a status of a sync acknowledgment is deasserted, the second sync propagation circuitry 920 deasserts the sync acknowledgment signal on wire 940.

A first example embodiment in which the sync conversion process is performed will now be described. In this example, the sync conversion process is performed by the GSP 58 and the GCP 76 discussed above with respect to FIG. 7A. In this first example embodiment, the first sync propagation circuitry 910 comprises a sync combiner circuit 70, whereas the second sync propagation circuitry 920 comprises the virtual sync controller 71 and the GCP 76.

When one of the first set of sync combiner circuits 70 has a sync request or sync acknowledgement to issue to the virtual sync controller 71, the sync combiner circuit 70 asserts one of the signals representing the sync request or acknowledgment on the one of the virtual sync interfaces VS0 to VS7.

The virtual sync controller 71 comprises storage for storing a plurality of register bits for indicating the assertion of a sync request/acknowledgment on an associated one of the virtual sync interfaces. As will be described, the storage also stores a set of register bits, which may be set to indicate the receipt over the network of a sync request/acknowledgment for an associated sync zone. Table 2 illustrates the register bits. The bits labelled VSOUT22-29 indicate receipt of a sync request/acknowledgment at the virtual sync controller 71 from a sync combiner 70. The bits labelled VSIN22-29 indicate receipt of a sync request/acknowledgment at the chip 500a from over network 91.

TABLE 2

| Virtual Sync Interface Data Input Register | Virtual Sync Interface Data Register |
|---|---|
| VSIN22 | VSOUT22 |
| VSIN23 | VSOUT23 |
| VSIN24 | VSOUT24 |
| VSIN25 | VSOUT25 |
| VSIN26 | VSOUT26 |
| VSIN27 | VSOUT27 |
| VSIN28 | VSOUT28 |
| VSIN29 | VSOUT29 |

Figure 9B:
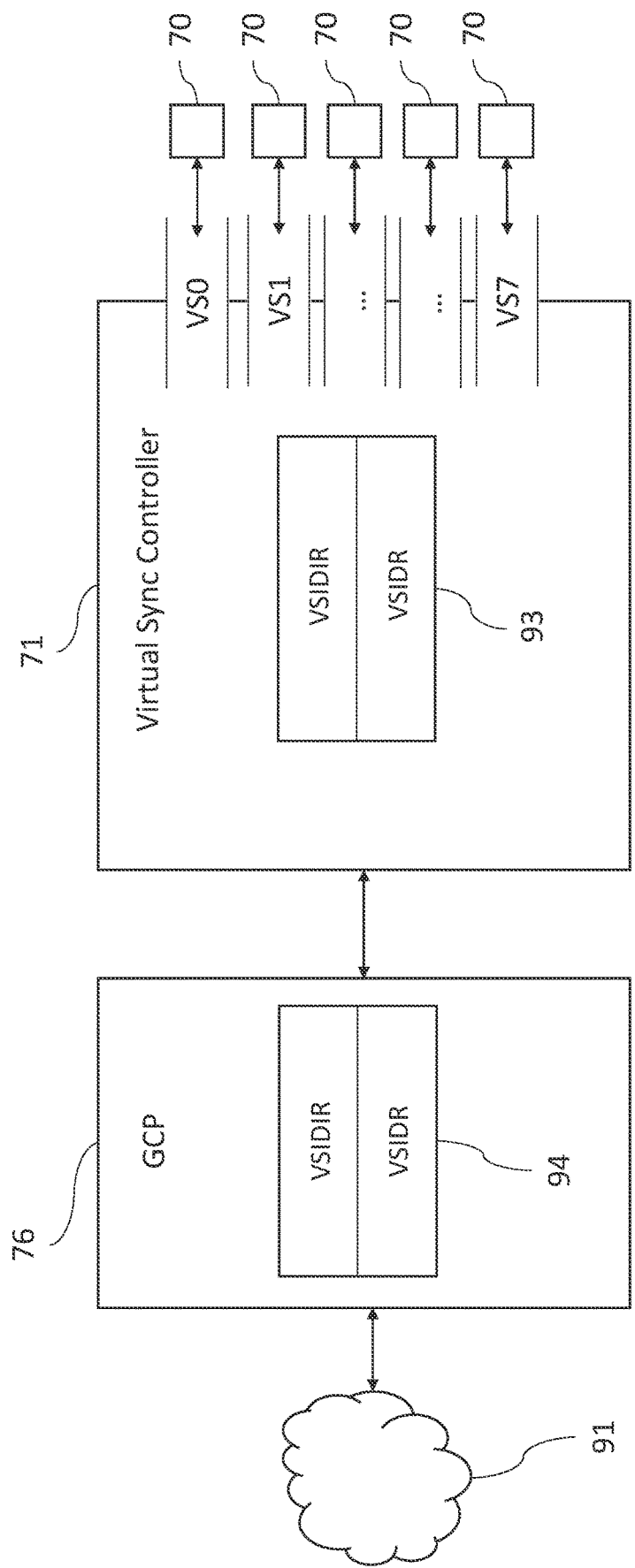
FIG. 9B illustrates a first example embodiment of circuitry for converting between dedicated sync signals on an interface and sync packets.

Reference is made to FIG. 9B, which illustrates the apparatus on the chip 500a for converting from the sync request/acknowledgment handshake signals on dedicated hardware to the sync packets and vis versa. As shown the virtual sync controller 71 includes storage 93 for storing the register bits shown in Table 2. The storage 93 is shown as including two registers, labelled as the Virtual Sync Interface Data Input Register (VSIDIR), which holds the VSIN bits, and the Virtual Sync Interface Data Register (VSIDR), which holds the VSOUT bits.

The values of the VSIN bit and VSOUT bits provide the current state of the virtual sync interfaces. Each of the VSIN bits and VSOUT bits has a default value (e.g. 0), which represents the status when no sync request or sync acknowledgment is asserted for its corresponding sync zone. Each of the VSIN bits and VSOUT bits may be set (e.g. to 1) in indicate that a sync request or acknowledgment is asserted. Each of the VSIN and VSOUT bits is restored to its default value in response to deassertion of the sync request or acknowledgment that caused it to be set.

The global communications proxy (GCP) 76 is shown in FIG. 9B. The GCP 76 interfaces with the packet switched network 91 and is configured to send packets over the network 91 for receipt at another chip 500 and to receive packets over the network 91 from another chip 500. The packets that the GCP 76 is configured to send and receive include sync message packets for conveying sync requests and sync acknowledgments over the network 91 between chips 500.

The GCP 76 also comprises a storage 94 for storing the register bits shown in Table 2. The register bits held in storage 94 are mirrors of the register bits held in storage 93. Whenever the virtual sync controller 71 sets one of the VSOUT bits in storage 93 in response to a sync request/acknowledgment received on one of its virtual sync interfaces VS0 to VS7, it issues a write request to the GCP 76. This write request may be sent over the CBUS 72 via the CBUS initiator 74, which is illustrated in FIG. 7A. The GCP 76 receives the write request from the virtual sync controller 71 and causes the same VSOUT bit held in its storage 94 to be set to indicate that the sync request/acknowledgment has been received at the virtual sync controller 71.

Following update of the storage 94, the GCP 76 causes a packet to be dispatched over the network 91. The packet comprises a status indication indicating that the relevant VSOUT bit has been set to indicate that a sync request/acknowledgment signal for that sync zone has been asserted. The packet is dispatched to another chip 500. The chip 500 to which the GCP 76 dispatches the packet depends upon the sync zone with which the VSOUT bit that was set is associated.

To determine the address to which the sync message packet it is be dispatched, the GCP 76 stores a table indicating a MAC address for each of the virtual sync zones. For each virtual sync zone, the MAC address is the MAC address of the other chip 500 comprising tiles 4 belonging to the sync group defined for that sync zone. In response to receipt of the write from the virtual sync controller 71 to containing the updated VSOUT bit, the GCP 76 looks up the MAC address for the Chip 500 belonging comprising tiles 4 belonging to the sync group defined for the sync zone associated with the VSOUT bit. The GCP 76 dispatches the packet to that chip 500 with the determined MAC address. The packet contains an indication (in the form of the updated value of the VSOUT) that a sync request/acknowledgment has been received at the virtual sync controller 71 and an indication of the sync zone, with which that sync request/acknowledgment is associated. When the packet is received at the other chip 500, the packet causes a VSIN bit in storage of that other chip 500 to be set to the same value at the VSOUT bit indicated in the packet. This VSIN bit that is set is associated with the same sync zone as the VSOUT bit. Thus, there is a reversal of directionality across the network 91, since an update to a VSOUT bit on one chip 500 causes an update to a corresponding VSIN bit on another chip 500.

The GCP 76 is configured to also receive packets containing sync messages from the network 91. The sync messages represent sync requests or sync acknowledgments (in the form of an updated value of a VSOUT bit held in the other chip 500) issued by corresponding circuitry on another chip 500. Such packets contain an indication of the sync zone with which the sync request or acknowledgement is associated. In response to receipt of a packet representing such a sync message, the GCP 76 sets one of the VSIN bits in its storage 94 that is associated with the same sync zone as the sync request/acknowledgment. After setting the bit, the GCP 76 dispatches to the virtual sync controller 71 a write request to update the corresponding bit in the storage 93 of the virtual sync controller 71.

In response to receipt of the write request, the virtual sync controller 71 updates the corresponding VSIN bit in its storage 93. The virtual sync controller 71 then dispatches a sync request/acknowledgment over one of its virtual sync interfaces VS0 to VS7 that is associated with same sync zone as the VSIN bit updated in its storage 93. The sync request/acknowledgment is sent to one of the sync combiners 70 by asserting a signal on the appropriate wire of this virtual sync interface.

As described, the setting of the VSOUT and VSIN bits can be used to represent either a sync request or a sync acknowledgment. Whether a VSOUT bit or VSIN bit represents a sync request or a sync acknowledgment is dependent upon the directionality of the virtual sync interface on which the sync request/acknowledgment is received. The directionality is dependent upon configuration settings held in the GSP 58, and defines whether a sync request or a sync acknowledgement is propagated from a sync combiner 70 to the virtual sync controller 71 over the relevant virtual sync interface. In other words, the configuration setting define for the sync zone associated with the VSOUT or VSIN whether sync requests or sync acknowledgments are sent from the GSP 58 to the other chip 500.

In the case in which the directionality of a virtual sync interface is such that sync requests are sent from the sync combiner 70 to the virtual sync controller 71 (i.e. sync requests for the associated sync zone are sent from the GSP 58 to the other chip 500), the setting of a VSOUT bit associated with that virtual sync interface indicates that a sync request has been received on the relevant virtual sync interface. In the case in which the directionality of a virtual sync interface is such that sync requests are sent from the virtual sync controller 71 to the sync combiner 70 (i.e. sync requests for the associated sync zone are received at the GSP 58 from the other chip 500), the setting of a VSOUT bit associated with that virtual sync interface indicates that a sync acknowledgment has been received on the relevant virtual sync interface.

The configuration settings indicating the directionality of the interface are used by the virtual sync controller 71 to determine whether a sync request or a sync acknowledgment should be sent to a sync combiner 70 over a virtual sync interface in response to the setting of a VSIN bit. When, in response to a sync message packet received at the chip 500a, the virtual sync controller 71 sets one of its VSIN bits to indicate that a sync request/acknowledgment is received at the chip 500a, the virtual sync controller 71 determines whether to interpret the sync message as a sync request or a sync acknowledgment in dependence upon the configuration settings associated with the virtual sync interface for the sync zone indicated by the sync message packet. If the configuration settings indicate that the directionality of the virtual sync interface for the sync zone is such that sync requests are propagated from the virtual sync controller 71 to the combiner 70 (i.e. sync requests for the associated sync zone are received at the GSP 58 from the other chip 500), then the sync message packet is interpreted as a sync request, and a sync request is asserted on a sync request wire of the virtual sync interface. If the configuration settings indicate that the directionality of the virtual sync interface for the sync zone is such that sync requests are propagated from a sync combiner 70 to the virtual sync controller 71 (i.e. sync requests for the associated sync zone are sent from the GSP 58 to the other chip 500), then the sync message is interpreted as a sync acknowledgment and, consequently, a sync acknowledgment is asserted on a sync acknowledgment wire of the virtual sync interface.

In at least some example embodiments, a sync message packet that is dispatched over the network 91 in response to a change in a VSOUT bit in storage 94 contains the values of all of the VSOUT bits held in the storage 94 (rather than only the value of the VSOUT bit that has changed).

Figure 10A:
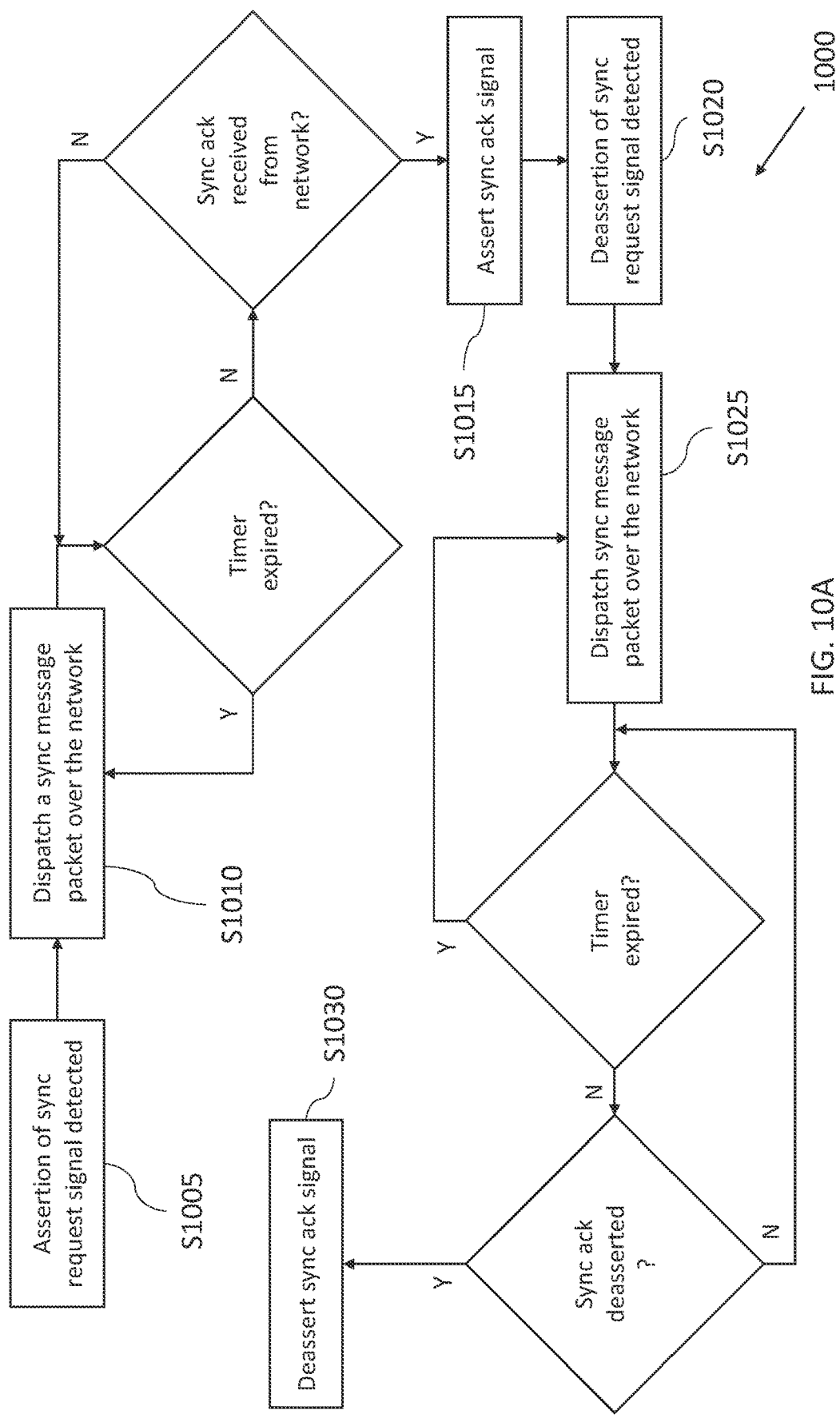
FIG. 10A illustrates an example embodiment of a method implemented in a downstream sync node for performing a sync handshake.

Reference is made to FIG. 10A, which illustrates an example of a method 1000 that may be implemented on chip 500a to perform a sync handshake between the chip 500a and another chip 500. In this example, the GSP 58 of the chip 500a acts as a sync propagation node and issues a sync request over the network to the other chip 500, in response to which it receives a sync acknowledgment from the other chip 500.

At S1005, a signal is asserted on a sync request wire of a virtual sync interface. The assertion of this signal is detected by the virtual sync controller 71, which updates the corresponding VSOUT bit to indicate an asserted sync request and dispatches a write of the updated VSOUT bit to the GCP 76.

At S1010, the GCP 76 dispatches a packet over the network 91 to the other chip 500. The packet contains the updated VSOUT bit, including an indication of the sync zone with which the VSOUT bit is associated.

In some embodiments, packets are dispatched over the network 91 according to a lossy protocol (e.g. Ethernet) in which reliable transmission is not guaranteed by the protocol. Therefore, in order to ensure reliability of transmission of the packet sent at S1010 over the network 91, a timer is set in the GCP 76. If the timer expires prior to receipt of a sync acknowledgment from the other chip 500, then the packet sent at S1010 is resent. The sync acknowledgment from the other chip 500 takes the form of a packet for setting the VSIN bit (in storage 94) associated with the same sync zone as the VSOUT bit that was updated at S1005. In response to such a packet, the GCP 76 updates its copy of that VSIN bit and transmits a write to the virtual sync controller 71, causing the virtual sync controller 71 to update its copy of the same VSIN bit.

At S1015, in response to the update of the VSIN bit, a sync acknowledgment signal is asserted by the virtual sync controller 71 on a wire connected to a sync combiner 70. The sync acknowledgment signal is asserted on the virtual sync interface associated with the same sync zone as the VSIN bit.

At S1020, the virtual sync controller 71 detects the deassertion of the sync request signal that was asserted at S1005. In response, the virtual sync controller 71 updates the VSOUT bit that was set (e.g. to 1) at S1005. At S1020, this VSOUT bit is restored to its default value (e.g. zero) indicating no sync request or ack is asserted by the corresponding sync combiner 70. The virtual sync controller 71 sends a write request to write this updated value for the VSOUT bit to the storage 94 of the GCP 76.

At S1025, the GCP 76 dispatches a packet over the network 91 to the other chip 500. The packet contains the updated VSOUT bit set at S1020, including an indication of the sync zone with which the VSOUT bit is associated.

As with the packet dispatched at S1010, a timer is set in the GCP 76 when the packet is dispatched at S1025. This is done so as to ensure reliability of transmission of the packet. If the timer expires prior to receipt of a packet from the other chip 500 deasserting the sync acknowledgment from the other chip 500, then the packet sent at S1025 is resent. The packet deasserting the sync acknowledgment takes the form of a packet for updating the VSIN bit, which was set (e.g. to 1) by the sync acknowledgment received previously, to its default value. In response to such a packet, the GCP 76 updates its copy of that VSIN bit and transmits a write to the virtual sync controller 71, causing the virtual sync controller 71 to update its copy of the same VSIN bit.

At S1030, in response to the update of the VSIN bit in response to the packet received from the other chip 500, the virtual sync controller 71 deasserts the sync acknowledgment signal that was asserted at S1015.

Figure 10B:
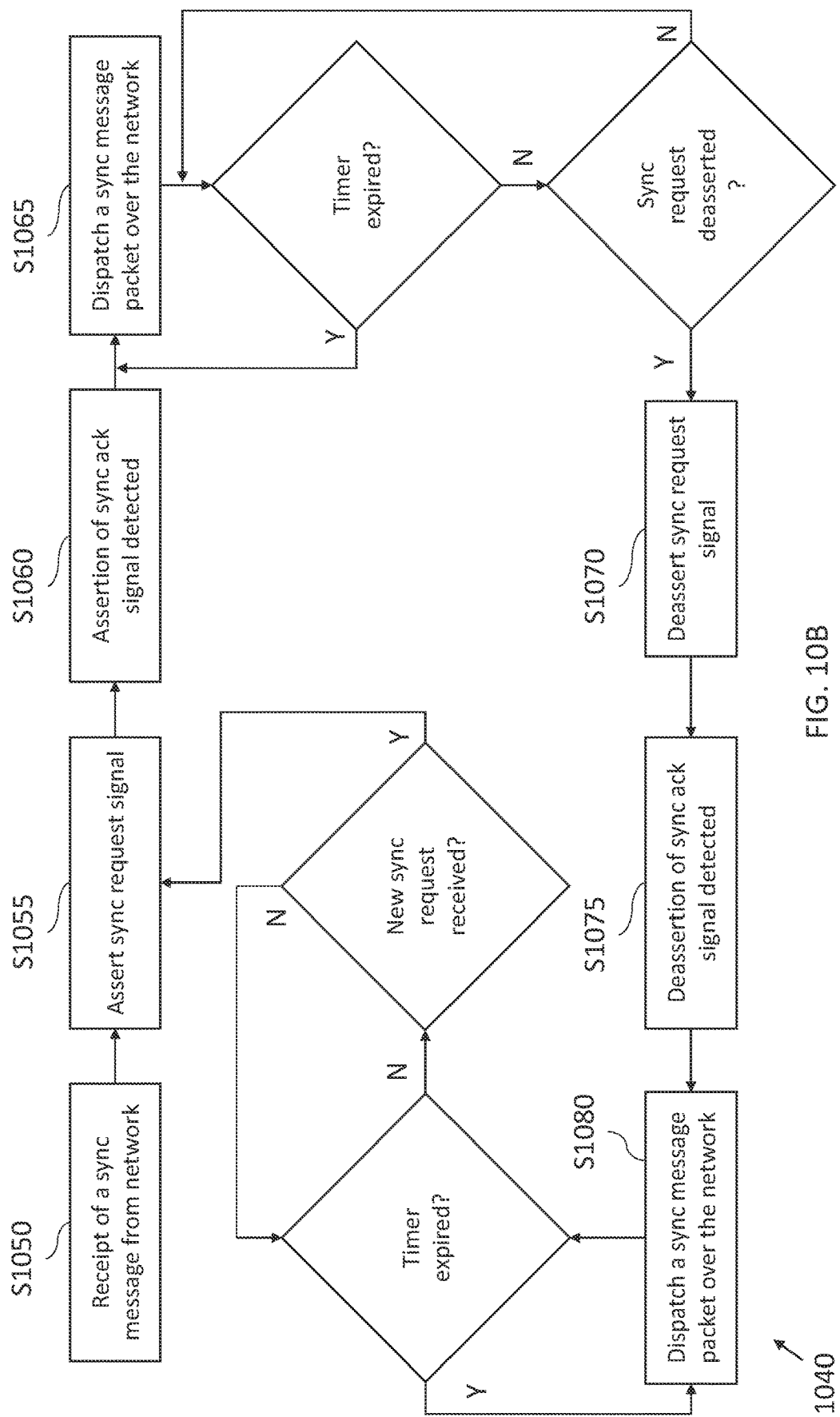
FIG. 10B illustrates an example embodiment of a method implemented in an upstream sync node for performing a sync handshake.

Reference is made to FIG. 10B, which illustrates an example of a method 1000 that may be implemented on a chip 500a to perform a sync handshake between the chip 500a and another chip 500. In this example, the GSP 58 of the chip 500a acts as a sync master and returns a sync acknowledgment in response to a sync request received from the other chip 500.

At S1050, a sync message packet is received from the network 91. The sync message represents a sync request. The sync message indicates that at least one of the VSIN bit of the GCP 76 should be set. The GCP 76 in response to the sync message, sets (e.g. to 1) one of its VSIN bits in storage 94. The GCP 76 issues a write request to the virtual sync controller 71 to set the same VSIN bit in the same way. The virtual sync controller 71 sets the same bit in its storage 93.

At S1055, the virtual sync controller 71 asserts the sync request signal of one of the virtual sync interfaces. This virtual sync interface is associated with the same sync zone as the VSIN bit that is set by the sync message at S1050.

At S1060, the virtual sync controller 71 detects assertion of a sync acknowledgment signal. The sync acknowledgment signal is associated with same sync zone as the sync request asserted at S1055 and is asserted on the same virtual sync interface. In response to detection of the sync acknowledgment signal, the virtual sync controller 71 sets a VSOUT bit in storage 93 associated with the sync zone for which the sync acknowledgment signal was asserted. The virtual sync controller 71 issues a write request to write the updated value of the VSOUT bit to the storage 94 of the GCP 76.

At S1065, the GCP 76 issues a packet over the network 91 to write the updated value of the VSOUT bit to a corresponding VSIN bit held in a GCP 76 on another chip 500. This packet represents a sync acknowledgment. The GCP 76 then starts a timer and waits for a sync message packet from the other chip 500 indicating that the sync request received at S1050 is deasserted. The message indicating deassertion of the sync request is a message writing the VSIN bit that was set at S1050 to its default value (e.g. 0). If the timer expires before this message is received, the packet representing a sync acknowledgement (sent at S1065) is resent to the other chip 500 and the timer is reset.

In response to receipt from the other chip 500 of the sync message packet deasserting the sync request, the GCP 76 updates the corresponding VSIN bit associated with the sync zone in its storage 94 and issues a write request to the virtual sync controller 71 to write the corresponding VSIN in the storage 93.

At S1070, in response to the update to the VSIN bit, the virtual sync controller 71 deasserts the sync request signal (which was asserted at S1055) on the virtual sync interface associated with the sync zone for which the sync handshake is performed.

At S1075, the virtual sync controller 71 detects the deassertion of the sync acknowledgment signal (which was asserted at S1060) on the virtual sync interface associated with the sync zone. In response, the virtual sync controller 71 sets the corresponding VSOUT bit in storage 93 to its default value (e.g. 0) and issues a write request to the GCP 76 to similarly update the corresponding VSOUT bit in storage 94 of the GCP 76.

At S1080, the GCP 76 issues a sync message packet over the network 91. The sync message packet represents deassertion of the sync acknowledgment asserted at S1065. The sync message packet comprises a write to a VSIN bit held in the GCP of the other chip 500 and associated with the sync zone for which the sync handshake is performed.

A timer is set following dispatch of the packet at S1080. The GCP 76 of chip 500a waits for a packet representing a sync request for a next barrier synchronisation for the same sync zone (the sync zone for which the handshake was performed by method 1040). If this sync request is received, this provides confirmation that the deassertion of the sync acknowledgment packet was received at the other chip 500. If the timer expires prior to receipt of this sync request, the sync message packet sent at S1080 is resent.

Embodiments have been described where the conversion process for extending the sync handshake over a packet switched network is implemented on a chip 500a comprising a processing unit 2a. A further example embodiment will now be described in which a status change in signals on a set of wires for a gateway device is used to produce a data packet representing a sync request/acknowledgment. In this example embodiment, the first sync propagation circuitry 910 may comprise a fabric port unit 211a of a first gateway device 1330a, whereas the second sync propagation circuitry 920 may comprise a further fabric port unit 211b belonging to a second gateway device 1330b.

Figure 11:
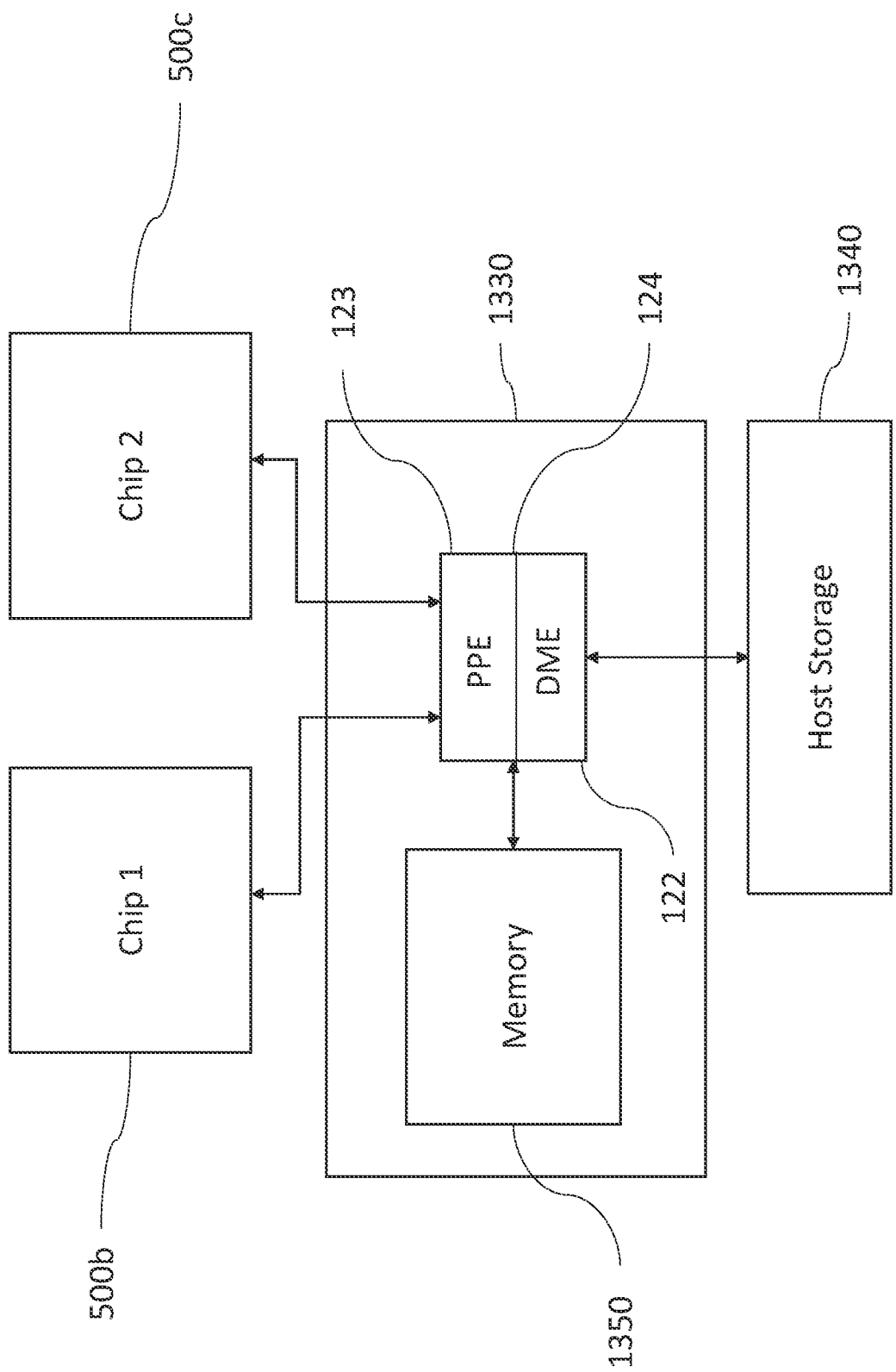
FIG. 11 is an illustration of the use of a gateway apparatus for interfacing two accelerator subsystems with host storage.

Reference is made to FIG. 11, which illustrates an example of a system comprising a gateway 1330 for interfacing the chips 500b, 500c, with host storage 1340. Each of the chips 500b, 500c may comprise the same features as the chip 500a described above.

Data, which is for processing by one or more of the chips 500b, 500c, is transferred to the memory 1350 from the host storage 1340. Additionally, as well as retrieving data, the gateway 1330 writes data to the host storage 1340. The data writes are made via the data centre ports. Data may be transferred from gateway memory 1350 to one or more of the chips 500b, 500c.

Instead of, or in addition to, the transfer of data to the chips 500b, 500c from gateway memory 1350, data may be transferred from the chips 500b, 500c to the gateway 1330. The chips 500b, 500c are configured to send the data in the form of data packets to the gateway 1330, wherein each data packet includes a header indicating an address. The gateway 1330 uses the address of the data packets to determine where to send them. For example, the data packets may be stored in local memory 1350. The data packets may be sent to host storage 1340. The data packets may be sent to the other of the chips 500b, 500c. The data packets may be sent to a further processing node via another gateway (not shown in FIG. 11).

The data traverses the gateway 1330 to and from the memory 1350 under the control of a streaming engine 124. The streaming engine 124 comprises at least one processor for executing data streaming operations. These operations for a batch of data may be specified by a work descriptor (WD). The streaming engine 124 comprises two execution engines and a code memory. One of the execution engines is a Data Mover Engine (DME) 122, the other is a Pre/Post Work engine (PPE) 123. The execution engines execute instructions loaded into the code memory as an executable image, which is produced by a compiler. The streaming engine 124 has a set of work instructions for execution by the DME 122 and a set of work instructions for execution by the PPE 123. The sets of instructions for the DME and PPE are coordinated by the WD, as set up at compile time. These instructions for a single data exchange synchronisation point may be grouped together into a single WD. The DME 122 is operated by specific DME instructions found in the DME sections of the executable image. The DME 122 uses the WD for navigating to the set of data mover (DMOV) instructions that relates to a given exchange synchronisation point (ESP). The PPE 123 is operated by specific PPE instructions found in the PPE sections of the executable image. The PPE 123 uses the WD for navigating to the set of pre/post-work instructions that relates to a given ESP.

Chips 500b, 500c may dispatch packets specifying addresses in a global address space. The address may be an address of Gateway resources, such as gateway memory 1350. The address may be an address in a memory of a tile 4 of another processing unit 2. The chips 500b, 500c may, therefore, send data to either of these locations by dispatching addressed packets to the gateway 1330.

The operation of the gateway 1330 is described in more detail in U.S. application Ser. No. 16/428,846, which is incorporated by reference.

Since the gateway 1330 is used to connect together multiple different chips 500, the sync requests and acknowledgments for a sync in which those chips 500 are to participate may be propagated via the gateway 1330 instead of via the GSPs 58, as described above with respect to FIGS. 5 and 7. The gateway 1330 comprises sync propagation circuitry that may perform similar operations to the GSPs 58 (with the GSPs 58 themselves being disabled), and which is used to propagate sync request/acks to further chips 500 connected to the same gateway 1330 or to further gateways for delivery to different chips 500 connected to those further gateways. In this way, a large sync network may be constructed in which the different chips 500 are connected together via multiple gateways.

In some cases, two gateways may be connected together over a local, wired connection, e.g. PCIe. In this case, the wired sync mechanism may be used to exchange sync requests/acknowledgements between the two gateways. However, in other cases, two gateways may be connected together over a network, e.g. an Ethernet network. In this case, the conversion process is performed to convert a set of signals on dedicated wires to a sync packet for dispatch between the gateways.

Figure 12:
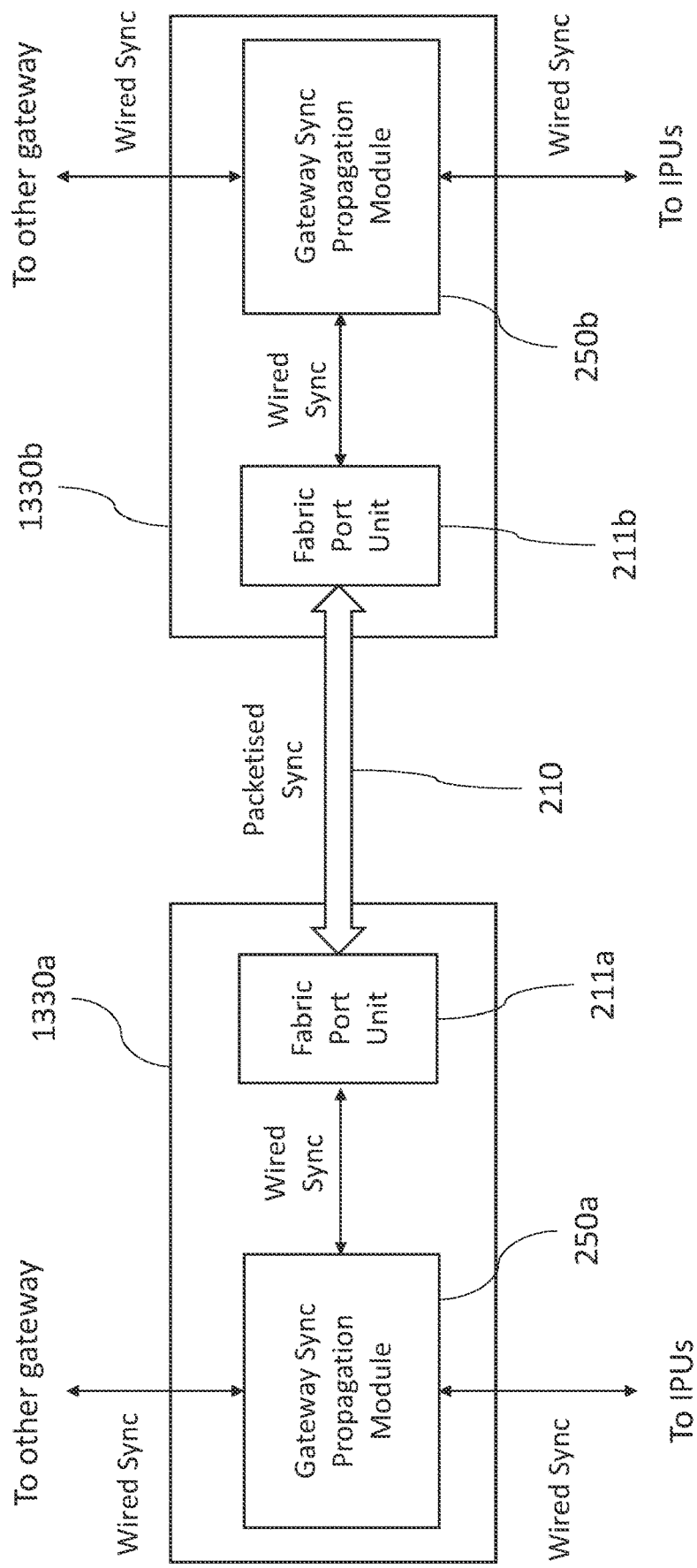
FIG. 12 is a schematic illustration of an embodiment for converting sync requests/acknowledgments from dedicated sync signals to sync packets for sending between two gateway devices.

Reference is made to FIG. 12, which illustrates an example of a system comprising two gateways 1330a, 1330b, which communicate over a network connection 210.

The network connection 210 may be an Ethernet link. Each of the gateways 1330a, 1330b comprises a device 211a, 211b—referred to as fabric port unit 211a, 211b—for sending and receiving the sync request/acknowledgment packets. The fabric port units (FPU) 211a, 211b, as well as being used for the packetised sync interface, are also used for the communication of data between two gateways over fabric ports. The sync packets indicating the sync requests and acknowledgments are sent according to the same mechanisms used for sending and receiving the data over the fabric ports.

Discussion here is primarily made of fabric port unit 211a. However, it would be appreciate that the same teachings apply to FPU 211b. The FPU 211a comprises a wired sync interface to the gateway sync propagation module 250a. The gateway sync propagation module 250a may be any type of sync propagation module 250a for exchanging sync requests and acknowledgments with another gateway. The module 250a has a sync interface that may be used to connect with a locally connected gateway. The module 250a may, therefore, be used to send and receive sync requests and acknowledgments over a sync interface 210 to a locally connected gateway. However, in the case in which the gateway to which sync requests and acknowledgments are to be sent and received is not local, but is located over a network, this sync interface may be disabled and the interface with the FPU 211a is instead enabled. Whether or not each interface is enabled/disabled is defined by the sync zone settings that are selected by a write to a register (referred to as the sync register) of the gateway 1330a from an attached subsystem 500. The module 250a contains configuration settings stored in CSRs (control and status registers) that define which interfaces are enabled. The configuration settings in the CSR that are selected to apply depend upon the write to the register of the gateway 1330a of the sync zone.

The gateway sync propagation module 250a also has one or more sync interfaces connecting it to the one or more subsystems 500 that are connected to the gateway 1330a. In some embodiments, the module 250a may be directly connected to those subsystems 500 to send and receive sync requests and acknowledgments to/from the subsystems 500. In other embodiments, the module 250a may be connected to other modules, e.g. LSPMs, via which it is configured to interface with the subsystems 500. In other cases, sync requests and acknowledgments are exchanged between module 250a and the accelerator/s using one or more sync handshakes performed over wires between the module 250a and the accelerator/s.

The sync interface between the fabric port unit 211a and the gateway sync propagation module 250a also operates using the wired sync mechanism.

The interface between the fabric port unit 211a and the gateway sync propagation module 250a comprises a set of wires for propagating a sync request or acknowledgment. On each of the wires, a signal may be asserted to propagate a sync request or a sync acknowledgment. Each of the wires may be associated with one of the signals X0, X1, Y0, Y1 discussed above.

When a signal on any of the wires of the interface between the FPU 211a and the module 250a changes (i.e. is asserted or deasserted), processing circuitry of the FPU 211a generates a packet to be sent over interface 210 to FPU 211b. The payload of the packet contains information indicating the status of the signals on the interface with the module 250a. For example, suppose that module 250a asserts a signal on a wire to FPU 211a indicating a sync request. The FPU 211a comprises a register storing the status information for each of the sync wires over which it is connected to module 250a. The FPU 211a, in response to the assertion of the sync request signal, updates the status register and generates a packet. The payload of the packet indicates that the sync request has been received on the relevant wire. The payload of the packet indicates the full status of all the wires of the interface between the module 250a and FPU 211a. The payload of the packet, therefore, in addition to indicating that a sync request has been received also indicates the exit state associated with this sync request.

The FPU 211a causes the packet to be dispatched over the link 210 to FPU 211b. The FPU 211b extracts the status information from the packet and updates its own register storing the status information. Once the register is updated, the status information in the register of FPU 211a will match the status information stored in the status register in FPU 211a. The FPU 211b propagates the status updates upstream in the sync network to the gateway sync propagation module 250b. This propagation upstream is performed using the sync handshake in which a signal is asserted on a wire of the interface to module 250b. The asserted signal corresponds to the asserted signal received at FPU 211a from the gateway sync propagation module 250a. The effect of propagating the status update to module 250b is to propagate a sync request to the gateway sync propagation module 250b.

At some time following this, the module 250b will return a corresponding sync acknowledgment by asserting a signal on a different wire of the interface to FPU 211b, where the signal on this wire indicates the sync acknowledgment. The FPU 211b responds to the change in the status of the signals on the wires by updating its register to record the status update and dispatching a packet over connection 210 to the FPU 211a. The FPU 211a responds to the indication of the change in status by updating its register to record the status update and asserting a signal on a wire of the interface to module 250a to indicate the sync acknowledgment. The asserted acknowledgment signal corresponds to the asserted acknowledgment signal received at FPU 211b from the gateway sync propagation module 250b.

In response to receiving a sync acknowledgment from the FPU 211a, the module 250a responds by deasserting the sync request signal sent to FPU 211a and propagating the sync acknowledgments to the one or more local accelerators coupled to the gateway 1330a. In response to detecting the change in status of one of the wires between module 250a and FPU 211a resulting from the deassertion of the request signal, the FPU 211a sends a packet containing the updated status to the FPU 211b. The FPU 211b responds to the packet by deasserting its sync request signal to the module 250b. At each stage, both FPUs 211a, 211b update their registers to record updates to the status of the sync signals.

The FPU 211a may have two or more interfaces to different sync propagation modules on the gateway 1330a. The FPU 211a is responsive to any changes in the status of these interfaces and, in response to such a change in status, causes a packet indicating the updated status to be sent over the connection 210 to the FPU 211b.

Figure 13:
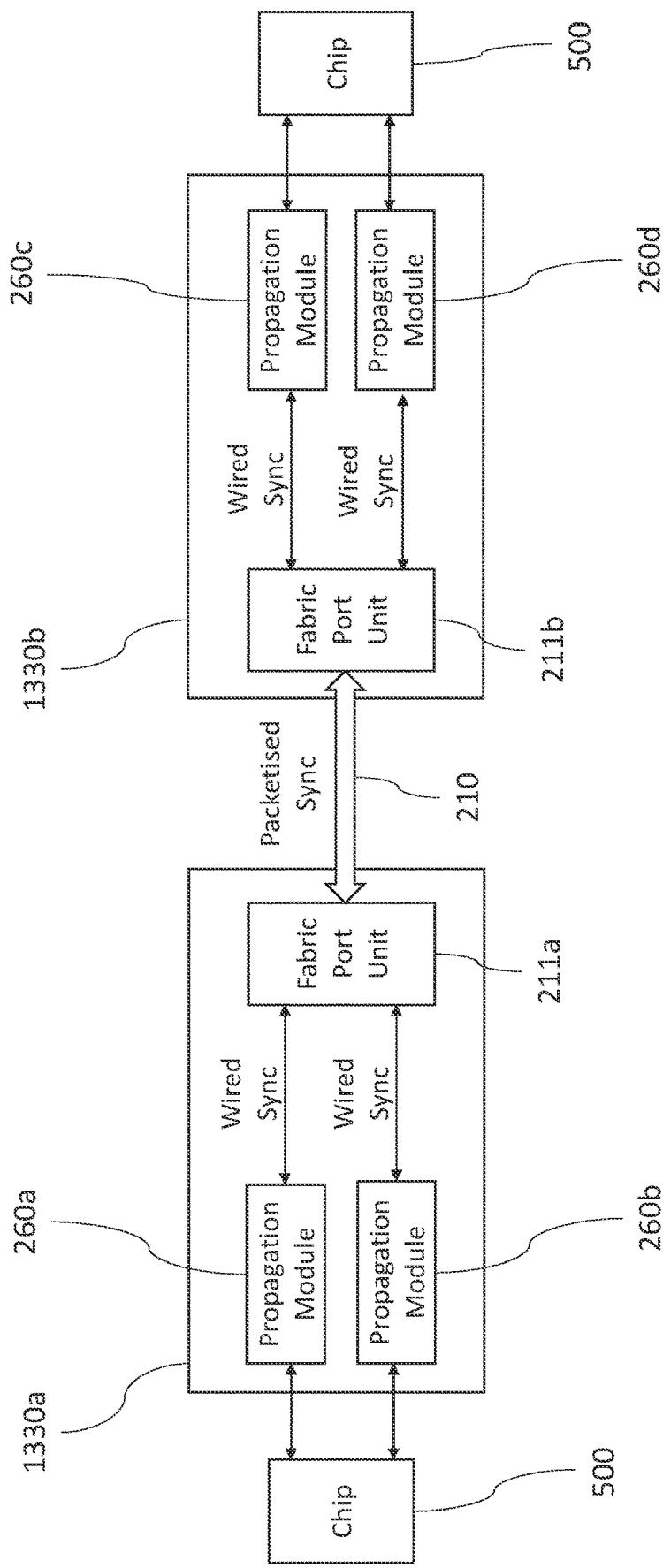
FIG. 13 is a schematic illustration of a further embodiment for converting sync requests/acknowledgments from dedicated sync signals to sync packets for sending between two gateway devices.

Reference is made to FIG. 13, which illustrates an embodiment in which the FPU 211a has a sync interface to two gateway sync propagation modules 260a, 260b on the same gateway 1330a. Each of gateway sync propagation modules 260a, 260b are configured to interface with a single subsystem 500. The use of two propagation modules 260a, 260b for interfacing with one subsystem 500 allows the gateway 1330a to support two independent sync networks in which the subsystem 500 may participate. The first set of tiles 64 and the second set of tiles 65 discussed above may simultaneously participate in different ones of the independent sync networks by exchanging sync requests/acknowledgments with associated ones of the propagation modules 260a, 260b. Each of the modules 260a, 260b is connected to the FPU 211a via a set of wires (e.g. 4 wires) which provide a wired sync handshake interface as discussed above.

The gateway 1330b may be configured in substantially the same way as gateway 1330a.

When the signals on any of the wires of the interfaces between FPU 211a and the modules 260a, 260b changes, processing circuitry of the FPU 211a is configured to generate a packet to be sent over interface 210 to FPU 211b. The payload of the packet contains information indicating the status of the signals on the interfaces to modules 260a, 260b. For example, suppose that module 260a asserts a signal on a wire to FPU 211a indicating a sync request. The FPU 211a in response to this sync request updates one or more of its registers to store the updated status information for the relevant wire and also generates a packet. The payload of the packet indicates that the sync request has been received on the relevant wire. The payload of the packet indicates the full status of all the wires of the 2 sync interfaces between modules 260a, 260b and FPU 211a.

The FPU 211a causes the packet to be dispatched over the link 210 to FPU 211b. The FPU 211b, in response to the packet, stores the status information contained therein in one or more registers of the FPU 211b. The FPU 211b, following reception of the packetised sync request from FPU 211a, propagates sync requests upstream to the module 260c (which belongs to the same sync network as module 260a). This propagation upstream is performed by asserting a signal is asserted on a wire of the interface to module 260c, the signal indicating a sync request. At some time following this, the module 260c will return a sync acknowledgment by asserting a signal on a different wire of the interface to FPU 211b, where this signal indicates a sync acknowledgment. The FPU 211b responds to the change in the status of a signal on the interfaces to module 260c by updating its register and dispatching a packet over connection 210 to the FPU 211a. The FPU 211a responds to the indication of the change in status by storing the updated status in its register. In response to the updated status indicating a sync acknowledgment, the FPU 211a then issues a sync acknowledgment to module 260a. The module 260a responds by deasserting the sync request sent to FPU 211a and propagating the sync acknowledgments to the subsystem 500.

The same process can be implemented independently for the other sync network using the modules 260b, 260d. The FPUs 211a, 211b respond in the same way to sync requests and acknowledgments on wires of interfaces to modules 260b, 260d. The processes for propagating sync requests and acknowledgments associated with the two sync networks may be performed simultaneously and asynchronously to one another to perform synchronisations between different synchronisation groups. For example, a first synchronisation group comprising tiles 4 of subsystem 500 connected to gateway 1330a and tiles 4 of subsystem 500 connected to gateway 1300b may reach a barrier synchronisation at which sync requests and acknowledgments are exchanged between these subsystems 500 in the manner described above using modules 260a, 260c and the FPUs 211a, 211b. Following this, data exchange between the subsets of tiles of the two subsystems takes place during an exchange phase. A second synchronisation group comprising further tiles 4 of a subsystem 500 connected to gateway 1330a and further tiles 4 of a chip 500 connected to gateway 1300b may reach a barrier synchronisation at which sync requests and acknowl- edgments are exchanged between these subsystems 500 in the manner described above using modules 260b, 260d and the FPUs 211a, 211b. Following this, data exchange between the subsets of tiles of the two subsystems takes place during an exchange phase. The exchange phases used for synchronisation between the two synchronisation groups may overlap in time, as described above with respect to FIG. 5A.

In order to provide timing accurate log information as to the sync and data exchange activity taking place on the chip 500, functionality is provided in the chip 500 for collecting trace information during operation of the chip 500.

A first aspect of collecting the trace information relates to the provision in the chip 500 of components for collecting and reporting trace information. These components are configured to communicate with one another over a bus. A packet for collecting the trace information, referred to herein as the trace report packet, circulates on the bus. The bus is a ring around which packets circulate. The trace report packet includes a global timestamp, which is inserted into the packet by a regulator node on the bus. The trace report packet is transported over the bus to all of the nodes on the bus. One or more of these nodes are referred to as trace nodes, which are configured to insert different types of trace data into the trace report packet. The trace report packet then arrives at a component accessible on the bus. This component is referred to as the trace termination unit. The trace termination unit extracts the trace information from the trace report packet, which may then be used to add trace information to a log file in external memory.

The bus over which the trace report packets are sent operates in a time deterministic manner, with the amount of time taken for the trace report packet to traverse from the regulator node to any of the trace nodes being a fixed amount dependent upon the distance between the regulator node and the respective trace node. The total amount of time for the packet to circulate around the bus is also a fixed number of clock cycles. Since the bus operates in a time deterministic manner, it is unnecessary for the trace nodes or termination node to maintain global time information for the chip 500 in order to provide accurate timing for the trace.

A second aspect of collecting the trace information relates to the provision for logging of a sync schedule for the chip 500. This is achieved by providing in the external sync controller (i.e. the GSP 58), circuitry for observing synchronisation requests and synchronisation acknowledgments at interfaces of the GSP 58, and for storing timing information associated with the detection of each of these requests or acknowledgments. The timing information associated with the synchronisation requests and acknowledgments is periodically exported from the GSP 58 via this trace system to provide a log of the sync schedule.

The first and the second aspect may be combined. One or more of the trace nodes, as discussed above with respect to the first aspect, may be associated with the GSP 58 and configured to output the timing information for each of the synchronisation requests and synchronisation acknowledgments to a trace report packet received at the respective node.

Embodiments of these aspects of collecting trace information will now be described with reference to the accompanying Figures.

Figure 14:
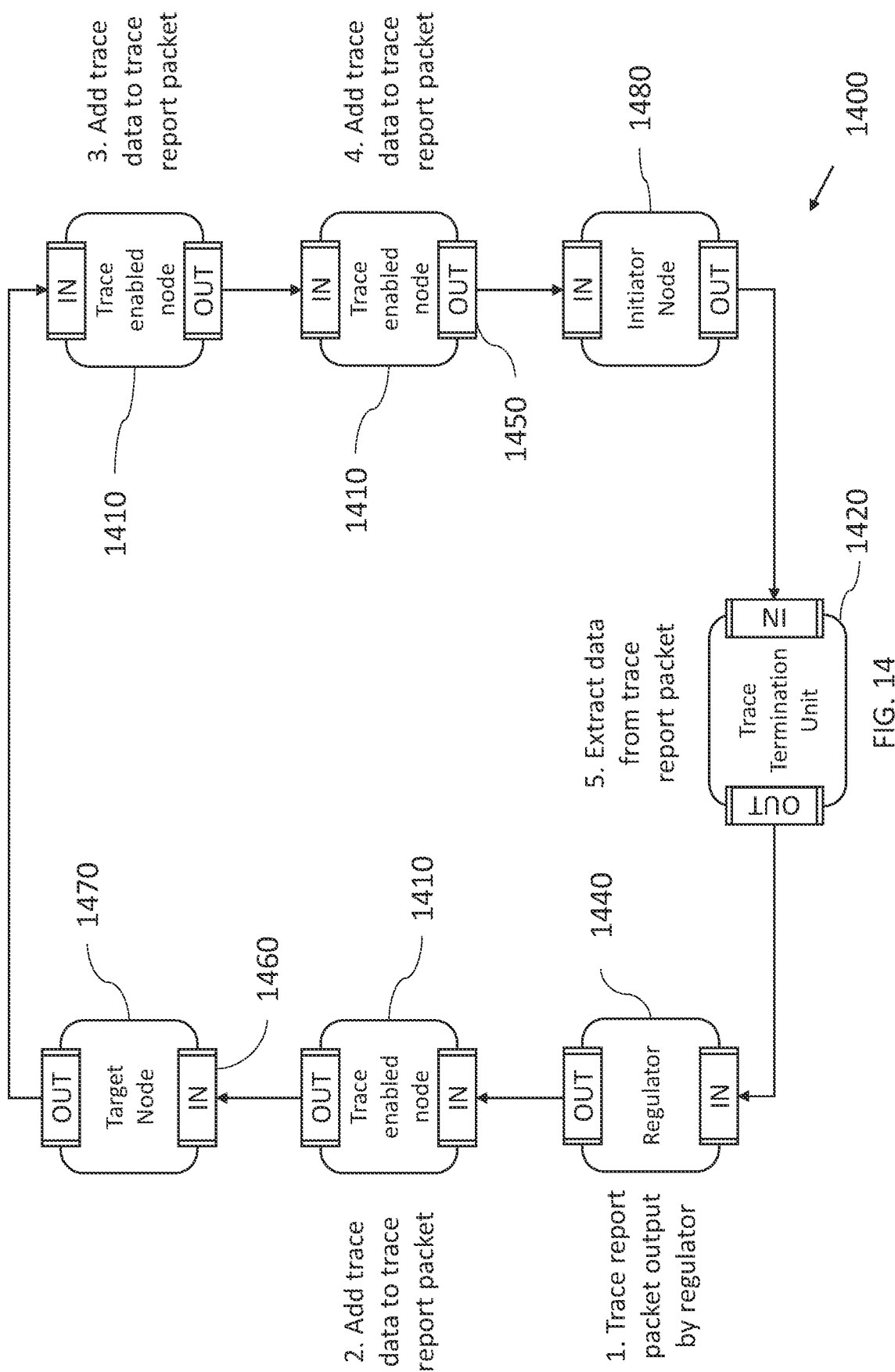
FIG. 14 is a schematic illustration of a bus for transporting trace report packets for collection of trace data from different components on chip.

Reference is made to FIG. 14, which illustrates an example of the bus 1400 for transporting trace report packets between different components of the chip 500. The bus 1400 may be referred to as a control bus, and may be used for transporting control packets in addition to the trace report packets. Certain aspects of the control bus are described in our earlier patent application no: GB2009264.9, which is incorporated by reference.

FIG. 14, which illustrates an example of the bus 1400. The bus 1400 is a data path for carrying control traffic in ring. The bus 1400 is a pipelined data bus via which data packets move from stage to stage in the pipeline at a rate determined by a clock pulse that is applied to the bus 1400. The ring comprises a plurality of a nodes (e.g. nodes 1410, 1440, 1470, 1480), with traffic passing from one node to the next node in a direction of flow around the ring. Each node's output port 1450 is connected to the input port 1460 of the next node in the ring.

Some of the nodes (referred to herein as target nodes) are associated with a receiving circuit (referred to herein as a bus target) for receiving requests to read or write to configuration settings associated with the node. An example of a target node 1470 is shown attached to the bus 1400. Such a target node 1470 has an associated bus target for receiving read or write requests from the bus 1400 to its configuration settings.

Some of the nodes are associated with a requesting circuit (referred to herein as bus initiators), which issues read or write requests onto the bus 1400. An example of an initiator node 1480 is shown attached to the bus 1400. Such an initiator node 1480 has an associated bus initiator for issuing read or write requests to configuration settings associated with target nodes (e.g. node 1470) attached to the control bus 1400. Initiators may be controlled by software in some cases, and by fixed function hardware engines in others.

An example bus target 75 and an example bus initiator 74 of the GSP 58 are shown in FIG. 7A. Via this bus target 75 and bus initiator 74, the GSP 58 is able to issue read or write requests onto the bus 1400, and receive read or write requests to its configuration settings from other bus initiators attached to the bus 1400.

Each of the bus initiators is capable of issuing requests to bus targets and receiving completions from the bus targets. Each request is either a command to read from a storage (e.g. an attached addressable entity or auto-generated register) associated with the bus target or a request to write to such a storage associated with the bus target. In response to receipt of such a request, a bus target responds by issuing a completion. A completion provides a status update indicating whether or not the read or write request was successful or not.

One of the nodes attached to the control bus 1400 is the regulator node 1440. The regulator node 1440 is configured to issue a trace token onto the control bus 1400. The trace token is a packet containing information identifying it as a trace token. By dispatching the trace token onto the control bus 1400, the regulator 1440 initiates tracing of information collected from across the chip 500. The control bus 1400 includes one or more trace termination units 1420, attached to the bus 1400. In example embodiments, there are two separate trace termination units, one for dispatching trace data to on-chip memory (e.g. DDR memory) and another for dispatching trace data to host memory. Only one example trace termination unit 1420 is shown in and described with respect to FIG. 14. However, the description of activity performed by this trace termination unit 1420 may apply equally well to other trace termination units. However, in some embodiments, only one trace termination unit may be active. Each of the trace termination units accessible on the bus 1400 may be associated with a different external memory resource to which it is configured to store trace log information. Therefore, which external memory resource is used to store the trace log information depends upon which of the trace termination units is active.

When the trace termination unit 1420 receives the trace token issued by the regulator 1440, the trace termination unit 1420 replaces the trace token with a trace report packet, which circulates on the bus 1400 in place of the trace token. When it replaces the trace token with the trace report packet, the trace termination unit 1420 inserts into the trace report packet, an identifier of the trace termination unit 1420, indicating that the trace report packet is owned by the trace termination unit 1420.

The trace report packet circulates around the control bus 1400 once every predefined time period. In example embodiments, the predefined time period may be 400 ticks of a clock (referred to herein as the "system clock") used for clocking various SoC components on the chip 500. The trace report packet passes through the regulator node 1440, and circulates around the bus 1400. As it circulates around the control bus 1400, the trace nodes 1410 add trace data, which they have accumulated since the trace packet last passed by, to the trace report packet. In some embodiments, 19 trace nodes 1410 are attached to the bus 1400. However, in these same embodiments, it is not necessary that all trace nodes 1410 be enabled to add trace data into the trace report packet. At some times, one or more of the trace nodes 1410 may be inactive.

After having circulated around the control bus 1400, the trace report packet is received again at the regulator node 1440. The regulator node 1440 buffers the trace report packet for a number of cycles of the system clock before causing the trace report packet to circulate again around the control bus 1400. The regulator 1440 buffers the trace report packet, such that the time taken between the trace report packet being output by the regulator node 1440 and being received back at the regulator node 1440 matches a predefined number of clock cycles (e.g. 400 clock cycles). The amount of time for the trace report packet to circulate the control bus 1400 may be referred to as the trace period. The number of clock cycles for which the regulator 1440 buffers the trace report packet depends upon the latency added to the trace packet by the pipeline stages and trace nodes of the control bus 1400. The latency, therefore, depends upon the number of nodes that are enabled (by settings controlled by software) to add trace data into the trace report packets. The regulator 1440 is configured to buffer the trace report packet by an amount such that the trace period matches the predefined number of clock cycles (e.g. 400 clock cycles).

In order to ensure that the regulator buffers the trace report packet by an appropriate amount, a processor running software may, via an associated bus initiator attached to the control bus 1400, cause write requests to be dispatched onto the bus 1400. One or more of the write requests may cause different ones of the trace nodes 1410 to be enabled or disabled. At least one write request may cause configuration settings of the regulator 1440 to be updated to control the amount of buffering performed at the regulator 1440. This processor may configure the amount of buffering performed at the regulator 1440 and the number of trace nodes 1410 that are active in order to ensure that the trace report packet circulate around the bus 1400 once every predefined number of clock cycles (e.g. 400 clock cycles).

When the regulator node 1440 issues a trace report packet onto the bus 1400, it includes in the trace report packet, a counter value maintained by the regulator node 1440. This counter value is updated in response to ticks of the system clock signal, which is received at the regulator node 1440. The counter value may be referred to as the global time value, and is used to provide timing information for the events recorded in the log data resulting from the tracing of the activity on the chip 500. The global time value may be a 55 bit value, which is inserted into the payload of the trace report packet by the regulator node 1440.

Each of the trace nodes is configured to record trace data at the same time for adding to the trace report packet during a trace period. However, the trace nodes do not maintain an independent copy of the global time value. In order to ensure trace data is recorded at the same time, each of the trace nodes determines the time (the sample time) at which it is to record trace data based on the time of last receipt of the trace report packet. Specifically, the trace node is configured to determine the sample time as:

$$S = T_A + \Delta \qquad \text{Equation 1}$$

where $T_A$ is the time at which the trace report packet last arrived at the relevant trace node, and $\Delta$ is a number of system clock cycles taken for the trace report packet to travel from the relevant trace node to the regulator 1440. The values of $T_A$ and $\Delta$ vary depending upon the position of the respective trace node on the bus 1400. The result from equation 1 is that each trace node 1410 collects trace data for a given trace period at the same point in time.

In order to determine the sample time, S, each trace node 1410 is associated with an independent counter, which is reset upon arrival at the respective node 1410 of the trace report packet. Each trace node 1410 then obtains a sample of trace data once the value of its counter reaches A. The value of $\Delta$ for each node is such that each node 1410 obtains a sample of trace data at the same time. The sample time for each trace node is arranged to be at the end of the trace period. The end of the trace period is the time at which the trace report packet arrives at the regulator node 1440. The regulator node 1440 then inserts the global time value marking the start of the next trace period.

Therefore, each trace node 1410 is configured to determine the sample time for a trace period based on the time of receipt of the trace report packet during that trace period.

Since the sample time for a trace period is after the receipt of the trace report packet during that trace period, the trace data for a given trace period is not inserted into the trace report packet until the following trace period. The consequence is that the global time value inserted into a trace report packet corresponds to the global time value for a later trace period than the trace period for which the trace data is present in the packet. For example, suppose a trace report packet is received at the regulator node 1440, the regulator 1440 then inserts the global time value for trace period N into the trace report packet. This global time value marks the start of trace period N. The trace report packet then circulates around the control bus, arriving at each trace node 1410 on the bus 1400. At each trace node 1410, the respective trace node 1410 is triggered to produce a sample of trace data for trace period N, a given amount of time after receipt of the trace report packet. However, this trace data (which is trace data for trace period N) will not be inserted into the trace report packet until the trace report packet circulates around the bus 1400 again, such that it is received again at each trace node 1410. When the trace report packet is again received at the regulator node 1440, the regulator node 1440 inserts into the packet, the global time value for trace period N+1. When the trace report packet is again received at each trace node 1410, each trace node 1410 inserts into the trace report packet, its sampled trace data for trace period N. Therefore, after having passed the regulator node 1440 and each trace node 1410 during period N, and arrived at the trace termination unit 1420, the trace report packet includes the global time value for trace period N+1, and the trace data for trace period N. The trace termination unit 1420 is configured to store the global time value for trace period N+1 for use in generating a log entry when the trace data for trace period N+1 is received in the next arrival of the trace report packet. The trace termination unit uses the trace data for trace period N and the global time value for trace period N that was stored (when the trace report packet was last received) to produce a log entry for trace period N.

Figure 15:
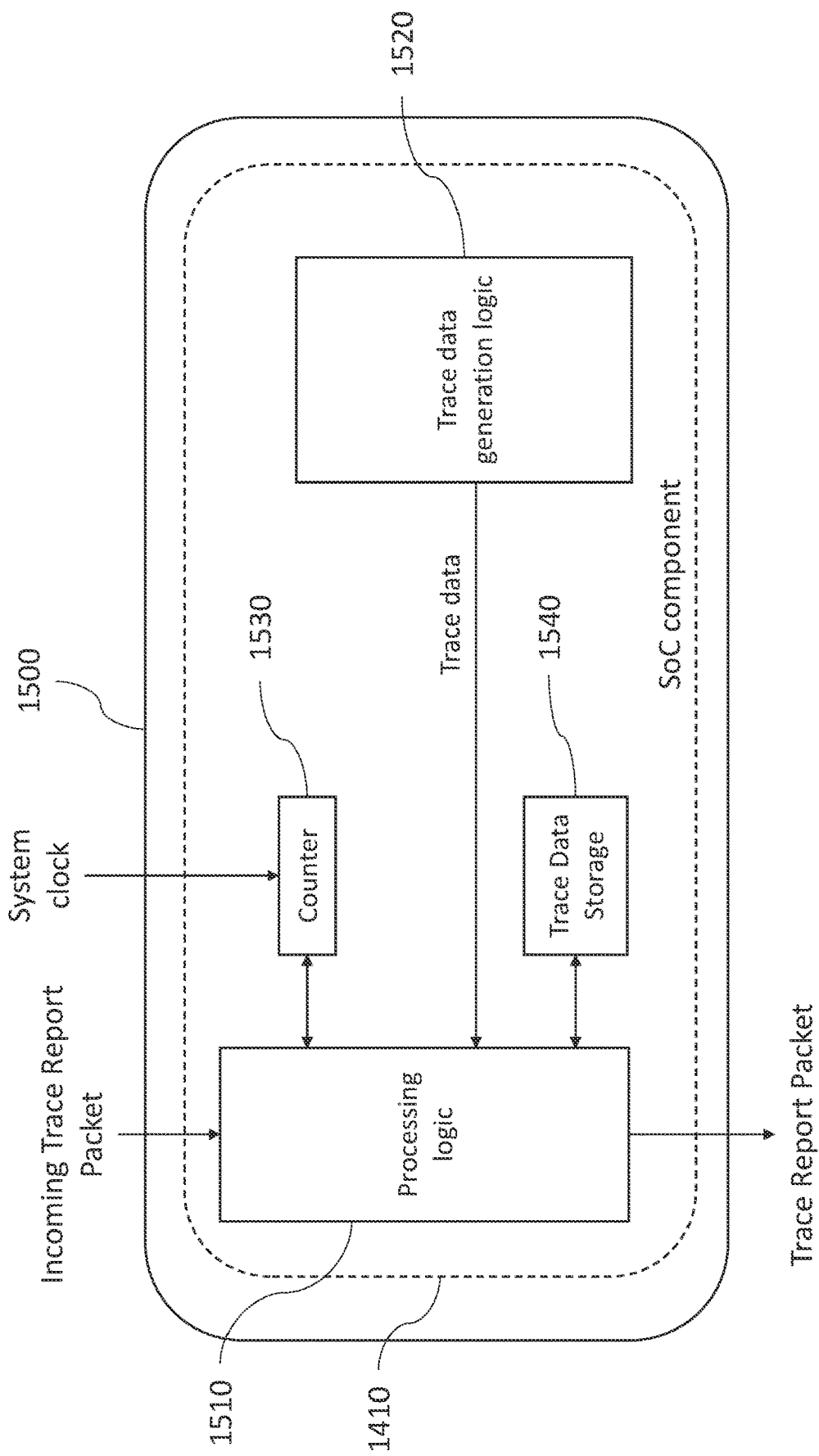
FIG. 15 is a schematic illustration of a trace node for collecting and outputting trace data into a trace report packet.

Reference is made to FIG. 15, which illustrates an example of a system on chip (SoC) component 1500, which incorporates a trace node 1410 for adding trace data into the trace report packet received on the bus 1400. The trace node 1410 includes trace data generation logic 1520 for generating the trace data to be inserted into a trace report packet received at the trace node 1410.

The trace node 1410 includes processing logic 1510 which is configured, based on configuration settings held in the trace node 1410, to determine a sample time for the trace data collected by the trace node 1410. The processing logic 1510 determines the sample time based on Equation 1. The configuration settings include an indication of the distance of the trace node 1410 from the regulator 1440, enabling $\Delta$ to be determined, and therefore Equation 1 to be evaluated.

The processing logic 1510 obtains a sample of trace data at a time dependent upon the value of the independent counter 1530. The counter 1530 is incremented in response to the system clock. A sample of trace data is collected when the value of counter 1530 reaches A. The counter 1530 is reset by the processing logic 1510 when a trace report packet is received at the trace node 1410. A further sample of trace data is then taken when the value of counter 1530 again reaches A.

The trace node 1410 includes a trace data storage 1540, which is register or memory for holding a sample of trace data before inserting the sample of trace data into a trace report packet.

One type of trace data may be a counter value for a clock of the processing unit 2 of the chip 500. The clock for the processing unit 2 is referred to herein as the IPU clock, however, the application is not limited to embodiments in which the processing unit 2 is an IPU. The IPU clock rate is varied automatically by hardware over the course of processing performed by the processing unit 2, so as to ensure that the processing unit 2 does not consume more power than the system is capable of delivering. The varying rate of the IPU clock provides motivation for obtaining trace data in relation to the IPU clock. The counter value (referred to as the IPU clock counter) for the IPU clock enables tracing of the clock of the IPU clock, with respect to the system clock. In this case, the trace data generation logic 1520 includes a register for holding the IPU clock counter value, which is incremented in response to edges of the IPU clock signal. The processing logic 1510 is configured to collect from the trace data generation logic 1520 a sample of the IPU clock counter value at the sample time, which is determined using the sample counter 1530, as has been described. The processing logic 1510 causes this IPU clock counter value for a given trace period to be stored in the trace data storage 1540 prior to arrival at the trace node 1410 of the trace report packet for collecting the trace data of that trace period. The processing logic 1510 inserts the sample of the IPU clock counter into the payload of the trace report packet when it arrives. The trace report packet is then output from the trace node 1410 with the sample of the IPU clock counter value in its payload. In some embodiments, rather than inserting the absolute value of the IPU clock counter into the trace report packet, the processing logic 1510 may obtain the change in the IPU clock counter (i.e. the IPU clock deltas) since the previous trace report period and insert this in the trace report packet.

Another type of trace data collected by a trace node 1410 may include the timing of any sync events occurring during the trace period. The sync events include the reception at the GSP 58 of a sync request or the output by the GSP 58 of a sync acknowledgment. The trace data generation logic 1520 is configured to, during the trace period, record timing information for any sync events that occur. The processing logic 1510, at the sample time as determined from the counter 1530, a sample of sync trace data which includes the timing information for any of the sync events that occurred during the trace period. This sample of sync trace data is held in trace data storage 1540 until the next trace report packet is received at the node 1410. The sync trace data is then inserted into the trace report packet. The collection of sync trace data is described in more detail later.

Another type of trace data includes the number of data packets passing through the component 1500 as those packets traverse between different parts of the chip 500. The trace data generation logic 1520 is configured to monitor the data packets passing through the component 1500 on the chip 500 and to output information on the number of data packets to the processing logic 1510. The processing logic 1510, at the sample time as determined from the counter 1530, produces a sample of trace data which, for this type of trace, specifies the number of data packets counted by the trace data generation logic 1510 during the trace period. This sample of trace data is held in trace data storage 1540 until the next trace report packet is received at the node 1410. The number of the data packets is then inserted into the trace report packet. The collection of the packet count information is described in more detail later.

Figure 16:
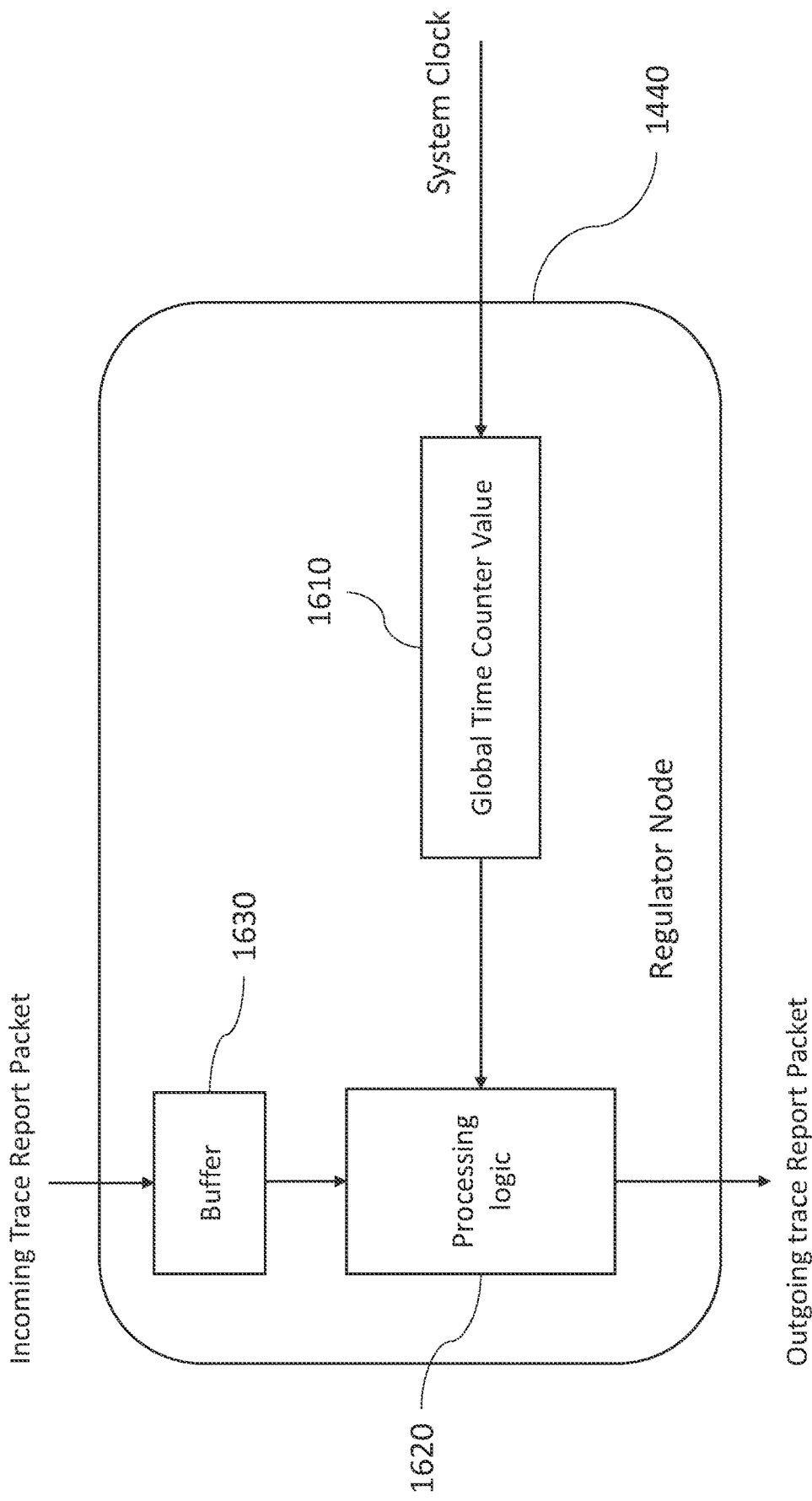
FIG. 16 is a schematic illustration of a regulator node connected to the control bus.

Reference is made to FIG. 16, which illustrates an example of the regulator node 1440, which receives a trace report packet, inserts the global time counter value into the trace report packet and dispatches the trace report packet onto the bus 1400. The dispatch onto the bus 1400 from the regulator node 1440 of the trace report packet marks the start of a trace period.

The regulator node 1440 includes a register 1610 holding a global time counter value, which is updated in response to ticks of the system clock. When the trace report packet is received at the regulator node 1440, processing logic 1620 of the regulator node 1440 inserts the current value of the global time counter value from register 1610 into the trace report packet. The trace report packet is then dispatched from the regulator node 1440, with this global time counter value held in its payload. This global time counter value marks the start of a trace period.

The regulator node 1440 also includes a buffer 1630 for buffering the trace report packet to add latency such that the trace report packet circulates around the control bus 1400 in a predefined number of clock cycles (e.g. once every 400 system clock ticks) for every trace period. The buffer 1630 is configured to add an amount of latency required, which is dependent upon the number of trace nodes 1410 on the control bus.

Referring back to FIG. 14, a number of steps (numbered 1 to 5) involved in the circulation around the control bus 1400 of the trace report packet during a trace period are shown. At the start of the trace period, the trace report packet is output by the regulator 1440 with the global time value for the current trace period included in its payload. The trace report packet passes through each of a plurality of trace nodes 1410 on the bus 1400, which each add their own trace data collected during the previous trace period into a different part of the trace report packet. The trace report packet arrives at the trace termination unit 1420, which extracts the trace data for the previous trace period from the trace report packet and extracts the global time value for the current trace period from the trace report packet. The trace report packet is then output by the trace termination unit 1420 and supplied to the regulator 1440, from where it circulates again around the bus 1400 during the next trace period.

In some embodiments, when the trace report again circulates around the bus 1400, each trace node 1410 may overwrite trace data in the trace report packet that was added to the trace report packet during the previous trace period. Alternatively, the trace termination unit 1420 may clear the payload of the trace report packet before the packet is received at the trace nodes 1410 during the next trace period.

Figure 17:
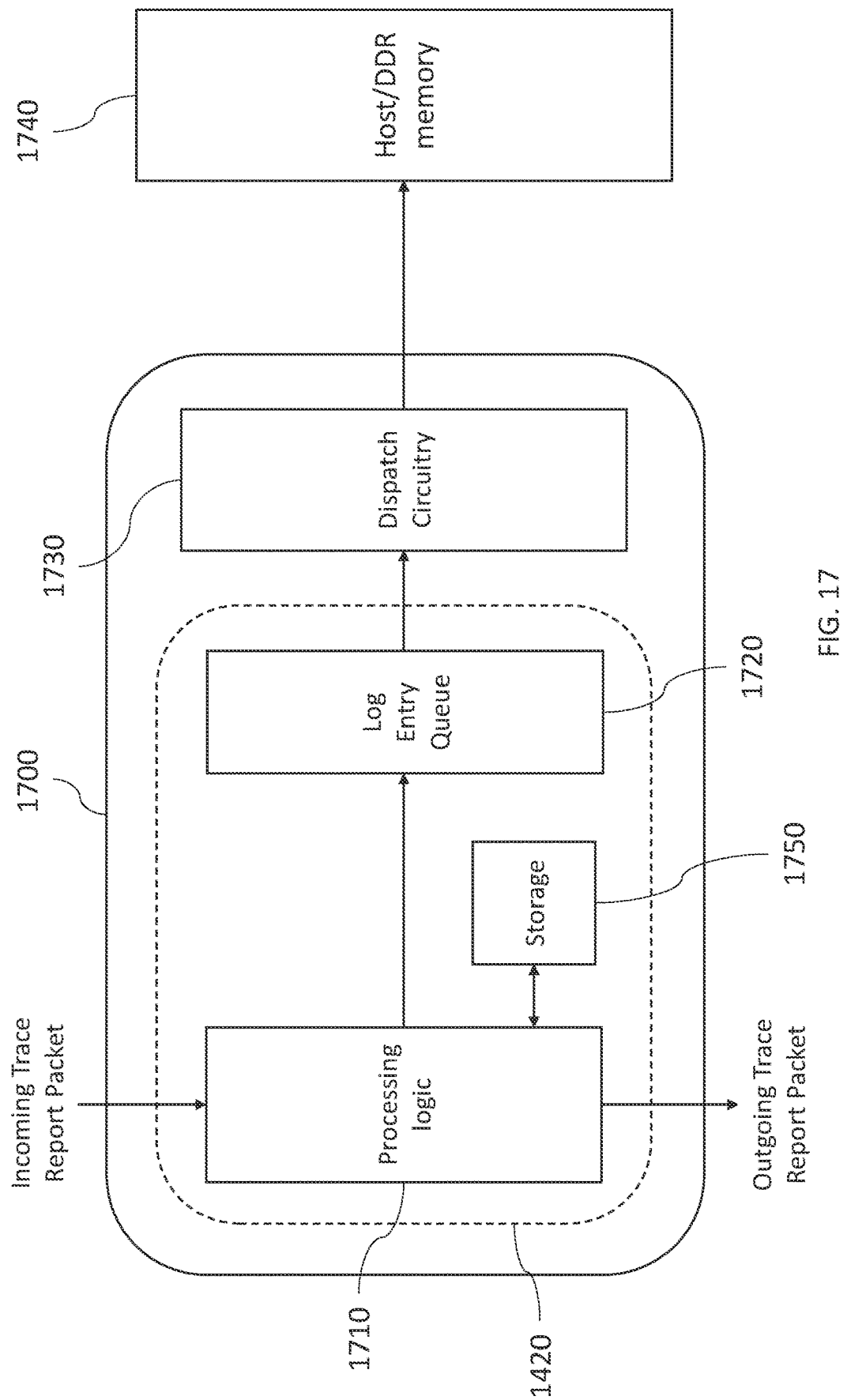
FIG. 17 is a schematic illustration of a trace termination unit for producing log entries from collected trace data.

Reference is made to FIG. 17, which illustrates an example of a trace termination unit 1420 within a device 1700 for interfacing with a memory 1740. The memory 1740 may, for example, be a memory of a host system external to the chip 500 and accessed via a PCIe bus or may be a DRAM memory externally connected directly to the chip. The device 1700 may, for example, be a DDR interface bridge (for direct interface with off-chip DRAM memory) or a PCI complex (for interface with host).

The trace termination unit 1420 includes processing logic 1710 configured to extract the trace data from a trace report packet received at the trace termination unit 1420 and generate from the trace data, a log entry for that trace report packet. Each log entry includes a log entry header. If the log entry is the first log entry, the log entry header comprises the global time value extracted from the trace report packet. Otherwise, the log entry header contains the trace period delta of the current log entry, which is the number of system clock cycles that have the elapsed since the last log entry.

Once generated, the log entries are dispatched to storage 1740, where they are stored as part of a log file. To achieve this, the processing logic 1710 stores the log entry to a log entry queue 1720. The log entries in the queue 1720 are dispatched by dispatch circuitry 1730 to the storage 1740, where they form part of a log file including all of the log entries generated by the trace termination unit 1420. The dispatch circuitry 1730 dispatches the log entries to storage 1740 with priority over other traffic sent from the device 1700.

Although each of the active trace nodes 1410 is configured to provide trace data into the trace report packet during each trace period, each log entry need not be provided with all of the different types of trace data collected during the trace period. For each type of trace data, a period (referred to herein as the "resolution period") is defined, which determines how often that type of trace data is included in a log entry by the processing logic 1710. The processing logic 1710 provides trace data in a log entry once per resolution period, the resolution period being a multiple of trace periods. The processing logic 1710 will insert trace data of a given type into a log entry if the current trace period during which the trace report packet is received at the processing logic 1710 is a given multiple (defined by the resolution period for the type of trace data) of trace periods since the last trace period during which trace data of that type was inserted into a log entry.

It should also be noted that other conditions may also be applied for some types of trace data—e.g. sync activity data, which is discussed in more detail below—to determine whether or not trace data of that type should be inserted into a log entry.

For example, one example type of trace data discussed is the IPU clock counter value. During each trace period, the counter value for the IPU clock counter is inserted into the trace report packet. When the trace report packet is received at the trace termination unit 1420, the processing logic 1710 determines whether or not this trace period is a trace period for which information regarding the IPU clock is to be included in the associated log entry. The processing logic 1710 may include the information regarding the IPU clock once every 1 to 64 trace periods. In other words, the resolution period for this type of trace data may be set to be any multiple of trace periods between 1 and 64, with the length of this resolution period being configurable. The storage 1750 of the trace termination unit 1420 holds the previous IPU clock counter value that was used to produce data for the log entry for the last resolution period. The processing logic 1710 determines the change in the IPU clock counter value between the last resolution period and the current resolution period. This change (which may be referred to as the "IPU clock delta") reflects the number of ticks of the processing unit 2 clock between the log entries in which the change is recorded. When the IPU clock delta value is to be included in a log entry for a trace period, the processing logic 1710 inserts the IPU clock delta value into the log entry for that trace period. The processing logic 1710 also stores the IPU clock counter value extracted from the trace report packet in the storage 1750, such that it is available for calculating the IPU clock delta for the next resolution period.

As discussed, another example of trace data is the sync trace data, which contains information on sync events occurring during a trace period. The sync events are detected by the receipt of sync messages (i.e. sync requests or acknowledgments) at sync trace circuitry. During each trace period, sync trace data comprising timing information regarding the receipt of the sync messages is captured in a trace report packet. When the trace report packet is received at the trace termination unit 1420, the processing logic 1710 extracts the sync trace data from the packet. The processing logic 1710 inserts any sync trace data into the log entry for the trace period. Therefore, sync trace data for any sync events that occur within the trace period is inserted into the log entry. If no sync events occur within the trace period, the log entry for the trace period will not include any sync trace data for that trace period.

As discussed, another example of trace data is the count of packets passing through certain nodes on the chip 500. The trace report packet comprise packet count values for multiple different nodes on the chip 500. As with the IPU clock trace, a resolution period is defined for the output of packet counts to the log file. The packet count resolution period comprises a multiple of trace periods. This multiple of trace periods may be different to the resolution period for the IPU clock trace. When the trace report packet is received at the trace termination unit 1420, the processing logic 1710 determines whether or not this trace period is a trace period for which information regarding the packet count is to be dispatched in the associated log entry. The processing logic 1710 may dispatch the information regarding the packet count once every 1 to 64 trace periods. In other words, the resolution period for this type of trace data may be set to be any value between 1 and 64 trace periods, the length of the resolution period being configurable. The storage 1750 of the trace termination unit 1420 holds the previous packet count values that were used to produce data for the last log entry including the packet count information. The processing logic 1710 determines the change in the packet count values between the last resolution period and the current resolution period. This change (which may be referred to as the "packet count deltas") reflects the number of packets received at each monitored node between the log entries in which the packet count deltas are recorded. The processing logic 1710 inserts the packet count deltas into a log entry for a trace period. The processing logic 1710 stores the packet count values collected during that trace period in the storage 1750, such that it is available for calculating the packet count deltas for the next resolution period for the packet count information.

Therefore, for different types of trace data, the processing logic 1710 determines whether trace data of that type is inserted into a log entry. One consequence of this is that, for some trace periods, the processing logic 1710 may not insert any trace data into a log entry. In this case, a log entry is not generated by the processing logic 1710. Preparing log entries that do not contain all types of trace data or, in some cases, omitting log entries for trace periods altogether, reduces the size of the log file. Reducing the log file size is useful when applications may run for hours or days and log files may demand a large amount of memory size for storage. It would be appreciated that there is a trade-off to be satisfied between timing precision for trace data (which may be improved by reducing the resolution period) and the size of the log file (which may be reduced by increasing the resolution period).

The collection of the sync trace data will now be described. As discussed above, the processing unit 2 on a chip 500 includes a plurality of tiles 4 that are configured to participate in barrier synchronisations. When participating in these barrier synchronisations, each tile 4 issues a sync request and receives a sync acknowledgment in response. An external sync controller (referred to as the GSP 58) is present on the chip 500 for receiving sync requests and acknowledgments and forwarding sync requests and acknowledgments whenever any of the tiles 4 on the chip 500 participates in an external sync. This may be performed in the manner described above with respect to FIGS. 5A and 7. As shown in FIG. 7, the external sync controller 58 takes the form of a hardware unit comprising a plurality of different circuits for forwarding and acknowledging sync requests relating to different sync zones.

Figure 18:
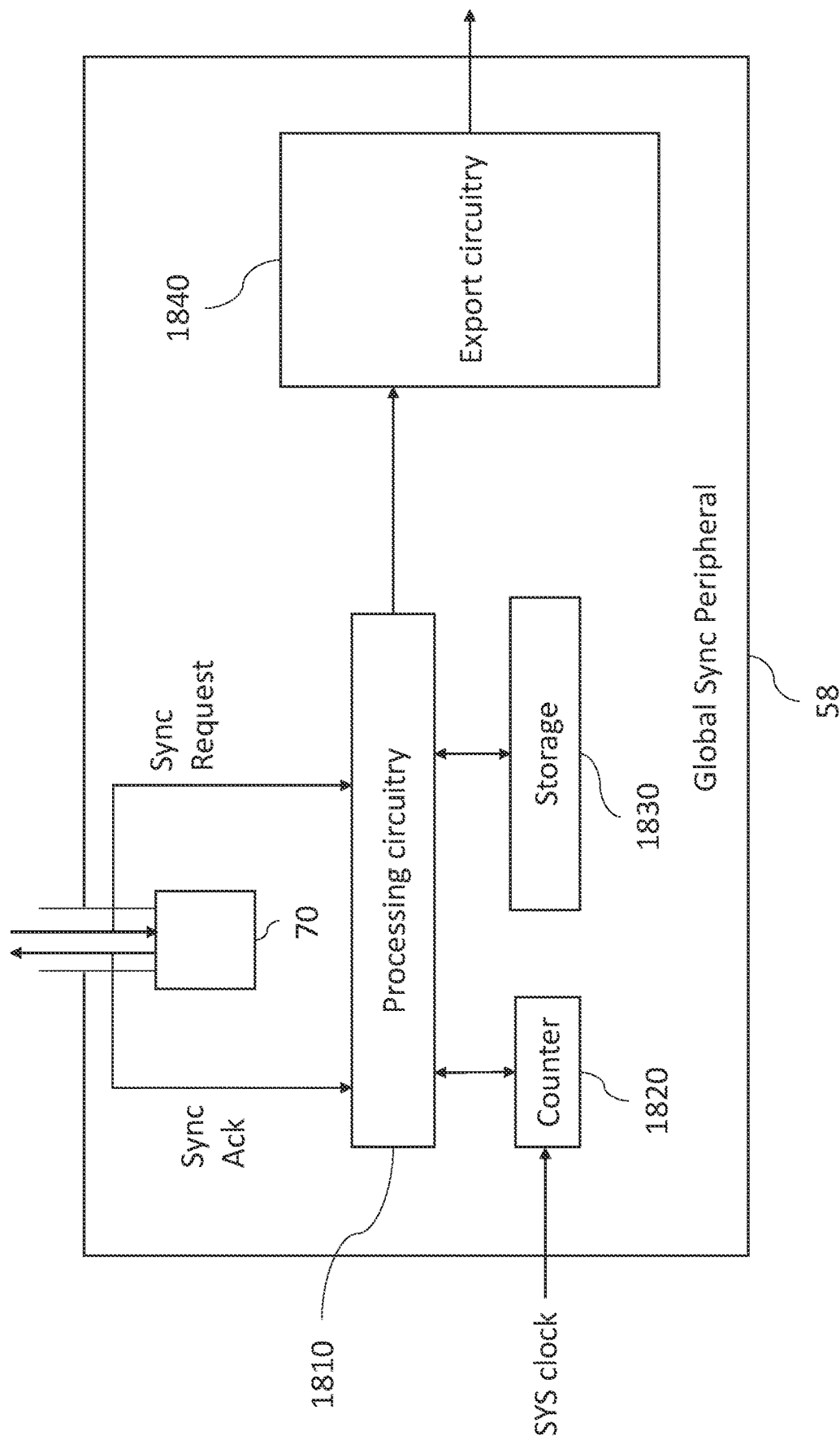
FIG. 18 is a schematic illustration of an external sync controller including circuitry for collecting trace data relating to sync events.

Sync trace circuitry is provided in the GSP 58 for collecting sync trace data based on sync requests or acknowledgments detected at the GSP 58. Reference is made to FIG. 18, which illustrates an example of the GSP 58. The GSP 58 includes sync trace circuitry 1810 for receiving sync requests and acknowledgments and providing trace information in dependence upon the received sync requests and acknowledgments. The sync requests received at the sync trace circuitry 1810 are received from the processing unit 2 (e.g. via the IPU sync controller 55 shown in FIGS. 5C and 5D). As will be described in more detail, the sync trace circuitry 1810 obtains these sync requests via connections to the interfaces (IS0 to IS29), which each connect a sync combiner 70 of the GSP 58 to the processing unit 2. The sync acknowledgments received at the sync trace circuitry 1810 are received from the sync combiners 70. Although connections are shown in FIG. 18 for receiving only one sync request and one sync ack at the sync trace circuitry 1810, it would be appreciated that the processing circuitry has multiple different connections for receiving sync messages for different sync zones.

The GSP 58 maintains a counter 1820 for determining timing information associated with received sync requests and sync acknowledgments. The counter 1820 is updated in response to edges of the system clock signal received at the GSP 58. When a sync request or sync acknowledgment is detected at the GSP 58, the sync trace circuitry 1810 reads the value of the counter 1820. This value represents the time of detection of the sync request or acknowledgment at the GSP 58 by the sync trace circuitry 1810. The sync trace circuitry 1810 derives timing information from the read counter value and stores this timing information in the storage 1830 of the GSP 58. The GSP 58 also stores along with the timing information, an indication as to whether or not the sync message is a sync request or a sync acknowledgment. Optionally, the GSP 58 stores in the storage 1830, along with the timing information, an indication of the sync zone associated with the detected sync request/acknowledgment. This timing information, along with the optional indication of the sync zone associated with the detected sync request/acknowledgement constitutes sync event information.

The timing information derived from the counter 1820 and exported as part of the sync trace information may indicate a time period during which a sync event occurred (i.e. when the sync message was received at the GSP 58). Such a time period is referred to herein as a "trace quanta". In embodiments, each trace quanta may be 50 ticks of the system clock in length. Dividing the trace period (400 ticks) into 8 trace quanta (50 ticks) allows trace data for a single sync zone for a trace period to be represented in 16 bits (with 8 bits for sync requests and 8 bits for sync acks). Since 64 bits are reserved in the trace report packet per trace channel, each trace channel dedicated to providing trace data may provide trace data for 4 sync zones. The number of monitored sync zones could be increased by increasing the length of the trace quanta. However, dividing the trace period into 8 trace quanta provides a useful trade-off between timing resolution for sync events and the number of zones that may be monitored with a given number of trace channels.

The sync trace circuitry 1810 determines during which trace quanta a sync request or sync acknowledgment has been observed, and stores this information in storage 1830 for export via export circuitry 1840. The sync trace circuitry 1810 causes the sync event information to be dispatched from the GSP 58 via the export circuitry 1840. The sync event information may be dispatched, for example, to a log file held in memory external to the GSP 58. The sync trace circuitry 1810 may cause sync event information to be dispatched periodically. In this case, during a given time period, any sync event information associated with sync events occurring during the time period is accumulated in the storage 1830. After the end of the time period, the sync trace circuitry 1810 causes the sync event information for that time period accumulated in the storage 1830 to be exported via the export circuitry 1840. The sync trace circuitry 1810 then causes the sync event information for the next time period to be stored in the storage 1830 and exported after the end of the next time period.

The scheme described above with respect to FIG. 18 may be implemented separately from the scheme using the trace report packet circulating on the bus 1400. However, in some embodiments, these two schemes may be implemented together. In the case in which they are implemented together, the export circuitry 1840 may comprise circuitry of a trace node 1410 for inserting trace data into the payload of the trace report packet when it is received at that trace node 1410. In this embodiment, the export circuitry 1840 may include part of the processing logic 1510.

As noted, the sync trace circuitry 1810 may periodically export the sync trace data via the export circuitry 1840. In the case that the sync trace data is exported to a trace report packet, this sync trace data is exported to a trace report packet once every trace period, at the time that the trace report packet arrives at the relevant trace node 1410. The counter 1820 is used to determine the timing of the arrival of the sync request or sync ack at the sync trace circuitry 1810. The value of counter 1820 allows the timing of the arrival of the sync request or sync ack within the trace period to be determined. In embodiments, the counter 1820 does not maintain a copy of the global time (which, as discussed, is maintained by the regulator node 1440). Rather, the counter 1820 may comprise a smaller number of bits, which enables the timing within a trace period to be evaluated. The counter 1820 is incremented by the system clock signal and provides an indication of how many system clock ticks have elapsed during the current trace period. When a sync request/acknowledgment is received at the sync trace circuitry 1810, the value of the counter 1820 provides an indication of the timing of the sync requests/acknowledgments within the current trace period. At the end of the trace period, the value of the counter 1820 is reset. The counter 1820 may be 9-bits in length, so as to enable the timing of sync events within the trace period to be determined.

As discussed, the timing information derived from the counter 1820 and exported as part of the sync trace data may provide information as to a trace quanta during which a sync event occurred. Each such trace quanta may be a time period within a trace period. Each trace period is subdivided into a plurality of trace quanta. In some embodiments, each trace period is subdivided into 8 trace quanta, with each trace quanta being 50 system clock ticks in length. A number of bits are provided in the sync trace data for a trace period, where each bit is associated with one of the trace quanta. In a string of bits of the sync trace data, if a sync request was detected within any trace quanta, the associated bit for that trace quanta is set to be equal to 1. On the other hand, if for a trace quanta, no sync request was detected during that trace quanta, the associated bit for that trace quanta in the string of bits is set to be equal to 0. Similarly, a string of bits are provided for the sync acknowledgements such that, if a sync acknowledgment was detected within any trace quanta, the associated bit for that trace quanta is set to be equal to 1. On the other hand, if, for a trace quanta, no sync acknowledgment was detected during that trace quanta, the associated bit for that trace quanta is set to be equal to 0. In this way, a string of bits is provided for each trace period, with each string of bits providing information as to the trace quanta in which sync events occurred. In the case that the trace period is subdivided into 8 trace quanta, each of string of bits is 8 bits in length, with each bit indicating whether or not a sync request/acknowledgment was detected during the corresponding trace quanta.

As noted, the sync trace data may include information as to the sync zone for the sync events. In this case, separate strings of bits are provided by the sync trace circuitry 1810 per sync zone. Each string of bits indicates for its associated sync zone during which trace quanta (if any), a sync request/acknowledgment associated with that sync zone was detected at the GSP 58. In each string of bits for the sync requests, if a bit is set to be equal to 1, this indicates that a sync request for the associated sync zone was detected at the sync trace circuitry 1810 during the trace quanta associated with that bit. If a bit is set to be equal to 0, this indicates that no sync request for the associated sync zone was detected at the sync trace circuitry 1810 during the trace quanta associated with that bit. Similarly, in each string of bits for the sync acknowledgments, if a bit is set to be equal to 1, this indicates that a sync acknowledgment for the associated sync zone was detected at the sync trace circuitry 1810 during the trace quanta associated with that bit. If a bit is set to be equal to 0, this indicates that no sync acknowledgment for the associated sync zone was detected at the sync trace circuitry 1810 during the trace quanta associated with that bit.

In some embodiments, to allow for monitoring of sync events for a larger number of sync zones, multiple trace nodes 1410 are provided in the GSP 58. Each of these trace nodes 1410 is configured to provide sync trace data for a different subset of the sync zones (each subset comprising, e.g. four sync zones) and for outputting of the sync trace data for these sync zones into a trace report packet.

Figure 19:
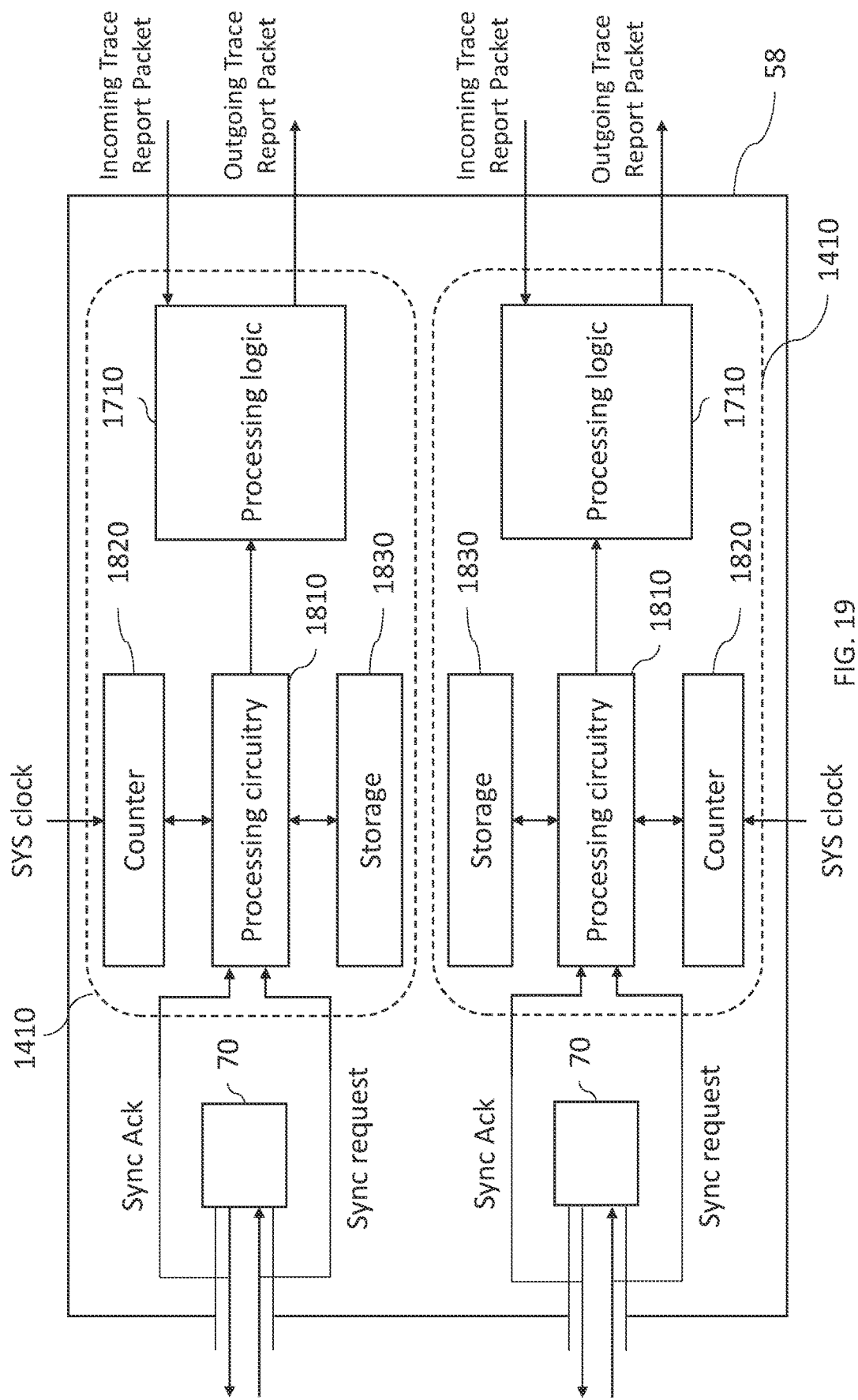
FIG. 19 is a schematic illustration of an external sync controller for providing two channels of trace data relating to sync events.

Reference is made to FIG. 19, which illustrates an example in which the GSP 58 comprises two trace nodes 1410. Each trace node 1410 comprises separate instances of the sync trace circuitry 1810, counter 1820, storage 1830, and the processing logic 1710. Each trace node 1410 is configured to provide tracing of sync activity for a different subset of external sync zones. In embodiments, each trace node 1410 provide tracing of sync activity for four different sync zones.

Each of the instances of the sync trace circuitry 1810 shown in FIG. 19 is configured to receive sync messages for a different subset of sync zones. For example, each sync trace circuitry 1810 may receive sync messages for four different sync zones. In order to receive these sync messages each sync trace circuitry 1810 has connections to four different ones of the interfaces IS0-IS29 to receive sync requests and sync acknowledgments issued on these interfaces. For simplification, only one set of connections for receiving sync requests/acks for each sync trace circuitry 1810 is shown in FIG. 19.

In response to receiving an indication of a sync request/ ack, the sync trace circuitry 1810 reads the value of its associated counter 1820 to determine the time value associated with the arrival of the sync request/ack. The sync trace circuitry 1810 determines the trace quanta in which this time value falls. The sync trace circuitry 1920 stores in its associated storage, the trace quanta for the sync event along with the sync zone for the sync event. This trace data is exported by the associated processing logic 1710 into the trace report packet received at the respective trace node 1410.

Although in FIG. 19, it is shown that separate sync trace circuitry 1810, counters 1820, and storage 1830 is provided per trace node 1410, in other embodiments, this circuitry may be shared between the trace nodes 1410 and used to provide trace data for different sync zones to separate sets of processing logic 1710.

The components 1810, 1820, 1830 described above with reference to FIGS. 18 and 19 are implemented in the GSP trace hardware 77 shown in FIG. 7A.

Reference is made again to FIG. 7A, which illustrates the presence of the GSP trace hardware 77 in the GSP 58. The GSP trace hardware 77 includes the sync trace circuitry 1810, the storage/s 1830, and the counter/s 1820. The GSP trace hardware 77 is configured to monitor a subset of the sync zones defined for the processing unit 2. As described, and as shown in FIG. 7A, in some embodiments, there are 30 such sync zones. The GSP trace hardware 77 may be configured to monitor 8 of these 30 sync zones, with the sync zones that are monitored being configurable based on settings stored in the GSP trace hardware 77.

The GSP trace hardware 77 is configured to monitor a subset (e.g. 8) of the interfaces (IS0-IS29) on which sync requests are received from the processing unit 2 and on which sync acknowledgments are sent to the processing unit 2. The GSP trace hardware 77 records that a sync event has occurred when it detects that a sync request or sync acknowledgment has issued on any one of the monitored interfaces. The GSP trace hardware 77 is able to resolve the sync zone associated with the sync request or sync acknowledgment in dependence upon the interface on which the sync request or sync acknowledgment is detected. Furthermore, the GSP trace hardware 77 is able to resolve whether a sync message detected on an interface is a sync request or sync acknowledgment by examining which of the signals in the set of sync handshake signals (as exemplified in table 1 and FIG. 8A) sent over the one of the interfaces (IS0-IS29). The GSP trace hardware 77 is, therefore, able to provide trace data for a sync event including information as to: whether the sync event relates to a sync request or sync acknowledgment, the sync zone for the sync event, and the timing information for the sync event.

Although in embodiments, the sync requests for an internal sync are not propagated and acknowledged by the GSP 58, the sync trace circuitry 1810 of the GSP trace hardware 58 may still detect sync events in relation to internal syncs since when the IPU sync controller 55 receives a sync request for an internal sync it temporarily asserts the sync request signal on the one of the interfaces (IS0-IS29) of the GSP 58 to allow the sync trace circuitry 1810 of the GSP trace hardware 77 to detect the sync request. Similarly, when the IPU sync controller 55 issues a sync request for an internal sync it temporarily asserts the sync acknowledgment signal on the one of the interfaces (IS0-IS29) of the GSP 58 to allow the sync trace circuitry 1810 of the GSP trace hardware 77 to detect the sync acknowledgment.

As noted, another form of trace data that may be provided in a trace report packet, and therefore, in the log entries of the log file is a count of packets transmitted through various nodes on the chip 500.

Figure 20:
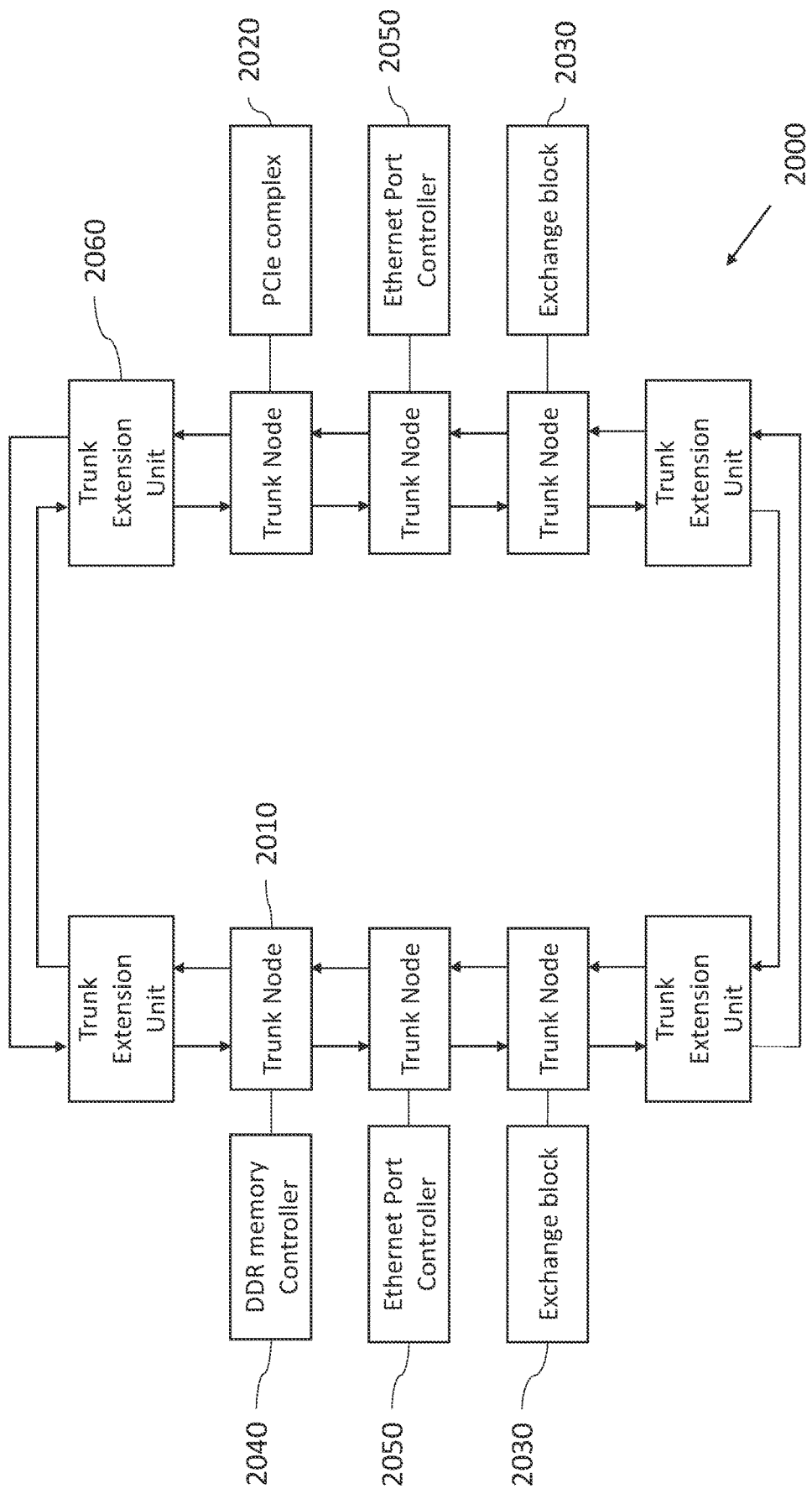
FIG. 20 is a schematic illustration of an interconnect for transporting data packets between different components on the chip.

Reference is made to FIG. 20, which illustrates an example of an interconnect 2000 according to embodiments of the application. This interconnect 2000 may be used for the transport of packets between different components of the chip 500. The interconnect 2000 is used for transporting data plane traffic (e.g. application instructions and application data for processing by tiles 4). The interconnect 2000 transports this data plane traffic between tiles 4 and the host system, or between tiles 4 and directly attached external memory. The interconnect 2000 is, therefore, distinct from the bus 1400, which is used for transport of control and trace information.

The interconnect 2000 comprises a plurality of nodes 2010, 2060 between which packets are transmitted from one node 2010, 2060 to the next. The nodes include trunk nodes 2010, which include an interface to an attached SoC component, which they are configured to interface with the interconnect 2000. The nodes also include trunk extension units 2060, which serve to route traffic from one side of the chip 500 to the other. The trunk extension units 2060 function as simplified versions of the trunk nodes 2010, which do not attach to a SoC component (other than to a trunk node 2010).

The interconnect 2000 is arranged in a ring, around which packets may circulate. The packets may pass around the interconnect 2000 in a clockwise or counter-clockwise direction. The packets have headers including information, such as an address and packet type, causing them to be supplied to an appropriate virtual channel and, therefore, to the appropriate component attached to the interconnect 2000.

A variety of components are shown attached to the interconnect 2000. One example of such a component is a PCI complex 2020 for interfacing with the host or for interfacing with another chip 500. The PCIe complex 2020 receives packets from the interconnect 2000 and supplies these to the host or to another chip 500. Such packets may be read or write request packets sent by tiles 4 on the chip 500 for reading or writing data to/from the host or may be write packets sent by tiles 4 on another chip 500 to write data to memory of tiles 4 on a connected chip 500. The PCIe complex 2020 receives packets from the host or from another chip 500 and converts them to the Elink packet format for circulating on the interconnect 2000 for supply to another component accessible on the interconnect 2000.

Further components accessible on the interconnect 2000 include the exchange blocks 2030, via which data packets are exchanged between the interconnect 2010 and the tiles 4. The exchange blocks 2030 convert the packets between the Elink packet format, suitable for transmission around the interconnect 2000, and the Tlink packet format, used for delivery of packets between the tiles 4 and the exchange blocks 2030.

A further component accessible on the interconnect 2000 is the DDR memory controller 2040 for reading/writing data to/from the on-chip DDR memory. This memory is accessible to the tiles 4 over the interconnect 2000.

Further components accessible on the interconnect 2000 are Ethernet port controllers 2050 for sending and receiving data over an Ethernet network.

For forwarding data between the nodes 2010, 2060, a plurality of virtual channels are defined in both directions around the ring interconnect 2000. The virtual channels are defined to prevent HOL blocking. A virtual channel on the interconnect 2000 serves exactly one of the components accessible on the ring. Each virtual channel has its own dedicated buffer in each of the nodes 2010, 2060. A node 2010, 2060 forwards received packets based on the occupancy of the buffers of the virtual channels in the upstream node 2010, 2060. Each node 2010, 2060 supplies credit signals to its neighbours for each virtual channel, where those credits signals indicated the occupancy of the buffers for each virtual channel. In this way, the nodes 2010, 2060 may apply back-pressure on the interconnect 2000 on a per virtual channel basis.

Each of a plurality of the nodes 2010, 2060 is instantiated with a trace node 1410 for counting the flow of packets through that respective node 2010, 2060. A trace node 1410 of a node 2010, 2060 is configured to monitor a virtual channel in the interconnect 2000, so as to count the number of packets on that virtual channel during each trace period. This provides information as to the number of packets passing through the node 2010, 2060 to a particular destination and in a particular direction (i.e. either clockwise or anti-clockwise around the ring).

Each of the trace nodes 1410 may monitor and collect separate packet counts for a plurality of data flows through its associated node 2010, 2060 in the interconnect 2000. Each of the packets belonging to a given data flow may be labelled with a different label that distinguishes it from other flows. Such labelling may, for example, be provided by software executing on the tiles 4 from which the packet originate.

Reference is made to FIG. 21, which illustrates an example of the contents of the trace report packet payload, once the trace report packet has collected trace data from all of the trace nodes 1410 present on the bus 1400.

The payload of the trace report packet includes the global time value for the trace period. This may be a 55 bit value occupying two words of the trace report packet. Following the global time value is the trace data collected from the trace nodes 1410 during the trace period. In this example, trace data is collected from 19 trace nodes 1410 on the bus 1400, each of which provides a channel of trace data. As a result, in FIG. 21, 19 channels (channels 0 to 18) of trace data are shown.

The first channel (channel 0) of trace data is the IPU clock counter value.

Channels 1 and 2 include the sync trace data. As noted, the GSP 58 may include two separate trace nodes 1410, each of which is configured to provide trace data for one of the channels 1 and 2. Channel 1 includes timing information for any sync requests or acknowledgments associated with four sync zones that have been detected at the GSP 58 within the trace period. The sync trace data of channel 1 includes eight sets of 8 bits. Each of four of these sets provides an indication as to whether or not a sync request for one of the four sync zones occurred in each of eight trace quanta for the trace period. Each of the other four sets of bits in channel 1, provides an indication as to whether or not a sync acknowledgment for one of the four sync zones occurred in each of eight trace quanta for the trace period. For example, for a first sync zone (labelled as SG1 in FIG. 21), a set of eight bits (labelled SG1-Req) provides independent indications as to whether a sync request associated with the first sync zone was detected at the GSP 58 during each of the eight trace quanta. Additionally, a set of eight bits (labelled SG1-Ack) provides independent indications as to whether a sync acknowledgment associated with the first sync zone was detected during each of the eight trace quanta.

Channel 2 provides the same information as channel 1, but for four different sync zones (labelled SG5 to SG8).

Each of channels 3 to 18 includes packet counts through one of the nodes 2010, 2060 of the interconnect 2000. Each of these channels provides packet counts for a single virtual channel at a single node 2010, 2060 of the interconnect 2000. Each channel provides up to four packet count values, each for different labelled flows of data packets. For example, channel 3 shows the count of packets passing through a node 2010, 2060 for four different labelled flows of packet (shown as label a, label b, label c, label d). Similarly, channel 18 shows the count of packets passing through a node 2010, 2060 for four different labelled flows of packet (shown as label w, label x, label y, label z).

In some embodiments, two different trace nodes 1410 may be instantiated in a single one of the nodes 2010, 2060. Each of the two different trace nodes 1410 in a single node 2010, 2060 of the interconnect 2000 may provide a different one of the packet count channels (channels 3 to 18 in the example of FIG. 21). One of the two trace nodes 1410 supplying trace data from a single node 2010, 2060 may supply a packet count of packets travelling in a clockwise direction around the interconnect 2000, whilst the other these two trace nodes 1410 supplies a packet count of packets travelling in a counter-clockwise direction around the interconnect 2000.

As described, when the trace termination unit 1420 receives the trace report packet, it produces, based on the information in the payload of the packet, a log entry for the trace period.

Each log entry includes a value (TP_TIMEDELTA) representing the change in global time between the present log entry and the previous log entry. The first log entry contains the global time value itself.

Each log entry includes a value (TP_MAP), indicating which trace information (e.g. IPU clock delta, sync event data, packet count data) is contained in the log entry.

Some or all log entries include the IPU clock delta value (IPU_CLK_RP) representing the change in the IPU clock counter between the current resolution period for the IPU clock counter and the previous resolution period for the IPU clock counter. Clock updates are added to a log entry only when the clock monitor resolution period has expired.

Some or all log entries includes a set of values (SYNCMAP) indicating whether any sync activity was reported for each sync zone during the trace period. The SYNCMAP may be 16 bits in length, with 8 of the bits indicating whether a sync request was detected at the GSP 58 for each of the 8 monitored sync zones, and 8 of the bits indicating whether a sync acknowledgement was detected at the GSP 58 for each of the 8 monitored sync zones.

Some or all of the log entries include 8-bit maps for each sync zone for which sync request detection is reported in the SYNCMAP, and 8-bit maps for each sync zone for which sync acknowledgment detection is reported in the SYNCMAP. Each 8-bit map indicates whether a sync request/acknowledgment occurred during each of the 8 trace quanta into which the trace period is divided.

Some or all of the log entries include a value (PACKETUPDCNT) indicating the number of packet count updates in the log entry. There may be any number between 0 and 64 in this value to reflect that each trace report packet may include packet count data from up to 16 channels, with up to 4 packet counts reported per channel.

Some or all of the log entries include the packet count trace information in sets of bits (PACKETUPD), where a set of such bits is provided per packet count. Each PACKTUPD set of bits includes a subset of bits specifying the channel (i.e. one of channels 3 to 18) associated with the packet count, a subset of bits specifying the label of the data flow that the packet count pertains to, and a subset of bits which represents the delta (i.e. change) in the packet count since the last log entry.

In embodiments, in addition to tracing activity from a single chip 500, activity may be traced from across multiple different chips 500. As noted, the log files that are generated by the trace activity include global time values, which indicate the time associated with each item of trace data recorded in the log. According to embodiments, when generating trace data from across multiple different chips, the system clock counters from which the global time values are derived are synchronised between the different chips 500. In this way, the log entries output by the different chips 500 include compatible timing information. This enables merging of log files produced by different chips 500.

Figure 22:
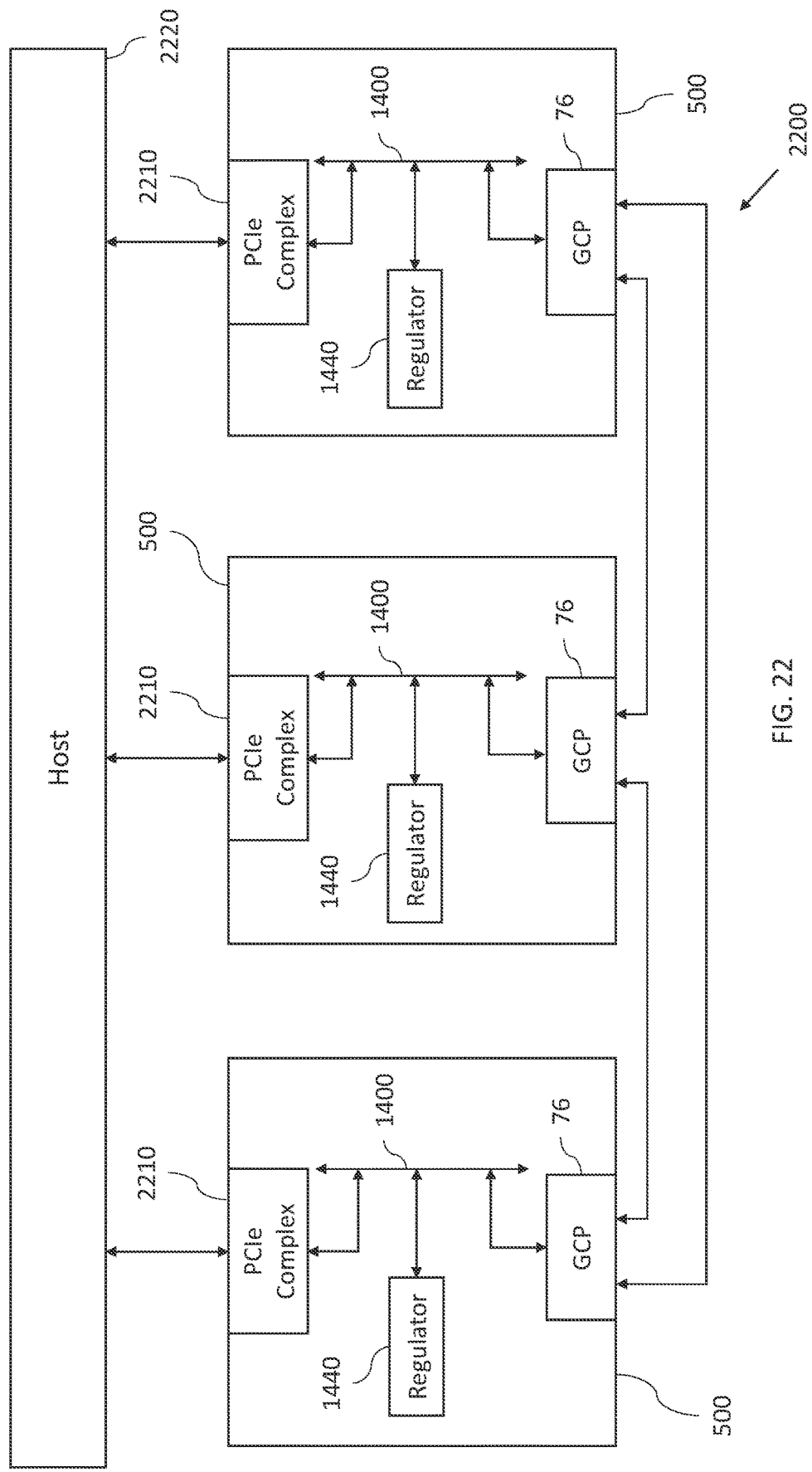
FIG. 22 illustrates a system comprising a plurality of chips configured to interface with the host system.

Reference is made to FIG. 22, which shows a system 2200 comprising a plurality of chips 500, for which trace is enabled in the manner described above with respect to FIGS. 14 to 21. Each of the chips 500 includes SoC circuitry that operates in according with a first clock (the system clock). As has been described, the system clock is used to increment a counter (the system clock counter) used to provide the global time value for generating the trace logs. The system clock counter of each chip 500 is maintained by the chip's 500 regulator 1440. The system clock frequency is approximately the same for each chip 500. However, due to physical limitations there may be very small differences in this frequency between chips 500. Each of the chips 500 additionally includes a processing unit 2 (not shown in FIG. 22), which operates according to a second clock (the IPU clock). The IPU clock frequency may differ between the chips 500.

Each of the chips 500 includes a global communications proxy (GCP) 76, which is implemented a switch-connected link of the chip 500. The GCP 76 is operable to exchange packets over an Ethernet network with other ones of the chips 500 in the system 2200. The GCPs 76 are used for the exchange of synchronisation messages used to synchronise the system clock counters held in the regulators 1440 on each of the chips 500. In order to synchronise the system clock counters between the chips 500, a Distributed Consensus Timing Synchronisation (DCTS) algorithm is employed. For the purposes of performing this synchronisation of the regulator 1440 system clock counters, each of the GCPs 76 maintains a counter (incremented by the system clock), which represents the global time. This counter is distinct from the system clock counter maintained by the regulator 1440, which is used for inserting the global time values into the trace report packets as described earlier.

The chips 500 of the system 2200 are arranged together in a ring, such that each chip 500 has two neighbours. Each chip 500 sends (via its GCP 76) a time update message to both of its two neighbouring chips 500. This message is sent periodically and includes the value of global time from the global time counter maintained by the GCP 76 on the respective chip 500. As a result, each GCP 76 receives two time update messages from its neighbours.

In response to the receipt of two time update messages, the GCP 76 determines from the received time update messages, an updated global time value. The GCP's 76 copy of the global time value is updated by averaging the global time values determined from the values in the received time update messages from the other chips 500, whilst accounting for the latency (in system clock ticks) for the time update messages to travel from the neighbouring chips 500. In order to account for the latency, each GCP 76 is programmed with the expected latency for incoming time update messages from its neighbouring chips 500.

The GCP's 76 continue to exchange the time update messages until their copies of the global time are synchronised to within a programmable amount across all of the chips 500. Each GCP 76 determines when the copies of the global time are synchronised to within this programmable amount by monitoring the magnitude of the updates to its own local copy of the global time. The magnitude of these updates declines with the difference between the copies held by the different GCPs 76, such that once the magnitude is below a programmable level, the copies of the global time are determined to be synchronised to within the programmable amount. Once the synchronisation is complete, each GCP 76 dispatches an update to its regulator 1440 to update the regulator's copy of the global time (i.e. the system clock counter).

When performing the Distributed Consensus Timing Synchronisation (DCTS) algorithm, the latency through the Ethernet switches over which the time update messages are sent is controlled by configuring the VLAN (virtual local area network) within the switch such that all the GCPs 76 are on the same VLAN. Switch buffering resources are reserved for this network which serves to separate the timing update traffic from bulk data plane traffic in the switch. Thus the presence of the latter high bandwidth data does not affect the former low bandwidth timing updates.

Having determined the updates to be applied, the GCP 76 sends via the bus 1400, writes to the regulator 1440 to update the regulator's 1440 system clock counter.

With synchronised global time values across the regulators 1440 of the chips 500, compatible log files may be generated and supplied to an external storage (e.g. memory of the host 2220 as shown in FIG. 22). For each chip 500, the trace report packet circulating on the bus 1400 may be received at a trace termination unit 1410, which is instantiated in the PCIe complex 2210. The trace termination unit 1410 in each PCIe complex 2210 extracts the trace data and generates a log entry during each trace period. The PCIe complex 2210 causes each log entry to be dispatched to the host 2220 for storage in the memory of the host 2220. A processor of the host 2220 may be configured to produce a merged file from these log entries in dependence upon the global time values included in the log entries from different chips 500. The synchronisation of the global time between the chips 500 makes such global time synchronisation possible.

Figure 23:
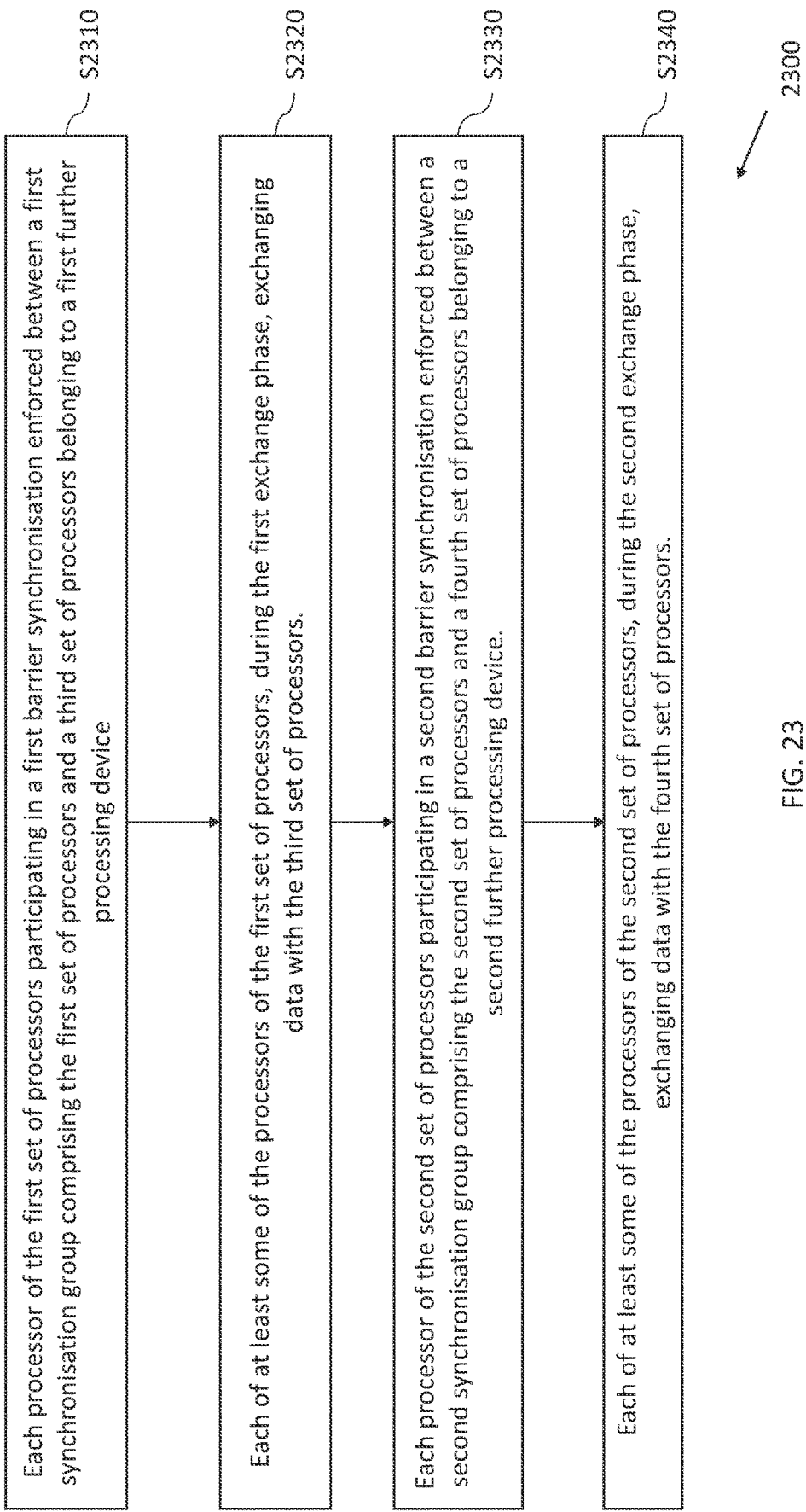
FIG. 23 illustrates a method for synchronising a processing device with one or more further processing devices.

Reference is made to FIG. 23, which illustrates a method 2300 for synchronising a processing device with one or more further processing devices.

At S2310, each processor of the first set of processors participates in a first barrier synchronisation enforced between a first synchronisation group comprising the first set of processors and a third set of processors belonging to a first further processing device. The first barrier synchronisation separates a compute phase for the first synchronisation group from a first exchange phase for the first synchronisation group.

At S2320, each of at least some of the processors of the first set of processors, during the first exchange phase, exchange data with the third set of processors.

At S2330, each processor of the second set of processors participates in a second barrier synchronisation enforced between a second synchronisation group comprising the second set of processors and a fourth set of processors belonging to a second further processing device. The second barrier synchronisation separates a compute phase for the second synchronisation group from a second exchange phase for the second synchronisation group.

At S2340, each of at least some of the processors of the second set of processors, during the second exchange phase, exchanges data with the fourth set of processors.

Figure 24:
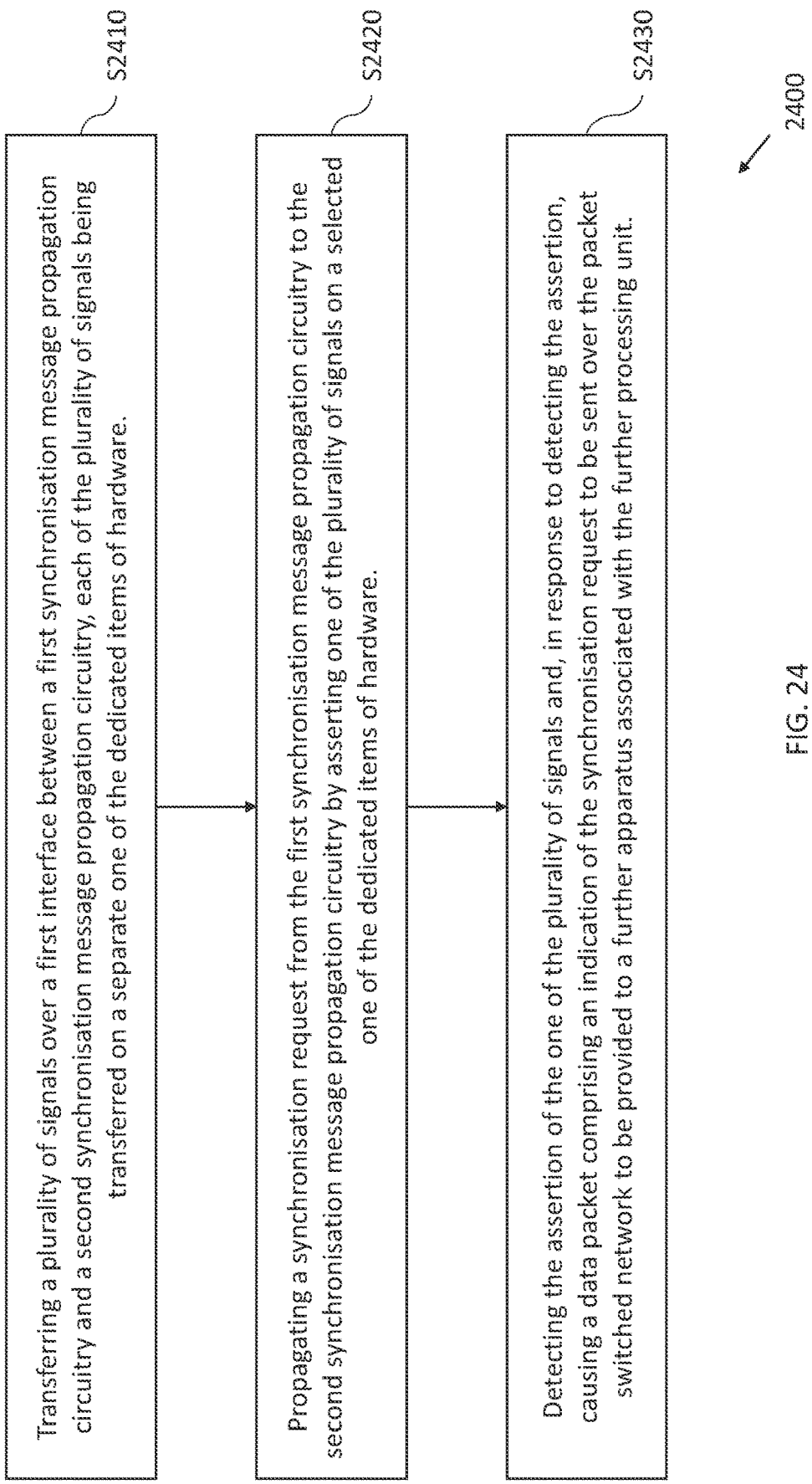
FIG. 24 illustrates a method for converting synchronisation messages from signals present on dedicated items of hardware into packets for dispatch over a packet switched network.

Reference is made to FIG. 24, which illustrates a method 2400 for converting synchronisation messages from signals present on dedicated items of hardware into packets for dispatch over a packet switched network.

At S2410, a plurality of signals are transferred over a first interface between a first synchronisation message propagation circuitry and a second synchronisation message propagation circuitry. Each of the plurality of signals being transferred on a separate one of the dedicated items of hardware. Each of the dedicated items of hardware being dedicated to provide a different type of the synchronisation messages.

At S2420, a synchronisation is propagated from the first synchronisation message propagation circuitry to the second synchronisation message propagation circuitry by asserting one of the plurality of signals on a selected one of the dedicated items of hardware, the synchronisation request being a request for a synchronisation between the processing unit and the further processing unit at a first of the barrier synchronisations.

At S2430, the second sync propagation circuitry detects the assertion of the one of the plurality of signals and, in response to detecting the assertion, causes a data packet comprising an indication of the synchronisation request to be sent over the packet switched network to be provided to a further apparatus associated with the further processing unit.

Figure 25:
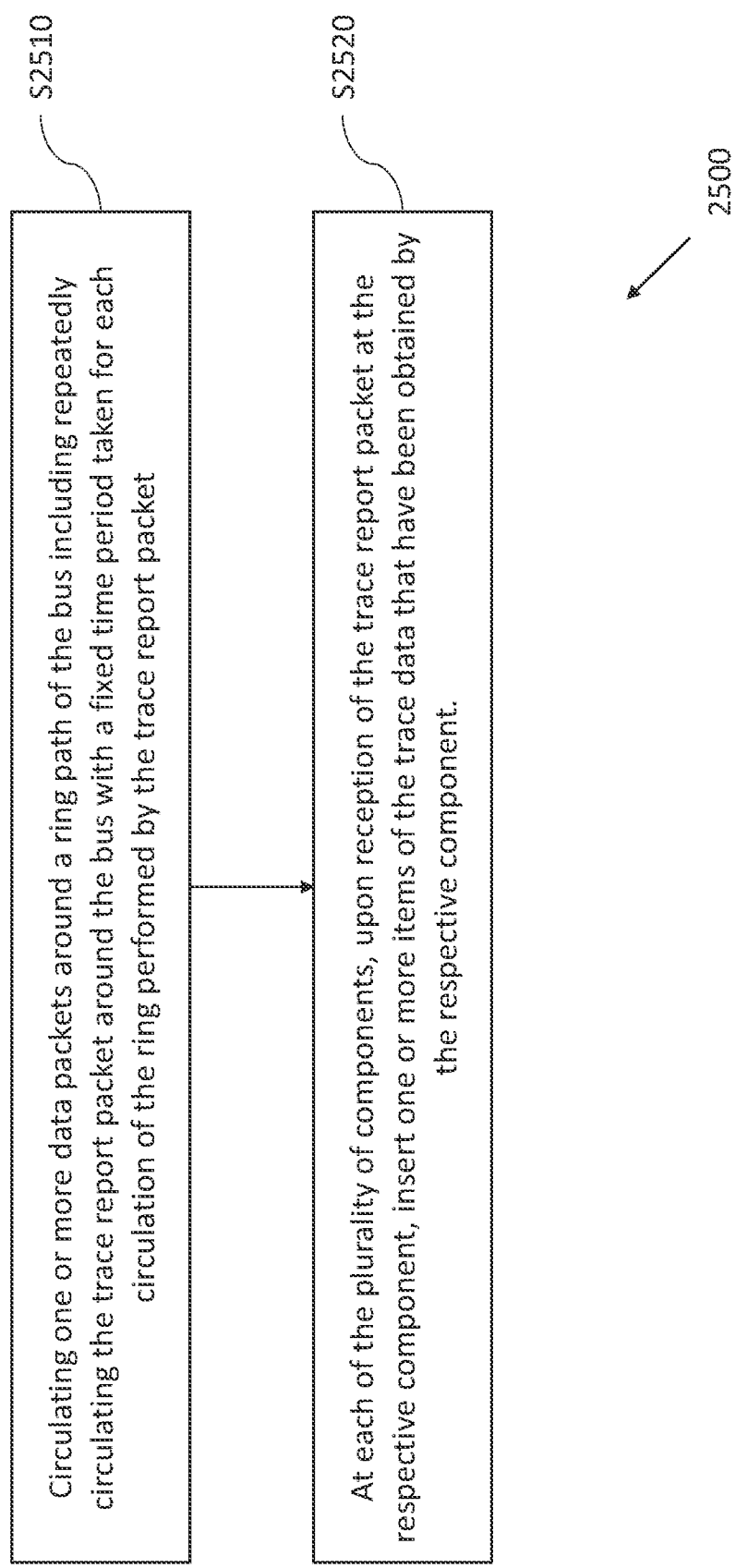
FIG. 25 illustrates a method for collecting trace data from a plurality of components.

Reference is made to FIG. 25, which illustrates an example method 2500 for collecting trace data from a plurality of components.

At S2510, the bus circulates one or more data packets around a ring path. These one or more data packets include a trace report packet, which is repeatedly circulated around the bus with a fixed time period taken for each circulation of the ring.

At S2520, at each of the plurality of components, upon reception of the trace report packet at the respective component, one or more items of the trace data are inserted into the trace report packet.

Figure 26:
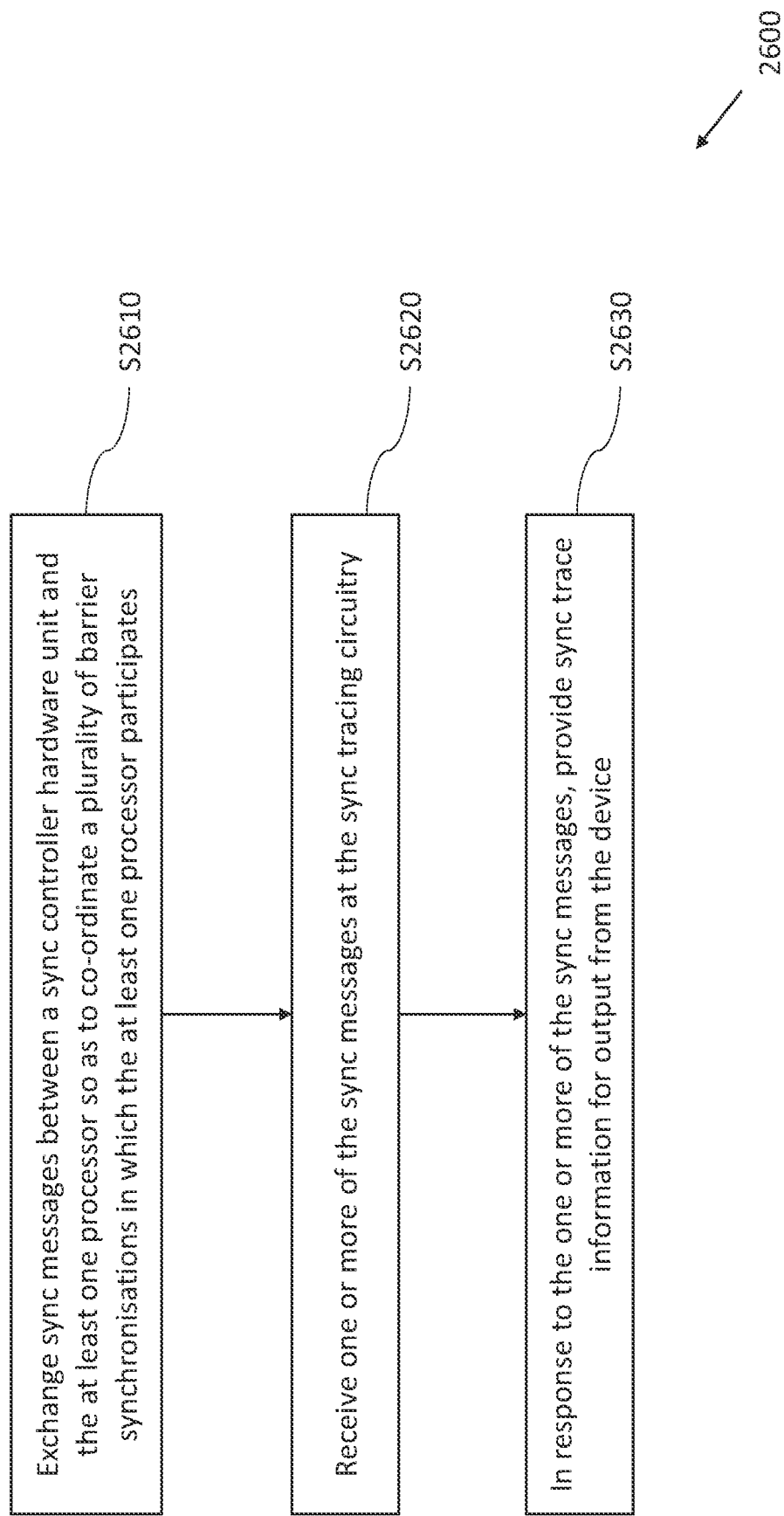
FIG. 26 illustrates a method for tracing the sync activity for a processing unit.

Reference is made to FIG. 26, which illustrates an example method 2600 for collecting synchronisation trace data for a processing unit.

At S2610, at least one processor exchanges sync messages with a sync controller hardware unit so as to co-ordinate each of a plurality of barrier synchronisations in which the at least one processor participates.

At S2620, one or more of the sync messages are received at the sync trace circuitry.

At S2630, the sync trace circuitry is configured to, in response to the one or more of the sync messages, provide sync trace information for output from the device.

Each of the components of the systems, i.e. gateway 1330 and chip 500, described for implementing embodiments of the application comprise required data processing circuitry and memory for implementing the functions as described. The data processing circuitry may include one or more of, microprocessors, application specific integrated circuits (ASIC), field programmable gate arrays (FPGAs) and processors based on multi core processor architecture, as non-limiting examples. The data processing may be distributed across several data processing circuit modules. Components comprising suitable data processing circuitry for performing their operations as described include but are not limited to: the GCP 76, the Cbus initiator 74, the Cbus target 7, the virtual sync controller 71, and the IPU sync controller 55.

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A device comprising:
   a processing unit comprising at least one processor configured to:
   participate in barrier synchronisations, each of which separates a compute phase of the at least one processor from an exchange phase for the at least one processor; and
   exchange sync messages with a sync controller hardware unit so as to co-ordinate each of the barrier synchronisations; and
   sync trace circuitry configured to:
   receive one or more of the sync messages; and
   in response to each of the one or more of the sync messages, provide sync trace information for output from the device, the sync trace information comprising timing information associated with the respective sync message,
   wherein for a first of the one or more of the sync messages, the respective sync trace information comprises identification of a sync group for one of the barrier synchronisations that is associated with the first of the one or more of the sync messages, and
   wherein the sync controller hardware unit comprises a plurality of interfaces, each of which is associated with a different sync group, wherein the sync trace circuitry is configured to, for the first of the one or more of the sync messages, determine the identification of the sync group in dependence upon which of the plurality of interfaces the first of the one or more of the sync messages is issued or received on.

2. The device of claim 1, wherein at least some of the one or more of the sync messages are sync requests issued by the at least one processor to the sync controller hardware unit, each of the sync requests being a request to participate in one of the barrier synchronisations.

3. The device of claim 2, wherein the at least one processor comprises a plurality of processors, wherein the plurality of processors are configured to issue each of the sync requests by each of the plurality of processors asserting a different one of a plurality of sync request signals, the device comprising sync aggregation circuitry configured to aggregate the sync request signals to provide each of the sync requests.

4. The device of claim 1, wherein at least some of the one or more of the sync messages are acknowledgments of sync requests, the acknowledgments being issued by circuitry of the sync controller hardware unit to the at least one processor, wherein the at least one processor is configured to, in response to receipt of each of the acknowledgments, pass an associated one of the barrier synchronisations.

5. The device of claim 1, wherein the identification of the sync group comprises an identification of a set of hardware resources configurable to support barrier synchronisations for the sync group.

6. The device of claim 1, wherein the sync trace circuitry comprises at least one connection to at least one interface of the sync controller hardware unit via which it receives the one or more sync messages.

7. The device of claim 1, wherein the sync trace circuitry is configured to export the sync trace information into a trace report packet.

8. The device of claim 1, wherein the sync trace circuitry is configured to:
   for each of the one or more of the sync messages, store the respective sync trace information as contents of a storage associated with the sync trace circuitry; and
   periodically export the contents of the storage, such that the contents are exported once during each of a plurality of defined trace periods.

9. The device of claim 8, wherein for each of the one or more of the sync messages, the respective timing information provides an indication as to when during one of the plurality of defined trace periods, the respective sync message was received at the sync trace circuitry.

10. The device of claim 1, wherein the sync trace information comprises a first set of bits, wherein each of the first set of bits:
    is associated with a different time period; and
    indicates whether or not a sync message was received at the sync trace circuitry during the time period associated with the respective bit.

11. The device of claim 10, wherein the sync trace information comprises a plurality of sets of bits, each of which is associated with a different sync group, wherein the first set of bits is one of the plurality of sets of bits.

12. The device of claim 1, wherein the sync trace circuitry is configured to receive a first of the one or more of the sync messages by receiving a copy of the first of the one or more of the sync messages.

13. The device of claim 1, wherein the device comprises a plurality of dedicated wires for transmitting different types of sync message between the processing unit and the sync controller hardware unit, wherein the at least one processor is configured to perform the exchanging of the sync messages with the sync controller hardware unit by at least one of:
    asserting signals on at least one of the dedicated wires; and
    detecting assertion of signals by circuitry of the sync controller hardware unit on a further at least one of the dedicated wires.

14. The device of claim 13, wherein the sync trace circuitry comprises a plurality of connections to different ones of the dedicated wires, and is configured to, for each of the one or more sync messages, provide the respective sync trace information in dependence upon which of the dedicated wires an assertion of a signal corresponding to the respective sync message was detected.

15. The device of claim 14, wherein the sync trace circuitry is configured to, for each of the one or more sync messages, provide in the respective sync trace information, an indication of a sync group associated with the one of the dedicated wires on which the assertion of the signal was detected.

16. The device of claim 1, wherein at least some of the one or more of the sync messages are for co-ordinating ones of the barrier synchronisations that take place between the at least one processor and a further one or more processors belonging to a further device.

17. The device of claim 16, wherein the device is an integrated circuit, wherein the further device is a further integrated circuit.

18. The device of claim 1, wherein the at least one processor comprises a plurality of processors, wherein at least some of the one or more of the sync messages are for co-ordinating ones of the barrier synchronisations that take place between the plurality of processors.

19. A method for tracing synchronisation activity for a processor of a processing unit, the method comprising:
- exchanging a plurality of sync messages between a sync controller hardware unit and the processor so as to co-ordinate a plurality of barrier synchronisations, each of the barrier synchronisations separating a compute phase of the processor from an exchange phase for the processor;
- receiving at sync trace circuitry, a first sync message of the plurality of sync messages; and
- in response to the first sync message, providing sync trace information for output from a device comprising the sync trace circuitry, the sync trace information comprising timing information associated with the first sync message,
- wherein a plurality of dedicated wires are used for transmitting different types of sync message between the processing unit and the sync controller hardware unit,
- wherein exchanging the plurality of sync messages comprises at least one of:
  - asserting signals on at least one of the dedicated wires; and
  - detecting assertion of signals by circuitry of the sync controller hardware unit on a further at least one of the dedicated wires,
- wherein the sync trace circuitry comprises a plurality of connections to different ones of the dedicated wires, and
- wherein the method further comprises:
- for each of the plurality of sync messages, providing the respective sync trace information in dependence upon which of the dedicated wires an assertion of a signal corresponding to the respective sync message was detected.

20. The method of claim 19, wherein the first sync message includes a request to participate in one of the barrier synchronisations.

21. The method of claim 19, wherein the first sync message includes an acknowledgment of a sync request, the acknowledgment being issued to the processor, wherein the processor is configured to, in response to receipt of the acknowledgment, pass an associated one of the barrier synchronisations.

22. The method of claim 19, wherein the sync trace information comprises an identification of a sync group for one of the barrier synchronisations that is associated with the first sync message.

23. The method of claim 19, further comprising:
- storing the sync trace information as contents of a storage; and
- periodically exporting the contents of the storage, such that the contents are exported once during each of a plurality of defined trace periods.

24. A non-transitory computer readable medium storing computer readable instructions, which when executed by at least one processor, causes a method to be carried out, the method comprising:
- receiving a plurality of sync messages from a sync controller hardware unit, wherein each of the sync messages is a message to co-ordinate a barrier synchronisation separating a compute phase of at least part of a processing unit from an exchange phase of the at least part of the processing unit; and
- in response to a first sync message of the plurality of sync messages, providing sync trace information for output from a device comprising the processing unit, the sync trace information comprising timing information associated with the first sync message,
- wherein the sync trace information further comprises identification of a sync group for one of the barrier synchronisations that is associated with the first sync message,
- wherein the sync controller hardware unit comprises a plurality of interfaces, each of which is associated with a different sync group, and
- wherein the method further comprises:
- determining, for the first sync message, the identification of the sync group in dependence upon which of the plurality of interfaces the first sync message is issued or received on.

* * * * *